United States Patent
Nakamura et al.

(10) Patent No.: US 6,867,811 B2
(45) Date of Patent: Mar. 15, 2005

(54) PHOTOSENSOR SYSTEM AND DRIVE CONTROL METHOD THEREOF

(75) Inventors: Yoshiaki Nakamura, Ome (JP); Yasuo Koshizuka, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 448 days.

(21) Appl. No.: 10/013,979

(22) Filed: Oct. 30, 2001

(65) Prior Publication Data

US 2002/0085109 A1 Jul. 4, 2002

Related U.S. Application Data

(63) Continuation-in-part of application No. 09/703,025, filed on Oct. 31, 2000.

(30) Foreign Application Priority Data

| Nov. 8, 1999 | (JP) | 11-316650 |
| Nov. 10, 1999 | (JP) | 11-319605 |
| Jan. 25, 2000 | (JP) | 2000-015981 |
| Jun. 29, 2001 | (JP) | 2001-1988615 |

(51) Int. Cl.$^7$ ........................ H04N 5/235; H04N 5/238; G06K 9/34
(52) U.S. Cl. .................... 348/362; 348/221.1; 348/364; 382/124
(58) Field of Search ................. 348/302, 308, 348/246, 362, 364, 365, 367, 297, 221.1; 382/124

(56) References Cited

U.S. PATENT DOCUMENTS

| 4,316,660 A | * | 2/1982 | Ohtsubo et al. | 396/201 |
| 4,701,626 A | * | 10/1987 | Ishizaki et al. | 250/208.3 |
| 5,008,698 A | * | 4/1991 | Muramatsu et al. | 396/234 |
| 5,335,075 A | * | 8/1994 | Komiya et al. | 348/298 |
| 5,461,419 A | | 10/1995 | Yamada | |
| 5,532,484 A | * | 7/1996 | Sweetser et al. | 250/332 |
| 5,583,570 A | | 12/1996 | Yamada | |
| 5,793,422 A | * | 8/1998 | Mochizuki et al. | 348/296 |
| 5,963,657 A | | 10/1999 | Bowker et al. | |
| 5,974,163 A | | 10/1999 | Kamei | |
| 6,101,294 A | * | 8/2000 | McCaffrey et al. | 382/312 |
| 6,362,767 B1 | * | 3/2002 | Yang et al. | 341/155 |
| 6,373,550 B2 | * | 4/2002 | Tsuchihashi et al. | 355/40 |
| 6,486,915 B2 | * | 11/2002 | Bell et al. | 348/362 |
| 6,498,576 B1 | | 12/2002 | Tian et al. | |
| 6,618,090 B1 | * | 9/2003 | Kidono et al. | 348/362 |
| 6,665,010 B1 | | 12/2003 | Morris et al. | |
| 2001/0030697 A1 | * | 10/2001 | Dischert et al. | 348/263 |
| 2001/0040632 A1 | * | 11/2001 | Yang et al. | 348/294 |
| 2002/0021827 A1 | * | 2/2002 | Smith | 382/124 |

FOREIGN PATENT DOCUMENTS

WO    WO 93/04556 A1    3/1993

OTHER PUBLICATIONS

Patent Abstracts of Japan; vol. 018, No. 137; Mar. 7, 1994; & JP 05-316432A (Canon Inc. ) Nov. 26, 1993.
Patent Abstracts of Japan; vol. 1999, No. 12, Oct. 29, 1999 and JP 11-205662 A (Nissan Motor Co., Ltd. ) Juy 30, 1999.

* cited by examiner

Primary Examiner—Andrew Christensen
Assistant Examiner—Lin Ye
(74) Attorney, Agent, or Firm—Frishauf, Holtz, Goodman & Chick, P.C.

(57) ABSTRACT

A photosensor system performs a sensitivity-adjusting reading operation with respect to a subject image, while simultaneously changing the image reading sensitivity stepwise for each of rows of a photosensor array or for specific rows thereof. The dynamic ranges of the lightness data on the read subject image are checked to see how they are distributed in relation to the image reading sensitivities. On the basis of this distribution, an image reading sensitivity that contributes to an optimal image reading state is extracted as an optimal image reading sensitivity.

31 Claims, 41 Drawing Sheets

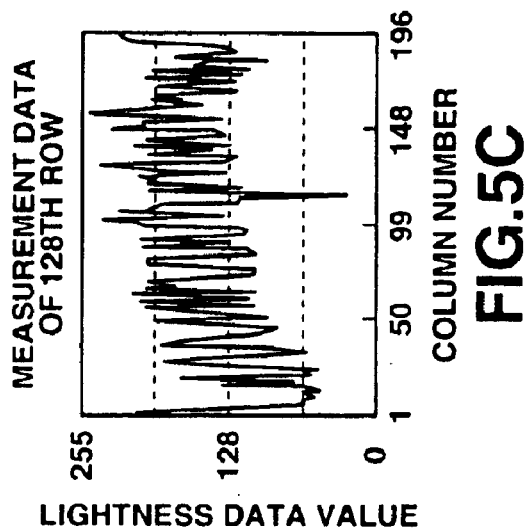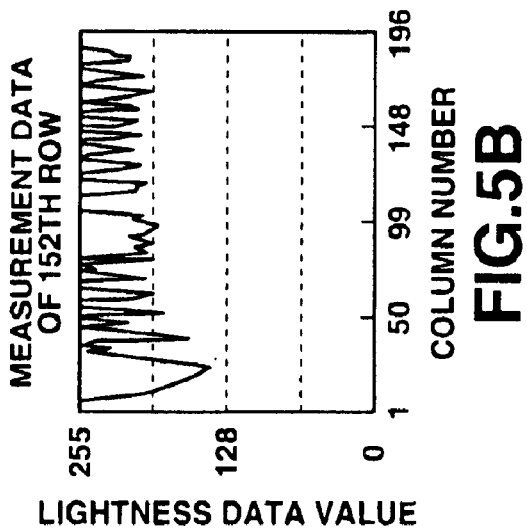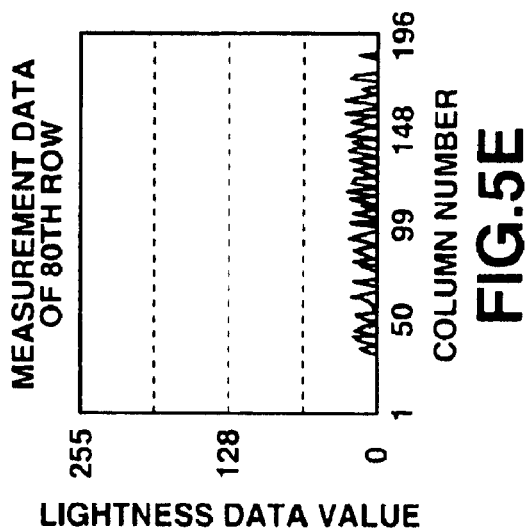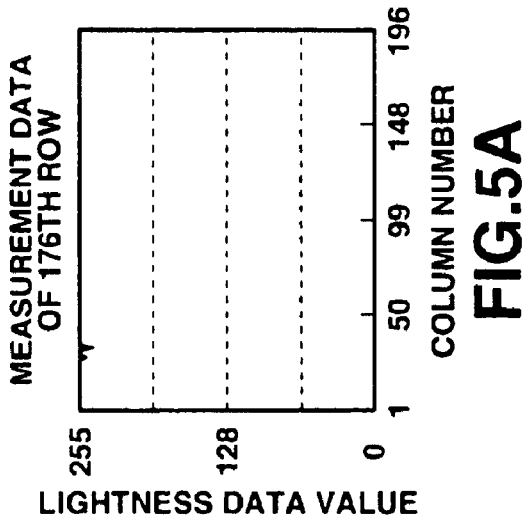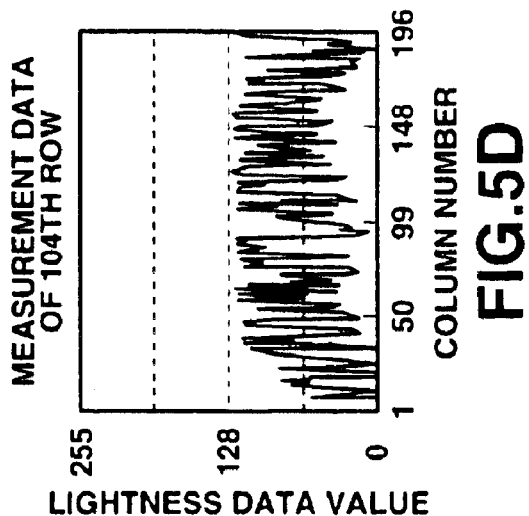

FIG.9A

| ROW NUMBER | 80TH ROW | 104TH ROW | 128TH ROW | 152ND ROW | 176TH ROW |
|---|---|---|---|---|---|
| MAXIMUM VALUE | 23 | 117 | 243 | 255 | 255 |
| MINIMUM VALUE | 0 | 9 | 27 | 193 | 255 |
| DYNAMIC RANGE | 23 | 108 | 216 | 62 | 0 |

FIG.9B

| ROW NUMBER | 1ST ROW | ... | 128TH ROW | ... | 256TH ROW |
|---|---|---|---|---|---|
| CHARGE ACCUMULATING PERIOD | $T_1$ | ... | $T_{128}$ | ... | $T_{256}$ |

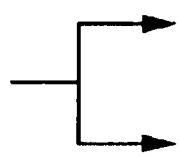

| ROW NUMBER | 64TH ROW | ... | $L_{k-1}$ ROW | $L_k$ ROW | $L_{k+1}$ ROW | ... | 191ST ROW |
|---|---|---|---|---|---|---|---|
| MAXIMUM VALUE | $X_{64}$ | ... | $X_{k-1}$ | $X_k$ | $X_{k+1}$ | ... | $X_{191}$ |
| MINIMUM VALUE | $Y_{64}$ | ... | $Y_{k-1}$ | $Y_k$ | $Y_{k+1}$ | ... | $Y_{191}$ |
| DYNAMIC RANGE | $R_{64}$ | ... | $R_{k-1}$ | $R_{k(MAX)}$ | $R_{k+1}$ | ... | $R_{191}$ |

| ROW NUMBER | 64TH ROW | ... | $L_{k-1}$ ROW | $L_k$ ROW | $L_{k+1}$ ROW | ... | 191ST ROW |
|---|---|---|---|---|---|---|---|
| CHARGE ACCUMLATING PERIOD | $T_{64}$ | ... | $T_{k-1}$ | $T_k$ | $T_{k+1}$ | ... | $T_{191}$ |

FIG.19B

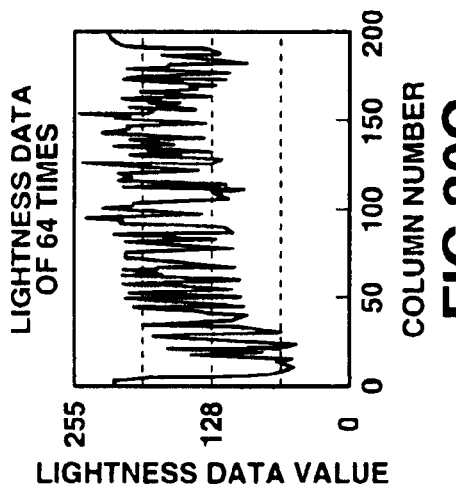
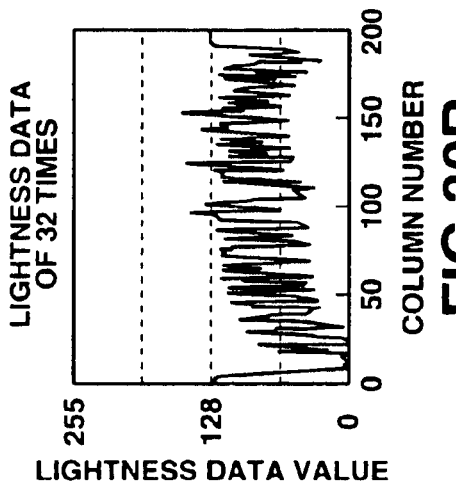
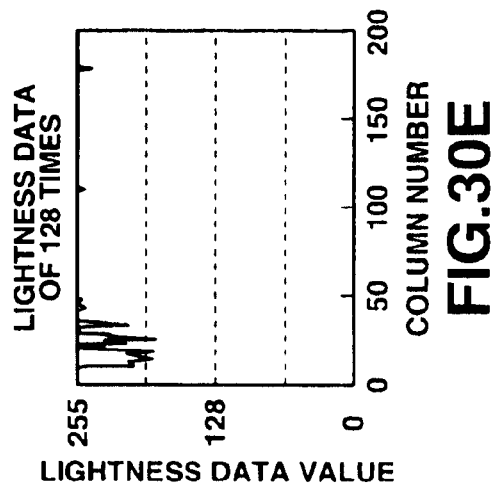
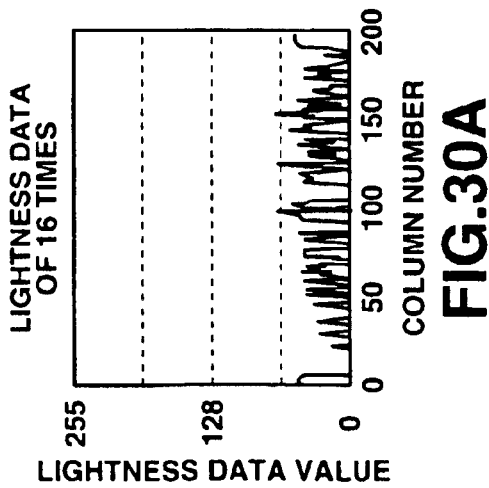
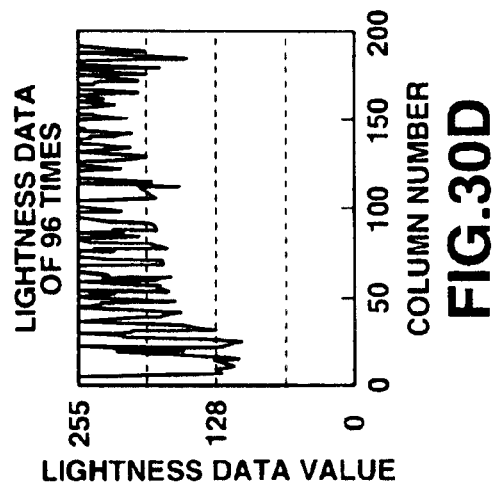

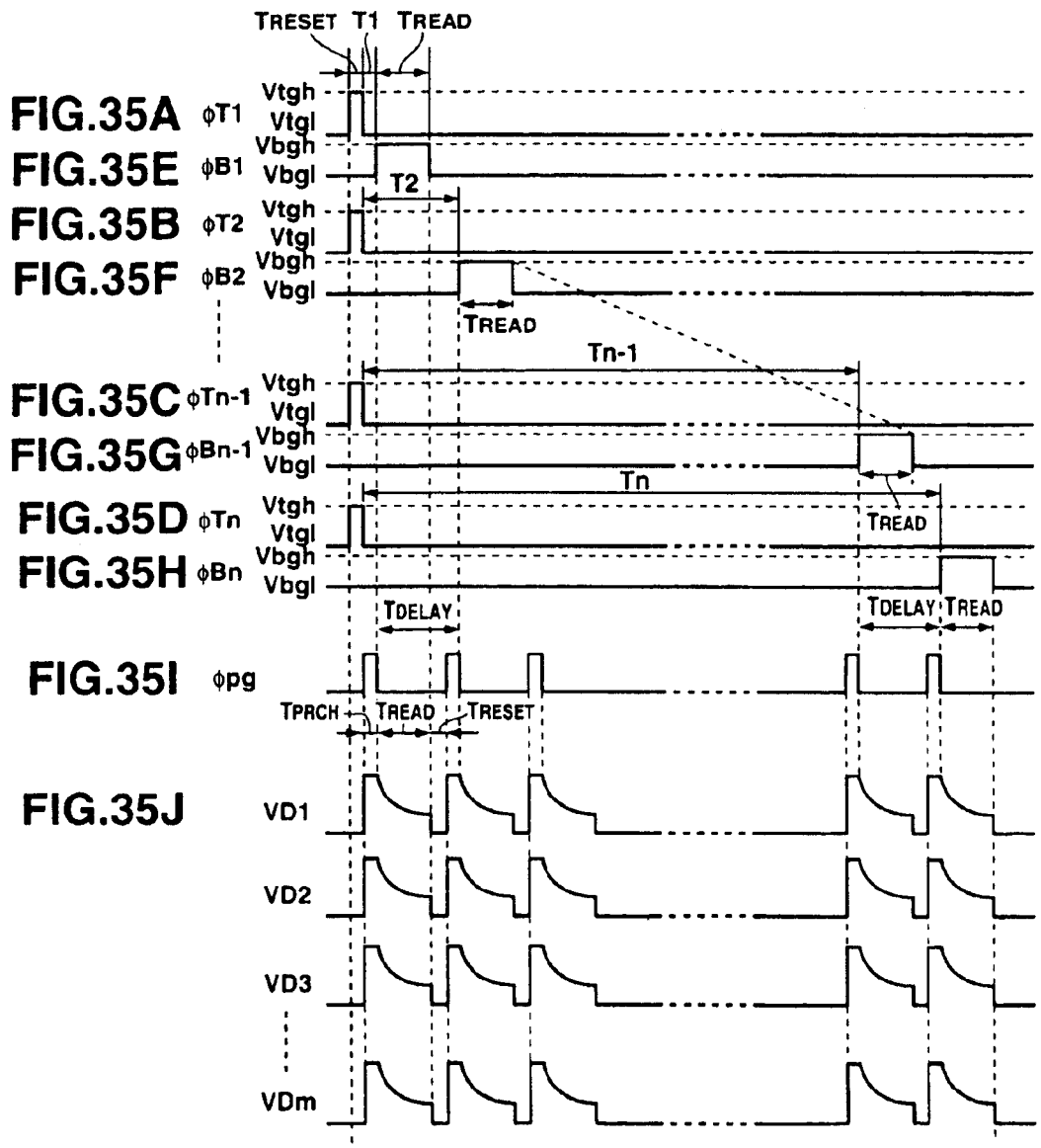

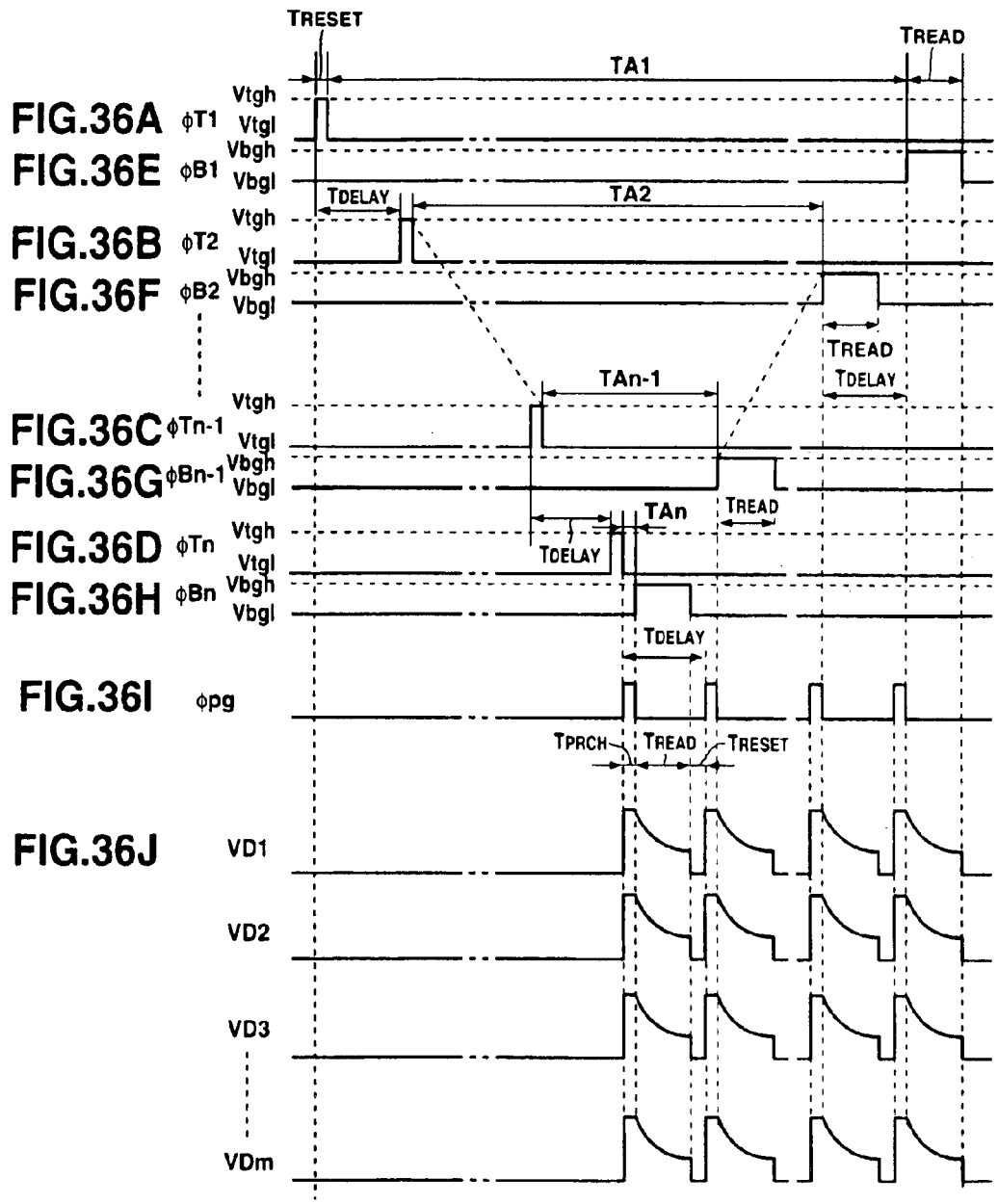

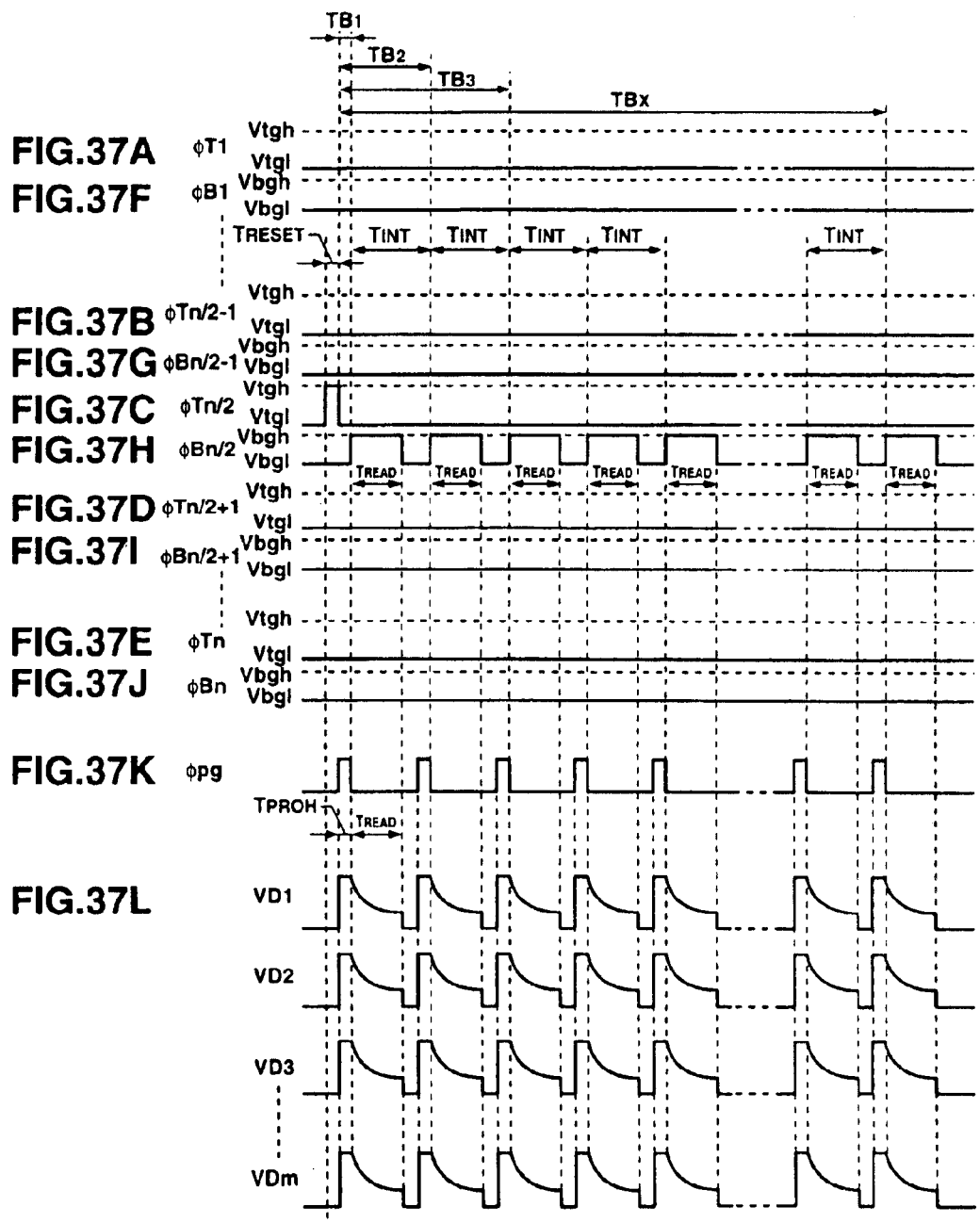

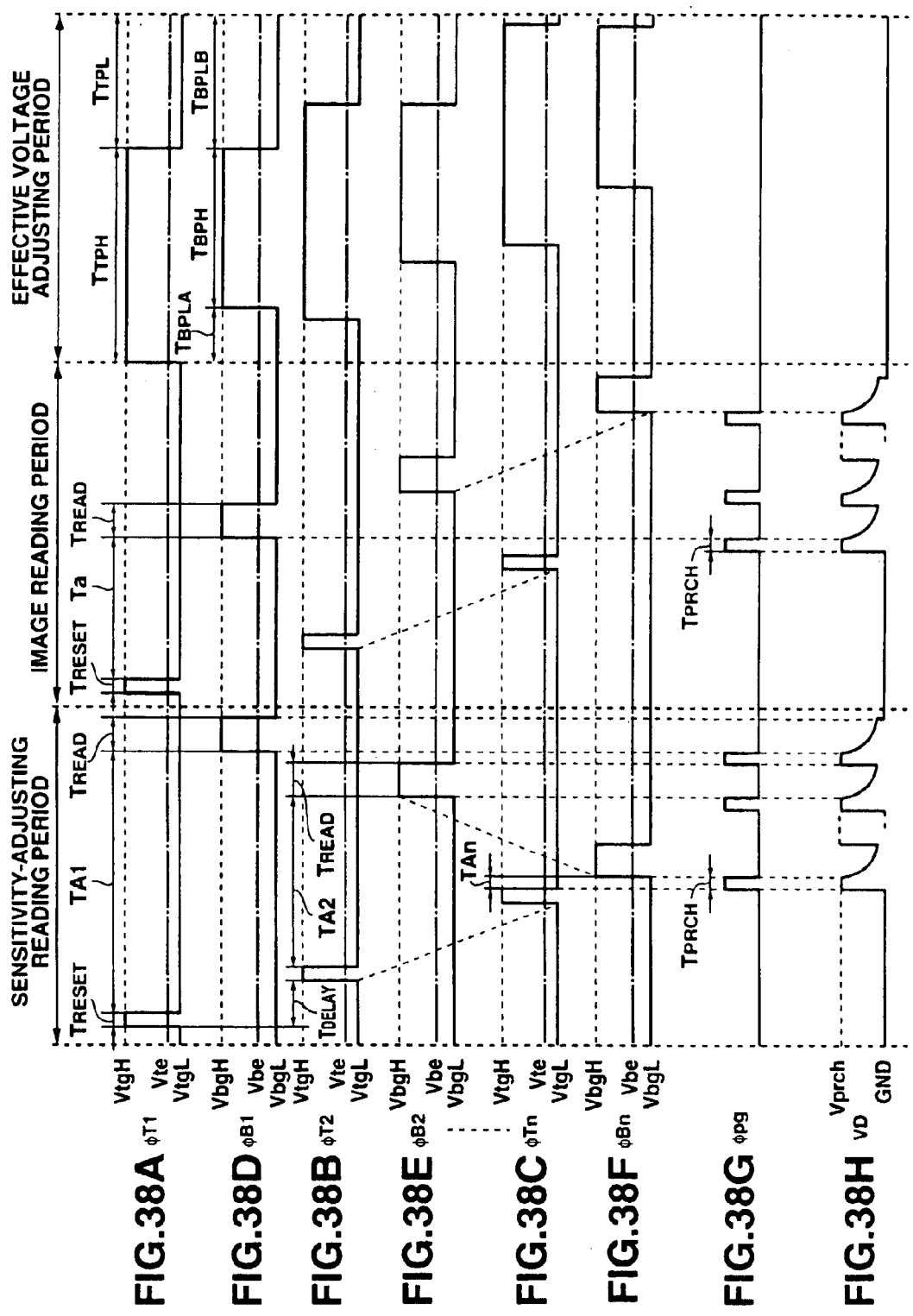

PRIOR ART

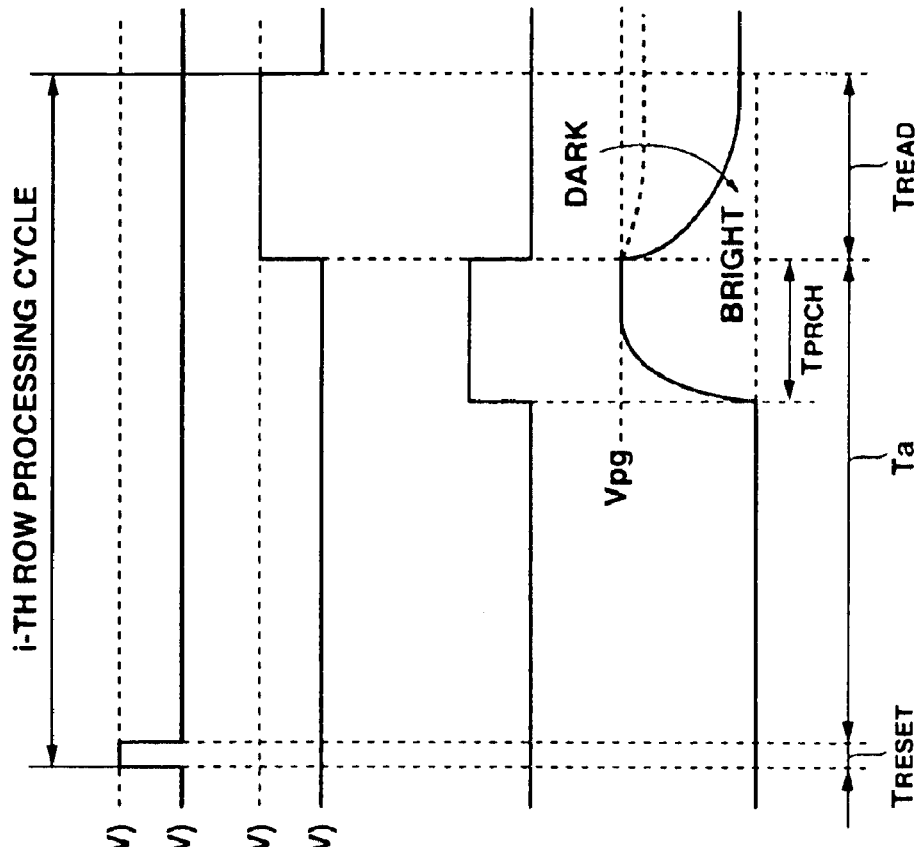

PHOTOSENSOR SYSTEM AND DRIVE CONTROL METHOD THEREOF

CROSS-REFERENCE TO RELATED APPLICATIONS

This application is a continuation-in-part application of application Ser. No. 09/703,025, filed Oct. 31, 2000.

This application is based upon and claims the benefit of priority from the prior Japanese Patent Applications No. 11-316650, filed Nov. 8, 1999; No. 11-319605, filed Nov. 10, 1999; No. 2000-015981, filed Jan. 25, 2000, and No. 2001-198615, filed Jun. 29, 2001, the entire contents of which are incorporated herein by reference.

BACKGROUND OF THE INVENTION

The present invention relates to a photosensor system having a photosensor array constituted by two-dimensionally arraying a plurality of photosensors, and a drive control method thereof.

Imaging apparatuses such as electronic still cameras, video cameras, and the like have come to be very widely used. These imaging apparatuses employ a solid-state imaging device, such as a CCD (Charge Coupled Device), which serves as a photoelectric converting device for converting an image of a to-be-photographed subject into an image signal. As well known, the CCD has a structure in which photosensors (light receiving elements) such as photodiodes, or thin film transistors (TFT: Thin Film Transistor) are arranged in a matrix, and the amount of electron-hole pairs (the amount of charge) generated corresponding to the amount of light entering the light receiving section of each sensor is detected by a horizontal scanning circuit and vertical scanning circuit to detect the luminance of radiation.

In a photosensor system using such a CCD, it is necessary to respectively provide scanned photosensors with selective transistors for causing the scanned photosensor to assume a selected state. In place of the combination of the photosensor and the selective transistor, a photosensor (to be referred to as a double-gate photosensor hereinafter) is now being developed, which is formed of a thin film transistor having a so-called double-gate structure and has both a photosensing function and a selecting function.

FIG. 39A is a sectional view showing the structure of a double-gate photosensor 10. FIG. 39B is a circuit diagram showing the equivalent circuit of the double-gate photosensor 10.

The double-gate photosensor 10 comprises a semiconductor thin film 11 formed of amorphous silicon or the like, $n^+$-silicon layers 17 and 18, source and drain electrodes 12 and 13 respectively formed on the $n^+$-silicon layers 17 and 18, a top gate electrode 21 formed above the semiconductor thin film 11 via a block insulating film 14 and upper gate insulating film 15, a protective insulating film 20 provided on the top gate electrode 21, and a bottom gate electrode 22 provided below the semiconductor thin film 11 via a lower gate insulating film 16. The double-gate photosensor 10 is provided on a transparent insulating substrate 19 formed of glass or the like.

In other words, the double-gate photosensor 10 includes an upper MOS transistor comprised of the semiconductor thin film 11, source electrode 12, drain electrode 13, and top gate electrode 21, and a lower MOS transistor comprised of the semiconductor thin film 11, source electrode 12, drain electrode 13, and bottom gate electrode 22. As shown in the equivalent circuit of FIG. 31B, the double-gate photosensor 10 is considered to include two MOS transistors having a common channel region formed of the semiconductor thin film 11, TG (Top Gate terminal), BG (Bottom Gate terminal), S (Source terminal), and D (drain Terminal).

The protective insulating film 20, top gate electrode 21, upper gate insulating film 15, block insulating film 14, and lower gate insulating film 16 are all formed of a material having a high transmittance of visible light for activating the semiconductor thin film 11. Light entering the sensor from the top gate electrode 21 side passes through the top gate electrode 21, upper gate insulating film 15, and block insulating film 14, and then enters the semiconductor thin film 11, thereby generating and accumulating charges (positive holes) in the channel region.

FIG. 40 is a schematic view showing a photosensor system constituted by two-dimensionally arraying double-gate photosensors 10. As shown in FIG. 40, the photosensor system comprises a sensor array 100 that is constituted of a large number of double-gate photosensors 10 arranged in an n×m matrix, top and bottom gate lines 101 and 102 that respectively connect the top gate terminals TG and bottom gate terminals BG of the double-gate photosensors 10 in a row direction, top and bottom gate drivers 111 and 112 respectively connected to the top and bottom gate lines 101 and 102, data lines 103 that respectively connect the drain terminals D of the double-gate photosensors 10 in a column direction, and an output circuit section 113 connected to the data lines 103.

In FIG. 40, $\phi$tg and $\phi$bg represent control signals for generating a reset pulse $\phi$Ti and readout pulse $\phi$Bi, respectively, which will be described later, and $\phi$pg represents a pre-charge pulse for controlling the timing at which a pre-charge voltage Vpg is applied.

In the above-described structure, as described later, the photosensing function is realized by applying a predetermined voltage from the top gate driver 111 to the top gate terminals TG, while the readout function is realized by applying a predetermined voltage from the bottom gate driver 112 to the bottom gate terminals BG, then sending the output voltage of the photosensors 10 to the output circuit section 113 via the data lines 103, and outputting serial data Vout.

FIGS. 41A to 41D are timing charts showing a method of controlling the photosensor system, and showing a detecting period (i-th row processing cycle) in the i-th row of the sensor array 100. First, a high-level pulse voltage (reset pulse; e.g., Vtg=+15V) $\phi$Ti shown in FIG. 41A is applied to the top gate line 101 of the i-th row, and during a reset period $T_{reset}$, reset operation for discharging the double-gate photosensors 10 of the i-th row is executed.

Subsequently, a bias voltage $\phi$Ti of low level (e.g., Vtg=−15V) is applied to the top gate line 101 of the i-th row, thereby finishing the reset period $T_{reset}$ and starting a charge accumulating period Ta in which the channel region is charged. During the charge accumulating period Ta, charges (positive holes) corresponding to the amount of light entering each sensor from the top gate electrode side are accumulated in the channel region.

Then, a pre-charge pulse $\phi$pg shown in FIG. 41C with a pre-charge voltage Vpg is applied to the data lines 103 during the charge accumulating period Ta, and after a pre-charge period $T_{prch}$ for making the drain electrodes 13 keep a charge, a bias voltage (readout pulse $\phi$Bi) of high level (e.g., Vbg=+10V) shown in FIG. 41B is applied to the bottom gate line 102 of the i-th row. At this time, the double-gate photosensors 10 of the i-th row are turned on to start a readout period $T_{read}$.

During the readout period $T_{read}$, the charges accumulated in the channel region serve to moderate a low-level voltage (e.g., Vtg=−15V) which has an opposite polarity of charges accumulated in the channel region and is applied to each top gate terminal TG. Therefore, an n-type channel is formed by the voltage Vbg at each bottom gate terminal BG, the voltage VD at the data lines 103 gradually reduces in accordance with the drain current with lapse of time after the pre-charge voltage Vpg is applied. More specifically, the tendency of change in the voltage VD at the data lines 103 depends upon the amount of received light in the case where the charge accumulating period Ta is constant. As shown in FIG. 41D, the voltage VD tends to gradually reduce when the incident light is dark, i.e., a small amount of light is received, and hence only small charges are accumulated, whereas the voltage VD tends to suddenly reduce when the incident light is bright, i.e., a large amount of light is received, and hence large charges are accumulated. From this, it is understood that the amount of radiation can be calculated by detecting the voltage VD at the data lines 103 a predetermined period after the start of the readout period $T_{read}$, or by detecting a period required until the voltage VD reaches a predetermined threshold voltage. An image reading sensitivity corresponds to the charge accumulating period Ta. Assuming that the amount of light is constant, the amount of charge accumulated increases and the image reading sensitivity enhanced in accordance with an increase in the charge accumulating period Ta. Likewise, the amount of charge accumulated decreases and the image reading sensitivity degraded in accordance with a decrease in the charge accumulating period Ta.

Image reading is performed by sequentially executing the above-described drive-control for each line of the sensor array 100, by executing the control for each line in a parallel manner at different timings at which the driving pulses do not overlap.

Although the case of using the double-gate photosensor as a photosensor has been described above, even a photosensor system using a photodiode or phototransistor as a photosensor has operation steps: reset operation→charge accumulating operation→pre-charge operation→reading operation, and uses a similar drive sequence. The conventional photosensor system as above has the following problems.

(1) To read a subject image in various use environments in a photosensor system using the above-described photosensor, the image reading sensitivity (charge accumulating period) must be properly set. The proper image reading sensitivity changes depending on changes in ambient conditions such as the illuminance of external light in a use environment, and also changes when the characteristics of the photosensor change. In the prior art, therefore, a circuit for detecting the illuminance of external light must be additionally arranged. Alternatively, a subject image is read at different image reading sensitivities before the start of normal reading operation of that subject image, and an optimal image reading sensitivity must be determined on the basis of a read result. However, a reading sensitivity setting method of unconditionally and automatically setting a proper image reading sensitivity based on a read result for every image reading sensitivity that is obtained by operations executed at different image reading sensitivities, has not been developed yet.

(2) If a foreign substance attaches to the sensing surface of a photosensor or a defect is generated in a photosensor element in setting the reading sensitivity based on the result of the sensitivity-adjusting reading operation, and a read result obtained for each image reading sensitivity obtained in the reading operation is directly used, an abnormal value is contained in the read result, leading to failure to set a proper image reading sensitivity and to inhibit accurate reading operation of a subject image. For example, when this photosensor system is applied to a fingerprint reading apparatus, the apparatus may malfunction in fingerprint recognition processing.

BRIEF SUMMARY OF THE INVENTION

It is an object of the present invention to provide a reading sensitivity setting method of unconditionally and automatically setting a proper image reading sensitivity in order to accurately read a subject image in various use environments in a photosensor system. The present invention is advantageous in that any malfunction in setting the image reading sensitivity is prevented even if a foreign substance attaches to the sensing surface of a photosensor, or a photosensor element becomes defective.

To achieve the above advantage, a photosensor system according to the present invention comprises: a photosensor array constituted by two-dimensionally arranging a plurality of photosensors; an image reader which read a subject image by use of the photosensor array; a sensitivity-adjusting reader which read the subject image while changing the image reading sensitivity of the photosensor array stepwise; optimal image reading sensitivity extracting means for extracting an optimal image reading sensitivity suitable for the image reading operation on the basis of a predetermined measurement amount relating to an image pattern of the subject image read by the sensitivity-adjusting reader; and reading sensitivity-setting means for setting the optimal image reading sensitivity to a reading sensitivity of the image reader.

According to the first reading sensitivity setting method of the present invention, the sensitivity-adjusting reader executes sensitivity-adjusting reading operation at a plurality of stages for, e.g., respective rows. The optimal image reading sensitivity-extracting means extracts an image reading sensitivity that allows the dynamic range of the measurement amount of each row to become maximal, on the basis of the predetermined measurement amount regarding the image pattern of the subject image. Alternatively, the optimal image reading sensitivity-extracting means extract a row in which the dynamic range becomes maximal and a displacement of the dynamic range between image reading sensitivity becomes minimal. The row is extracted in accordance with the dynamic range that is determined for each image reading sensitivity after high-frequency components corresponding to a change in the dynamic range of the measurement amount of each row have been removed. The reading sensitivity-setting means sets the image reading sensitivity corresponding to the extracted row as an optimal sensitivity. This can reduce the amount of data subjected to the extraction processing of the optimal image reading sensitivity, simplify sensitivity setting processing, and shorten the required time. Even when the ambient light or the characteristics of the photosensor change, an optimal image reading sensitivity can be set in accordance with the changes. In addition, a suitable image reading sensitivity can be extracted without being adversely affected by a foreign substance attached to the sensing surface of the photosensor array, an abnormal pixel due to a defective element included in the photosensor element, or the like.

According to the second reading sensitivity setting method of the present invention, the sensitivity-adjusting reader changes the image reading sensitivity stepwise with respect to the photosensors of a specific row section of the photosensor array, and sensitivity-adjusting reading operation is performed by reading a subject image portion corresponding to the specific row section. Owing to this, the time needed for the sensitivity-adjusting reading operation can be as short as possible. In addition, the amount of data used for the extraction of an optimal image reading sensitivity can be significantly reduced, thereby shortening the processing time.

In this case, abnormal pixel determining element is provided for determining whether or not any abnormal pixel exists in a specific row section by checking if the measurement amount pertaining to the specific row section and corresponding to each column changes when the image reading sensitivity is switched from one to another. Sensitivity-adjusting read controlling means is also provided for executing sensitivity-adjusting reading operation for a specific row section other than the specific row section where the abnormal pixel is determined to exist. With this structure, even if an abnormal pixel exists in the specific row section for which the sensitivity-adjusting reading operation is performed, another specific row section is selected to avoid the adverse effects the abnormal pixel may have.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A to 5E are graphs each showing changes in lightness data in a specific row that are obtained by sensitivity-adjusting reading operation in the first embodiment;

FIGS. 9A and 9B are tables showing the relationship between a table representing the dynamic range of lightness data of each row that is obtained by sensitivity-adjusting reading operation in the modification of the first embodiment, and a corresponding row number vs. image reading sensitivity correspondence table;

FIGS. 13A and 13B are views showing the relationship between a table representing the differentiated value of lightness data between rows in a predetermined column that is obtained by sensitivity-adjusting reading operation in the second embodiment, and a corresponding row number vs. image reading sensitivity correspondence table;

FIGS. 18A and 18B are views showing the relationship between a table representing the dynamic range of each row and the linearly differentiated value of the dynamic range that are obtained by sensitivity-adjusting reading operation in the third embodiment, and a corresponding row number vs. image reading sensitivity correspondence table;

FIGS. 19A and 19B are views showing the relationship between a table representing the dynamic range of each row and a corresponding row number vs. image reading sensitivity correspondence table when the first embodiment is applied to image data read by sensitivity-adjusting reading operation in the third embodiment;

FIGS. 30A to 30E are graphs showing how lightness data on a specific row section changes in the sixth embodiment, in relation to the number of times the reading operation is performed;

FIGS. 35A to 35J are timing charts showing the first embodiment of an image reading sensitivity setting method applied to sensitivity-adjusting reading operation executed in each of the first to fifth embodiments;

FIGS. 36A to 36J are timing charts showing the second embodiment of an image reading sensitivity setting method applied to sensitivity-adjusting reading operation executed in each of the first to fifth embodiments;

FIGS. 37A to 37L are timing charts illustrating an image reading sensitivity-setting method that is applicable to the sensitivity-adjusting reading operation executed according to the sixth and seventh embodiments;

FIGS. 38A to 38H are timing charts showing an embodiment when an effective voltage adjusting period is set after sensitivity-adjusting reading operation and image reading periods in a photosensor system drive control method according to the present invention;

FIGS. 41A to 41D are timing charts showing a conventional drive method for the double-gate photosensor system.

DETAILED DESCRIPTION OF THE INVENTION

Methods of controlling a photosensor system according to the present invention will be described in detail with reference to the several views of the accompanying drawings. Although in embodiments described below, a double-gate photosensor is applied as a photosensor, the present invention is not limited to the double-gate photosensor, but is also applicable to a photosensor system using another type of photosensor.

Figure 1:
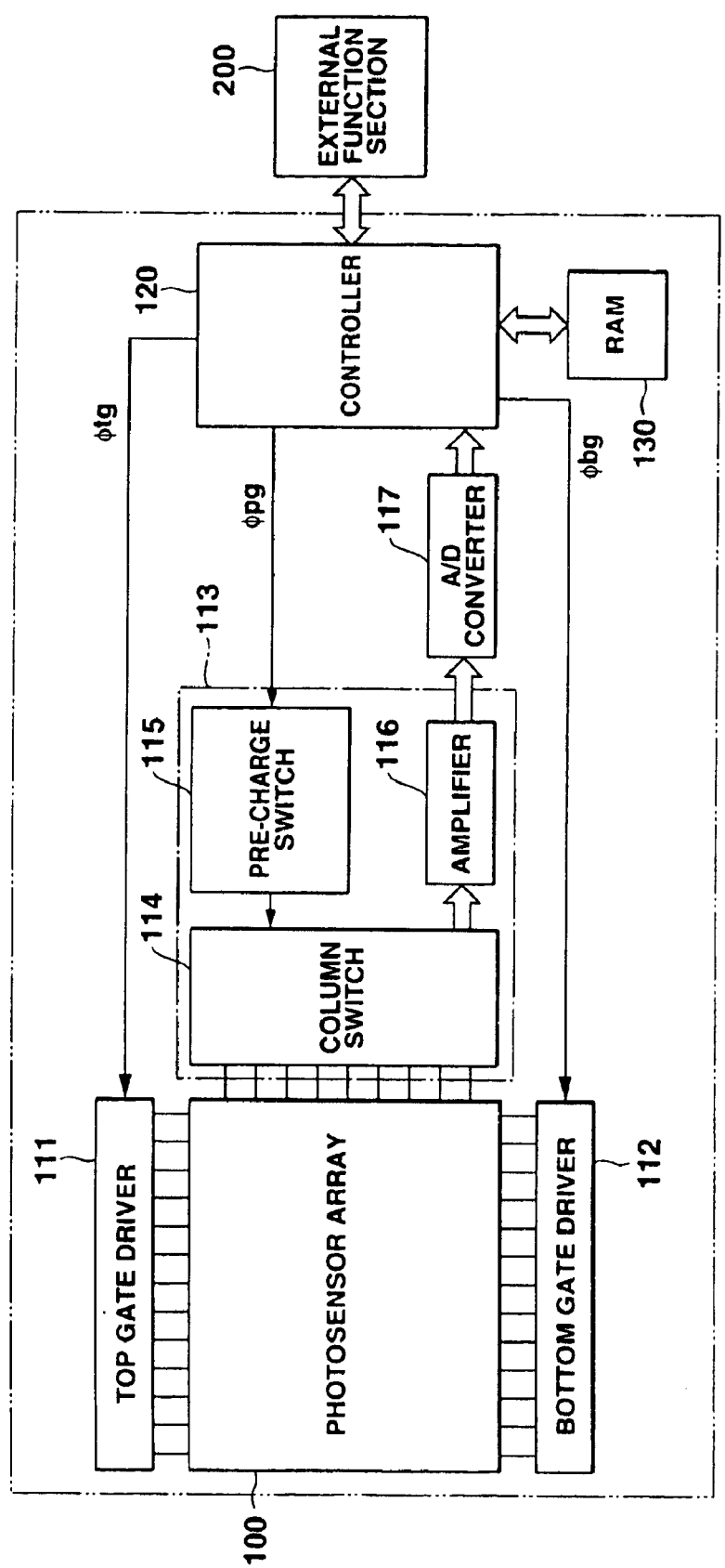
FIG. 1 is a block diagram showing an arrangement of a photosensor system according to the present invention.
Figure 39A:
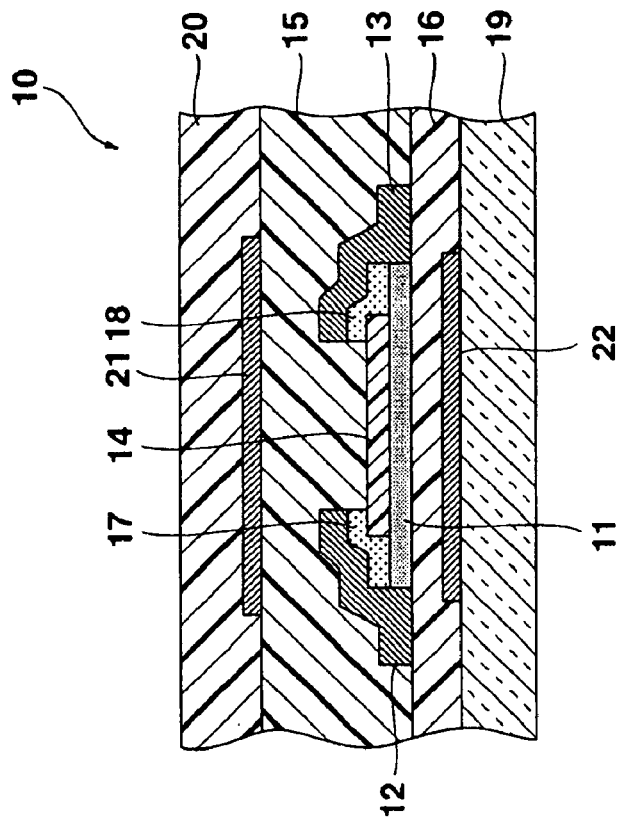
FIG. 39A is a sectional view showing the structure of a conventional double-gate photosensor.
Figure 39B:
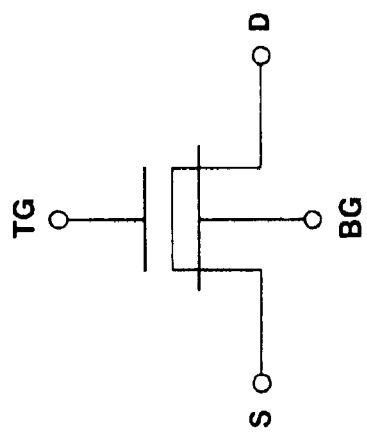
FIG. 39B is an equivalent circuit diagram showing the double-gate photosensor.

FIG. 1 is a block diagram showing an arrangement of a photosensor system according to the present invention. The double-gate photosensor shown in FIG. 39A is used, and the arrangement of the photosensor system shown in FIG. 40 will be referred to if necessary. The same reference numerals as in the photosensor system shown in FIG. 40 denote the same parts.

As shown in FIG. 1, the photosensor system according to an embodiment comprises a photosensor array 100 including double-gate photosensors 10 shown in FIG. 39A that are arrayed two-dimensionally, a top gate driver 111 for applying a predetermined reset pulse to a top gate terminal TG of each double-gate photosensor 10 at a predetermined timing, a bottom gate driver 112 for applying a predetermined readout pulse to a bottom gate terminal BG of each double-gate photosensor 10 at a predetermined timing, an output circuit section 113 constituted by an amplifier 116, and a column switch 114 and pre-charge switch 115 for reading a data line voltage and applying a pre-charge voltage to each double-gate photosensor 10, respectively, an analog/digital converter (to be referred to as an A/D converter hereinafter) 117 for converting the read data voltage as an analog signal into image data as a digital signal, a controller 120 which is adopted to control the operation of reading a subject image by the photosensor array 100, and to exchange data with an external function section 200, and which controls sensitivity setting in the present invention, and a RAM 130 that stores, for example, read image data, data relating to setting of a reading sensitivity described later.

Figure 40:
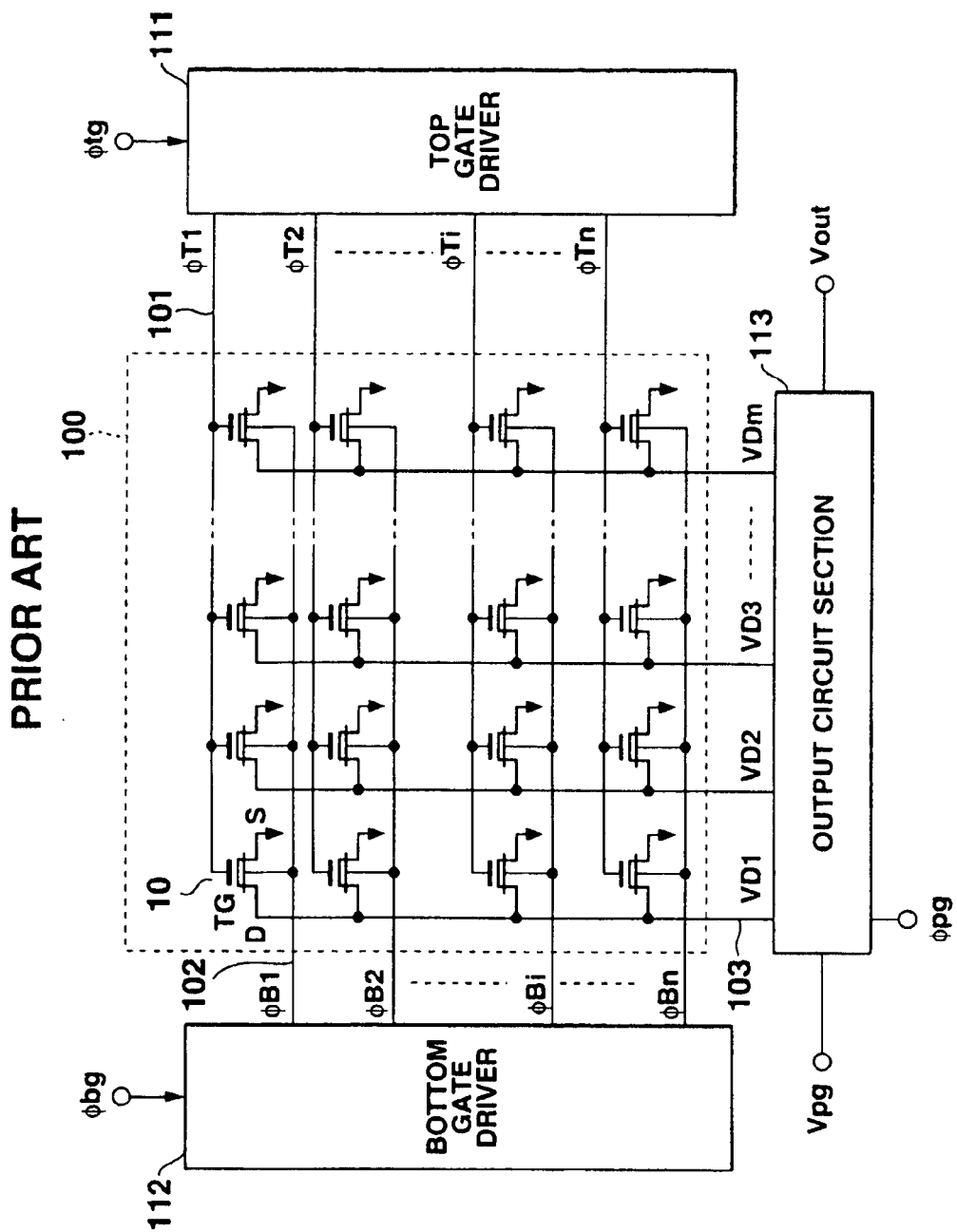
FIG. 40 is a schematic view showing a photosensor system constituted by two-dimensionally arraying double-gate photosensors.

The structure including the photosensor array 100, top gate driver 111, bottom gate driver 112, and output circuit section 113 is the same as and has the same function as the photosensor system shown in FIG. 40. In addition to this structure, this embodiment adopts the A/D converter 117, controller 120, and RAM 130 to enable various types of control as described below.

The controller 120 outputs control signals φtg and φbg to the top and bottom gate drivers 111 and 112, respectively, which, in turn, output predetermined voltages (reset pulse and readout pulse) to the top gate terminal TG and bottom gate terminal BG of each double-gate photosensor 10 of the photosensor array 100, respectively. The controller 120 also outputs a control signal φpg to the pre-charge switch 115 to control execution of the operation of reading a subject image. A data line voltage read from the photosensor array 100 via the column switch 114 and amplifier 116 is converted into a digital signal by the A/D converter 117, and supplied as image data. The controller 120 also has a function of executing predetermined image processing for image data, writing or reading image data into or from the RAM 130. The controller 120 serves as an interface with the external function section 200 that executes predetermined processing such as image data identification, modification, and the like.

The controller 120 has another function of controlling control signals to be output to the top and bottom gate drivers 111 and 112 to set an optimal reading sensitivity for reading a subject image in accordance with ambient environments such as the illuminance of external light, i.e., an optimal charge accumulating period for each double-gate photosensor 10.

As will be described below, photosensor system drive control methods according to embodiments of the present invention are based on the arrangement of this photosensor system.

<First Embodiment>

The first embodiment of the photosensor system drive control method according to the present invention will be described with reference to the several views of the accompanying drawing.

Figure 2:
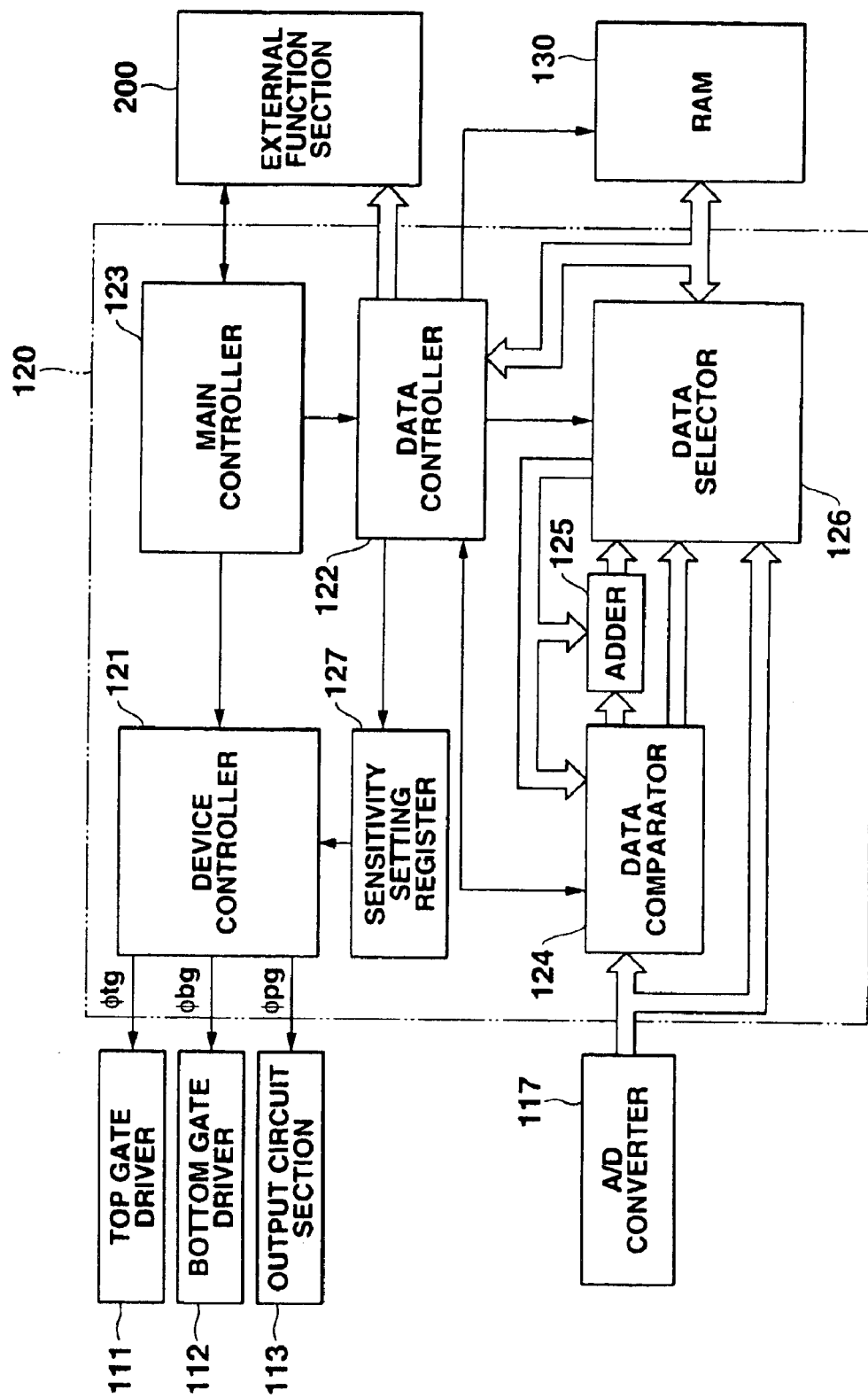
FIG. 2 is a block diagram showing an arrangement of a controller applied to the first embodiment.

FIG. 2 is a block diagram showing an arrangement of a controller 120 applied to the first embodiment. As shown in FIG. 2, the controller 120 comprises a device controller 121 for controlling a top gate driver 111, bottom gate driver 112, and output circuit section 113, a data controller 122 for managing various data such as image data, write data, and readout data to the RAM 130, and a main controller 123 which supervises the controllers 121 and 122 and interfaces with an external function section.

The controller 120 further comprises a data comparator 124 for comparing the sizes of specific measurement data based on image data input as a digital signal from a photosensor array 100 via an A/D converter 117 to extract maximum and minimum values, an adder 125 having a function of calculating, e.g., the difference between measurement data, a data selector 126 for receiving processed image data via the A/D converter 117, data comparator 124, and adder 125, and switching write/readout in/from the RAM, re-input to the data comparator 124 and adder 125, and output to the external function section via the data controller 122 in accordance with the received data, and a sensitivity setting register 127 for changing control signals to be output from the device controller 121 to the top and bottom gate drivers 111 and 112 so as to optimize the reading sensitivity of the photosensor array on the basis of a control signal from the data controller 122.

Figure 3:
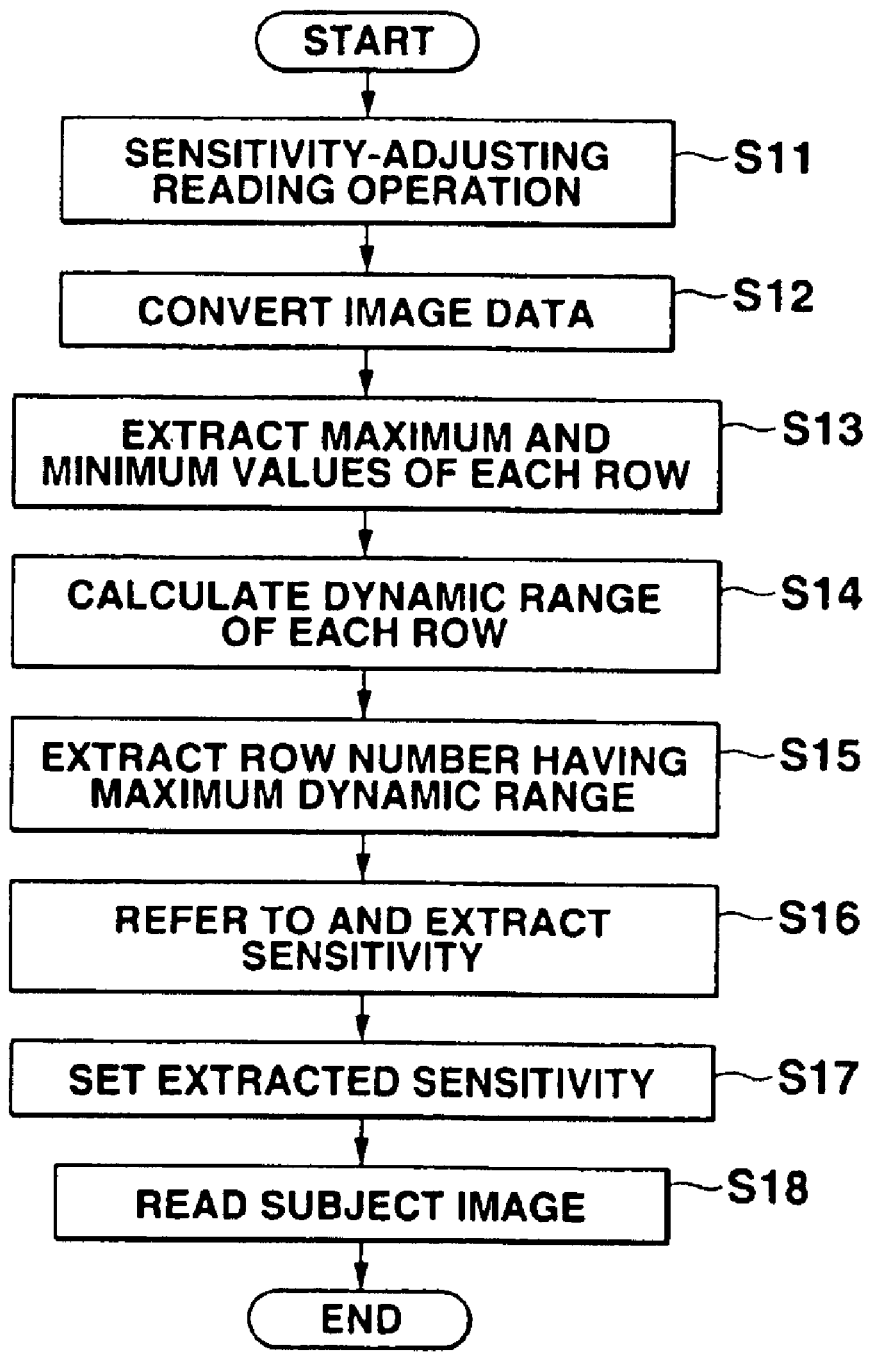
FIG. 3 is a flow chart showing operation of the first embodiment.

The operation of the first embodiment in the operation control method of the photosensor system using the above controller 120 will be explained with reference to FIG. 3. FIG. 3 is a flow chart showing an operation up to read of a subject image with an optimal sensitivity according to the first embodiment in operation control of the photosensor system. This operation will be described by properly referring to the arrangement of the photosensor system shown in FIGS. 1 and 2.

In S11 (sensitivity-adjusting reading operation) of FIG. 3, the main controller 123 controls to set an image reading sensitivity for sensitivity-adjusting reading operation in the sensitivity setting register 127 via the data controller 122, and executes sensitivity-adjusting reading operation for a subject image. These operations are executed prior to normal reading operation of a subject image, for example. Similar to normal image reading operation, the sensitivity-adjusting reading operation is done by executing a series of processes: reset operation→charge accumulating operation→pre-charge operation→readout operation. In the pre-reading operation, the image reading sensitivity is changed stepwise for, e.g., respective rows of a subject image so as to read one subject image at a plurality of different sensitivities. The image reading sensitivities of respective rows are stored in the RAM 130 in, e.g., a table format (row number vs. image reading sensitivity correspondence table) in correspondence with row numbers. A detailed image reading sensitivity setting method will be described later.

In S12 (image data conversion step) of FIG. 3, the image data read by the sensitivity-adjusting reading operation is converted into a digital signal via the amplifier 116 and A/D converter 117, and input as lightness data corresponding to the bright/dark pattern of the subject image to the data comparator 124. In this case, the lightness data is expressed by, e.g., 256 gray levels.

In S13 (step of extracting the maximum and minimum values of each row) of FIG. 3, the data comparator 124 extracts the maximum and minimum values of each row from the lightness data input to the data comparator 124, and outputs them to the adder 125. That is, the data comparator 124 extracts lightness data representing a maximum value (gray level value of the brightest pixel) contained in each row, and lightness data representing a minimum value (gray level value of the darkest pixel).

In S14 (step of calculating the dynamic range of each row) of FIG. 3, the adder 125 calculates as a dynamic range the difference between the maximum and minimum values of lightness data of each row, and stores the dynamic range in the RAM 130 via the data selector 126. The adder 125 executes dynamic range calculation processing for all the rows.

In S15 (step of extracting a row number having a maximum dynamic range) of FIG. 3, the dynamic ranges of respective rows stored in the RAM 130 are read out via the data selector 126, and input to the data comparator 124, which extracts a row number having the maximum dynamic range among the dynamic ranges of the respective rows.

In S16 (sensitivity referring/extraction step) of FIG. 3, the row number vs. image reading sensitivity correspondence table stored in the RAM 130 is looked up based on the row number having the maximum dynamic range, and an image reading sensitivity, i.e., charge accumulating period set for this row is extracted.

In S17 (extracted sensitivity setting step) of FIG. 3, the data controller 122 rewrites the sensitivity setting register 127 to set the image reading sensitivity in the sensitivity setting register 127 to the extracted image reading sensitivity.

In S18 (subject image reading step) of FIG. 3, normal reading operation of a subject image is executed at the extracted image reading sensitivity set in the sensitivity setting register 127.

An example of applying the first embodiment of the photosensor system drive control method using the above-described controller 120 to a fingerprint reading apparatus will be described with reference to FIGS. 4 to 6B.

Figure 4:
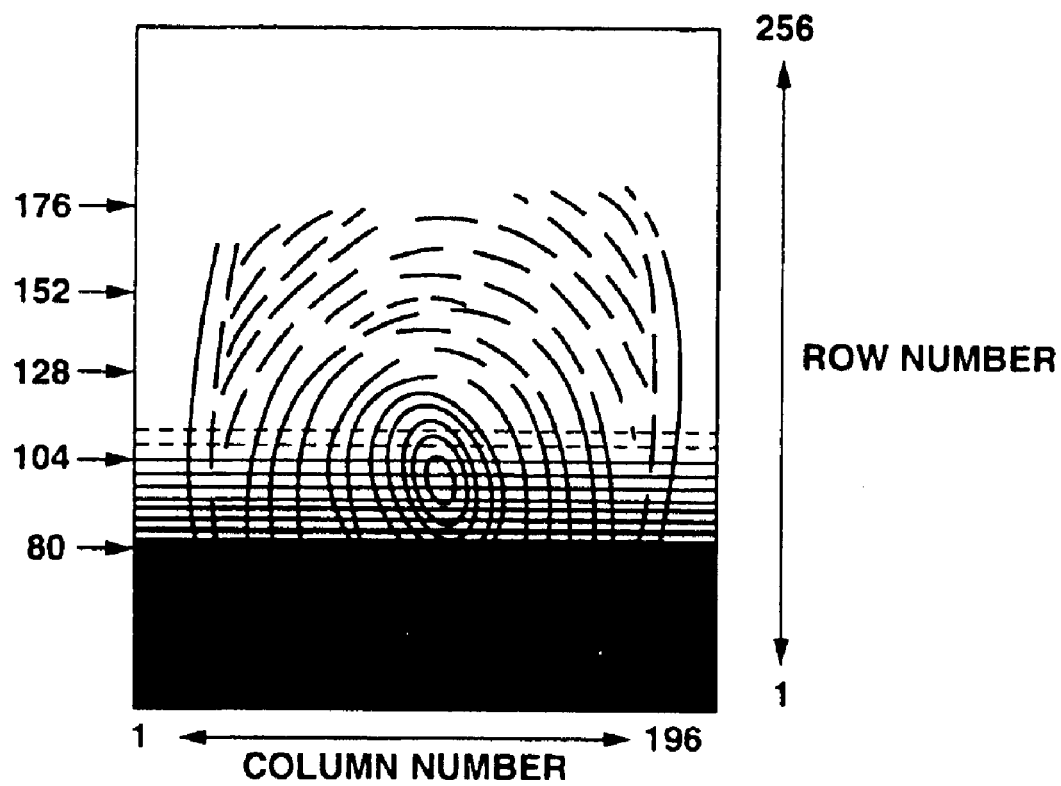
FIG. 4 is a view showing an example of image data when a fingerprint image is read by sensitivity-adjusting reading operation in the first embodiment.
Figures 6A, 6B:
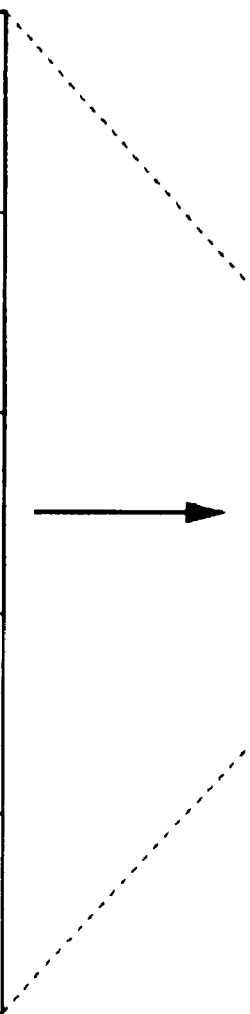
FIGS. 6A and 6B are views showing the relationship between a table representing the dynamic range of lightness data of each row that is obtained by sensitivity-adjusting reading operation in the first embodiment, and a corresponding row number vs. image reading sensitivity correspondence table.

FIG. 4 is a view showing an example of fingerprint image data when a subject (fingerprint) image is read while the image reading sensitivity is changed stepwise for respective rows in sensitivity-adjusting reading operation. FIGS. 5A to 5E are graphs each showing changes in lightness data in several rows that are based on the subject image data obtained by the sensitivity-adjusting reading operation. FIGS. 6A and 6B are views for illustrating tables showing the relationship between the dynamic range of lightness data of each row that is obtained by pre-reading operation, and a row number vs. image reading sensitivity correspondence table. Assume that image data is read out in units of a matrix pattern of 256 rows×196 columns. A larger lightness data value represents a brighter image, and a smaller lightness data value represents a darker image. In the sensitivity-adjusting reading operation, the image reading sensitivity is set higher (charge accumulating period is set longer) for a larger row number (upward in FIG. 4), and lower (charge accumulating period is set shorter) for a smaller row number (downward in FIG. 4). In FIG. 4, as the row number increases (upward in FIG. 4), the ridge/valley pattern of the fingerprint becomes weaker under the influence of external light, and at last is read as an almost invisibly bright image. On the other hand, as the row number decreases (downward in FIG. 4), the ridge/valley pattern of the fingerprint becomes darker, and at last is read as an almost invisibly dark image. The lightness data level is expressed by 256 gray levels, and its lower and upper limit values are set to 0 and 255, respectively.

In this image data, changes in lightness data in the 176th, 152nd, 128th, 104th, and 80th rows are extracted, and plotted as shown in FIGS. 5A to 5E. In the 176th row, as shown in FIG. 5A, the sensitivity is set high, so that lightness data substantially converges to the upper limit value and hardly provides any information as image data. In the 152nd row, as shown in FIG. 5B, the sensitivity is set relatively high, lightness data reaches the upper limit value in some columns, and all the ridge/valley (bright/dark) patterns of image data cannot be read. To the contrary, in the 128th row, as shown in FIG. 5C, lightness data does not reach either the upper or lower limit value on all the columns, and is distributed between the upper and lower limit values. In the 104th row, as shown in FIG. 5D, the sensitivity is set relatively low, and most of lightness data is distributed between the upper and lower limit values. However, lightness data reaches the lower limit value on some columns, and all the ridge/valley patterns of image data cannot be read. In the 80th row, as shown in FIG. 5E, the sensitivity is set low, so that lightness data substantially converges to the lower limit value and hardly provides any information as image data.

Maximum and minimum values are extracted as numerical data on the basis of changes in the lightness data distribution of each of the respective rows shown in FIGS. 5A to 5E, and the dynamic range is calculated as the difference and listed on a table as shown in FIG. 6A. In the 176th and 152nd rows, lightness data reaches the upper limit. Since the maximum value is fixed to 255, the dynamic range depends on the minimum value. In the 104th and 80th rows, lightness data reaches the lower limit. Since the minimum value is fixed to 0, the dynamic range depends on the maximum value. In contrast, in the 128th row, lightness data does not reach either the upper or lower limit, and thus the dynamic range depends on the difference between the maximum and minimum values of the lightness data. The 128th row can attain the largest dynamic range, compared to the 176th, 152nd, 104th, and 80th rows. In other words, it can be determined that lightness data in the 128th row is image data having a fine contrast corresponding to the ridge/valley pattern of a fingerprint, and an optimal image reading sensitivity is set.

The RAM 130 stores the row number vs. image reading sensitivity correspondence table shown in FIG. 6B, and stores image reading sensitivities, i.e., charge accumulating periods $T_1$ to $T_{256}$ for respective row numbers.

The row number vs. image reading sensitivity correspondence table is looked up for the 128th row having the maximum dynamic range, thereby obtaining an image reading sensitivity, i.e., charge accumulating period $T_{128}$ set for the 128th row.

If a subject (fingerprint) image is read using the obtained charge accumulating period $T_{128}$, the image can be satisfactorily read.

The first embodiment has exemplified only the 176th, 152nd, 128th, 104th, and 80th rows as rows subjected to extraction and calculation processes of the dynamic range of lightness data. As a matter of course, the same processes can be executed for all 256 rows. When extraction and calculation processes of the dynamic range of lightness data are performed not for all the rows but for only selected specific rows, like this embodiment, the number of data to be processed can be decreased to simplify processing and shorten the time required for sensitivity setting processing, and the operation can quickly shift to normal reading operation of a subject image.

Figure 7:
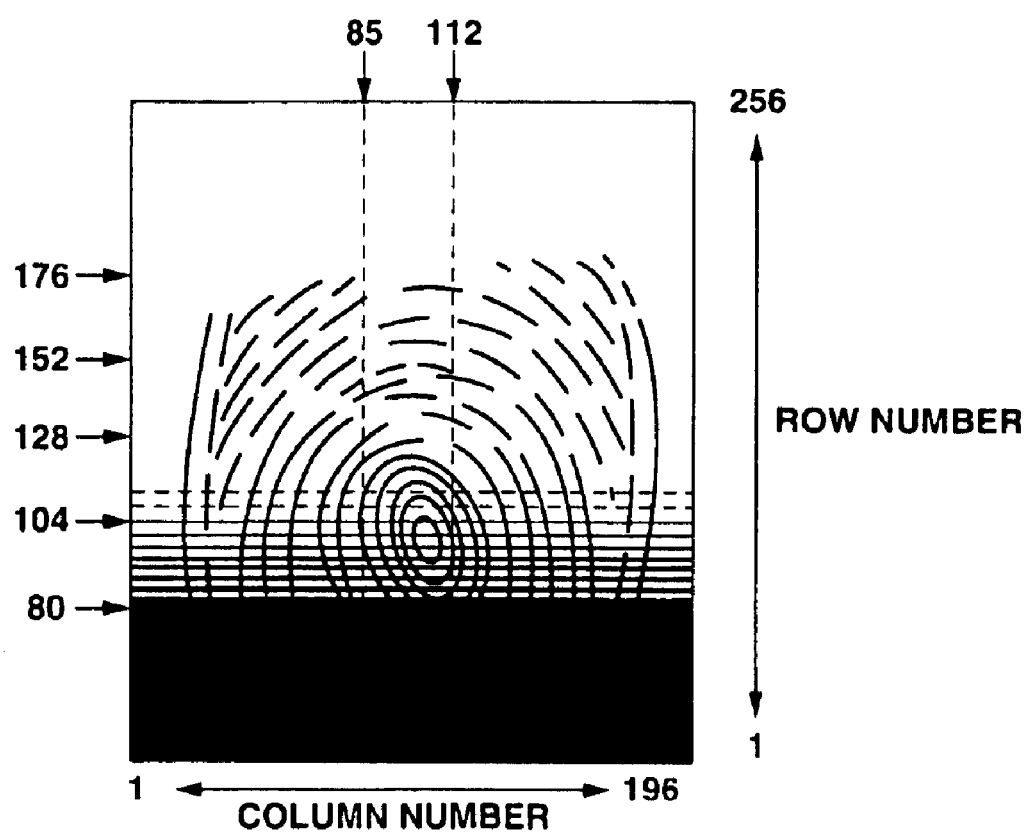
FIG. 7 is a view showing another example of image data when a fingerprint image is read by sensitivity-adjusting reading operation in a modification of the first embodiment.
Figure 8C:
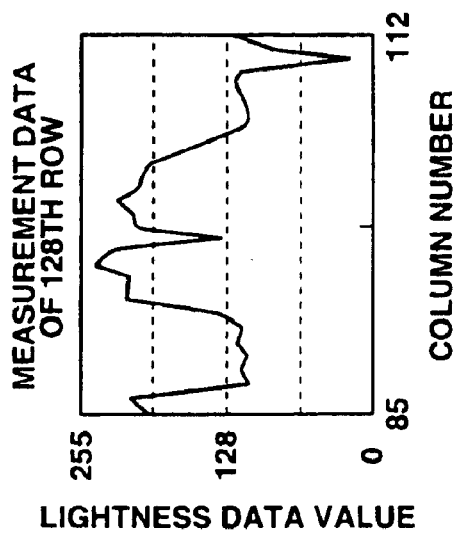
FIGS. 8A to 8E are graphs each showing changes in lightness data in the column range of a specific region in a specific row that are obtained by sensitivity-adjusting reading operation in the modification of the first embodiment.
Figure 8B:
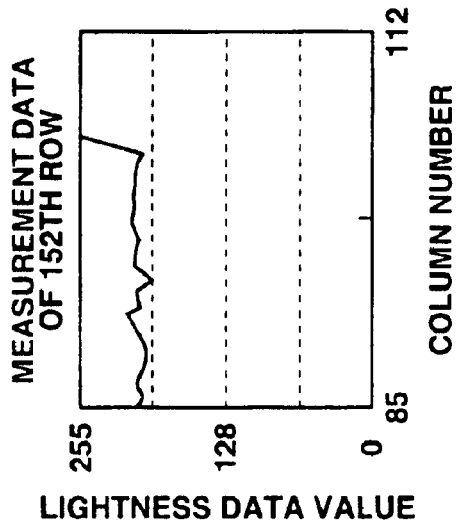
Figure 8E:
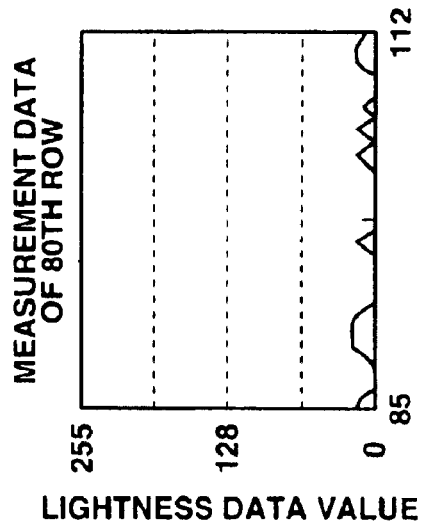
Figure 8A:
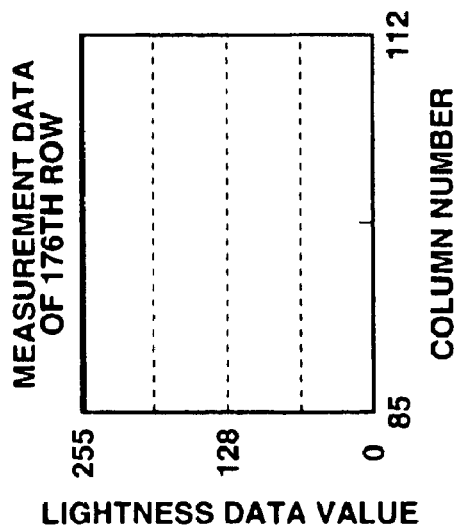
Figure 8D:
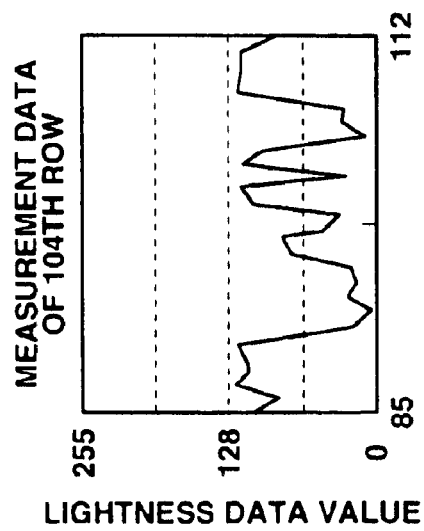

A modification of the first embodiment will be described with reference to FIGS. 7, 8A to 8E, 9A, and 9B. FIG. 7 is a view showing another example of fingerprint image data when a subject (fingerprint) image is read while the image reading sensitivity is changed stepwise for respective rows in sensitivity-adjusting reading operation. FIGS. 8A to 8E are graphs each showing changes in lightness data in the column range of a specific region in several rows that are based on the subject image data obtained by the sensitivity-adjusting reading operation. FIGS. 9A and 9B are tables showing the relationship between the dynamic range of lightness data of each row that is obtained by the sensitivity-adjusting reading operation, and a row number vs. image reading sensitivity correspondence table. In this modification, unlike the first embodiment, lightness data of each row used to extract maximum and minimum values is limited to the column range of a specific region, and maximum and minimum values in this column range are extracted.

More specifically, in reading the ridge/valley pattern of a fingerprint as a subject image, the peripheral portion of a finger (region representing the edge of a finger in FIG. 7) touches an image reading surface weaker than the center of the finger. In addition, the ridge/valley pattern of the peripheral portion is not clear, and is influenced by external factors such as external light incident via the semitransparent layer of a skin surface layer. This degrades the uniformity and relevance of image data. To prevent this, the modification processes lightness data limited to a column range around the center of a finger which is relatively hardly influenced by external factors and has a clear ridge/valley pattern, thereby achieving appropriate extraction processing of maximum and minimum values.

As shown in FIG. 7, the reading sensitivity of a subject image is set higher (charge accumulating period is set longer) for a larger row number. For example, changes in lightness data in a predetermined column range (85th column to 112th column) in the 176th, 152nd, 128th, 104th, and 80th rows are extracted and plotted as shown in FIGS. 8A to 8E. Similar to FIGS. 5A to 5E described above, only in the 128t row, lightness data does not reach either the upper or lower limit value in the entire column range partially limited, and is distributed between the upper and lower limit values. In the remaining rows, lightness data reaches the upper or lower limit value, and all the ridge/valley patterns of image data cannot be read.

FIG. 9A shows the results of extracting maximum and minimum values as numerical data on the basis of changes in lightness data distribution of each row, and calculating the dynamic range from the difference. It can be determined that the dynamic range of lightness data in the 128th row is maximum, and that image data having a fine contrast corresponding to the ridge/valley pattern of a fingerprint is obtained. That is, an optimal image reading sensitivity can be determined to be set.

As shown in FIG. 6B, the row number vs. image reading sensitivity correspondence table stored in the RAM 130 stores charge accumulating periods $T_1$ to $T_{256}$ for respective row numbers. As shown in FIG. 9B, the row number vs. image reading sensitivity correspondence table is looked up for the 128th row having the maximum dynamic range, thereby attaining an image reading sensitivity set for the 128th row, i.e., charge accumulating period $T_{128}$ of the double-gate photosensor.

The sensitivity setting method of this modification can determine a row in an optimal image reading state on the basis of the dynamic range of lightness data in a predetermined column range for each row in setting an optimal image reading sensitivity based on the results of sensitivity-adjusting reading operation. Accordingly, the data amount to be processed can be decreased to simplify sensitivity setting processing and shorten the required time.

<Second Embodiment>

The second embodiment of a photosensor system drive control method to which the same controller 120 as in the first embodiment can be applied will be described with reference to the several views of the accompanying drawing.

Figure 10:
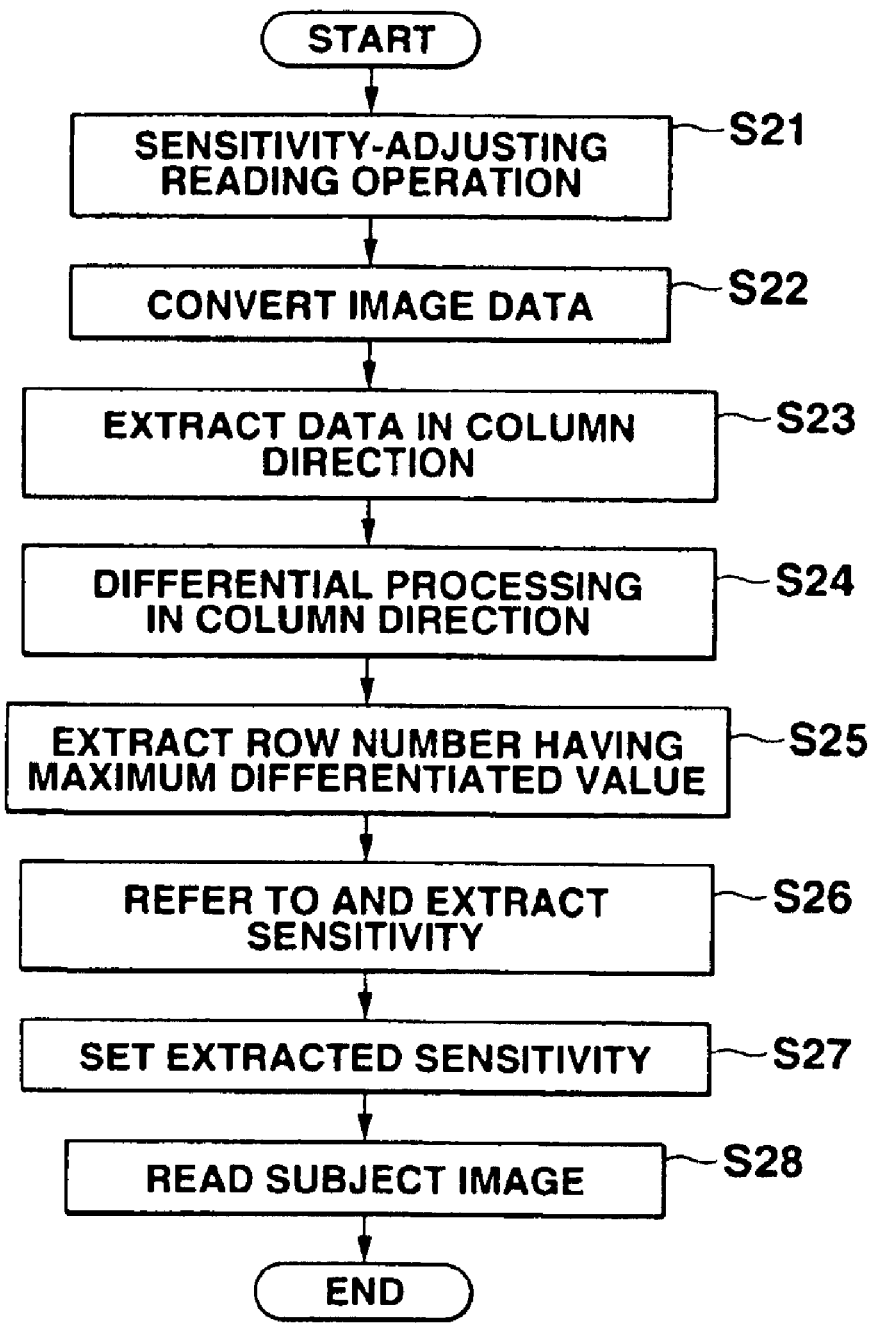
FIG. 10 is a flow chart showing operation of the second embodiment.

FIG. 10 is a flow chart showing an operation up to read of a subject image with an optimal sensitivity according to the second embodiment in operation control of the photosensor system. This operation will be described by properly referring to the arrangement of the photosensor system shown in FIGS. 1 and 2.

In S21 (sensitivity-adjusting reading operation) of FIG. 10, a main controller 123 controls to set an image reading sensitivity for sensitivity-adjusting reading operation in a sensitivity setting register 127 via a data controller 122, and executes the sensitivity-adjusting reading operation of reading a subject image at a plurality of different sensitivities while changing the image reading sensitivity stepwise for respective rows of the subject image. These operations are executed prior to normal reading operation of a subject image, for example. The image reading sensitivities of respective rows are stored as a row number vs. image reading sensitivity correspondence table in a RAM 130 in correspondence with row numbers. This sensitivity-adjusting reading operation is the same as the operation in the first embodiment, and a detailed method of setting the image reading sensitivity (charge accumulating period) will be described below.

In S22 (image data conversion step) of FIG. 10, the image data read by the sensitivity-adjusting reading operation is converted into a digital signal via an amplifier 116 and A/D converter 117, and input as lightness data corresponding to the bright/dark pattern of the subject image to a data comparator 124. In this case, the lightness data is expressed by, e.g., 256 gray levels.

In S23 (data extraction step in the column direction) of FIG. 10, the data comparator 124 extracts lightness data on a specific column, and outputs it to an adder 125.

In S24 (differentiation processing step in the column direction) of FIG. 10, the adder 125 calculates the displacement (differentiated value) of each row in the column direction of the extracted luminance data, and stores the displacement in the RAM 130.

In S25 (step of extracting a row number having the maximum differentiated value) of FIG. 10, the differentiated values of lightness data stored in the RAM 130 are read out via the data selector 126, and input to the data comparator 124, which extracts a row number having the maximum differentiated value among the differentiated values of lightness data.

In S26 (sensitivity referring/extraction step) of FIG. 10, the row number vs. image reading sensitivity correspondence table stored in the RAM 130 is referred based on the row number having the maximum differentiated value, and an image reading sensitivity, i.e., charge accumulating period set for this row is extracted.

In S27 (extracted sensitivity setting step) of FIG. 10, the data controller 122 rewrites the sensitivity setting register 127 to set the image reading sensitivity in the sensitivity setting register 127 to the extracted image reading sensitivity. In S28 (subject image reading step) of FIG. 10, normal reading operation of a subject image is executed at the extracted image reading sensitivity set in the sensitivity setting register 127.

An example of applying the second embodiment of the photosensor system drive control method to a fingerprint reading apparatus will be described with reference to FIGS. 11 to 13B.

Figure 11:
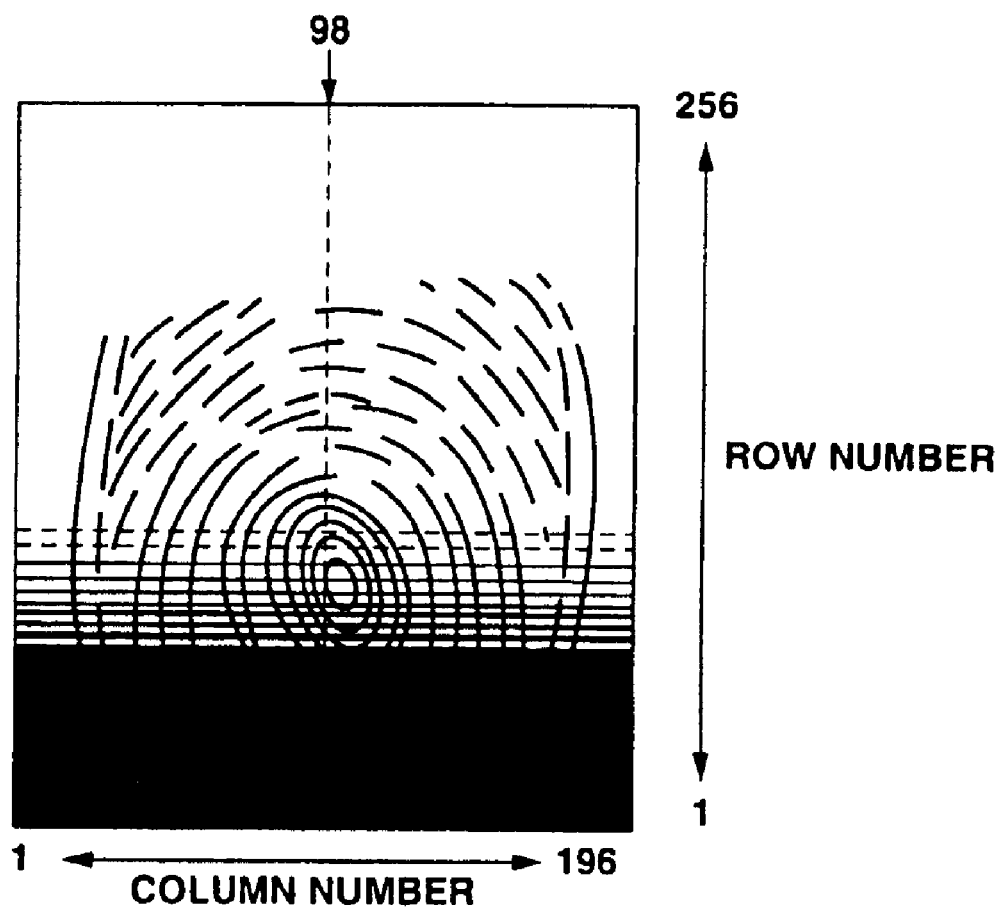
FIG. 11 is a view showing an example of image data when a fingerprint image is read by sensitivity-adjusting reading operation in the second embodiment.
Figure 12A:
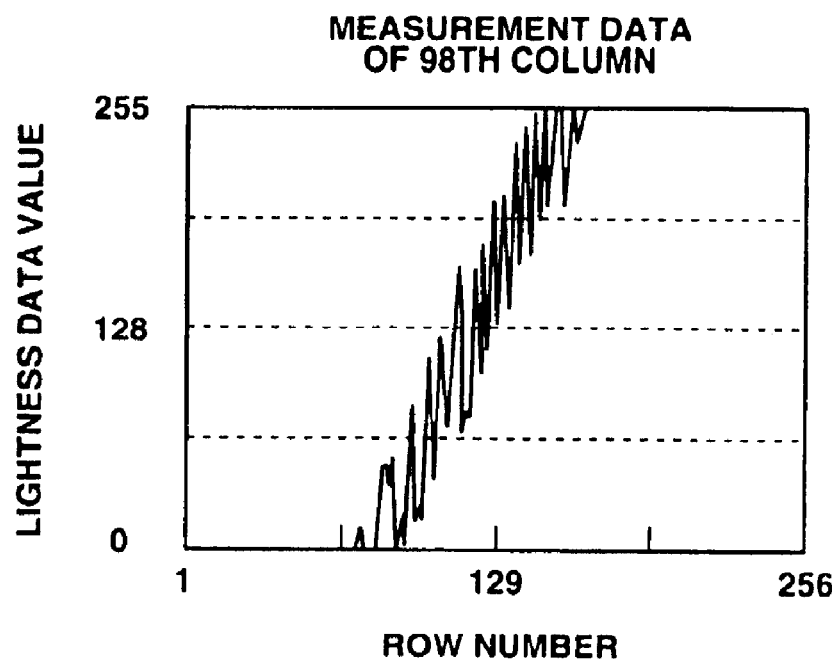
FIGS. 12A and 12B are graphs, respectively, showing the value of lightness data in a predetermined column that is obtained by sensitivity-adjusting reading operation in the second embodiment, and the differentiated value of lightness data between rows.
Figure 12B:
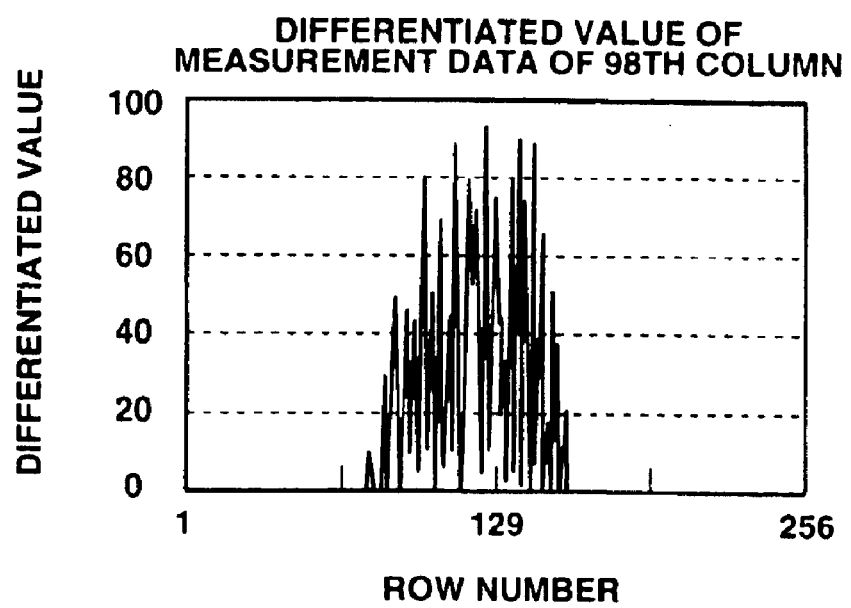

FIG. 11 is a view showing an example of fingerprint image data when a subject (fingerprint) image is read while the image reading sensitivity is changed stepwise for respective rows in sensitivity-adjusting reading operation. FIGS. 12A and 12B are graphs, respectively, showing the value of lightness data in a predetermined column that is obtained by the sensitivity-adjusting reading operation, and the displacement (differentiated value) of lightness data between rows. FIGS. 13A and 13B are tables showing the relationship between the displacement of lightness data between rows in a predetermined column that is obtained by the sensitivity-adjusting reading operation, and a row number vs. image reading sensitivity correspondence table. Assume that image data is read out in units of a matrix pattern of 256 rows×196 columns. A larger lightness data value represents a brighter image, and a smaller lightness data value represents a darker image.

In the sensitivity-adjusting reading operation, the image reading sensitivity is set higher (charge accumulating period is set longer) for a larger row number (upward in FIG. 11), and lower (charge accumulating period is set shorter) for a smaller row number (downward in FIG. 11). For example, lightness data of respective rows (1st to 256th rows) on the 98th column are extracted and plotted as shown in FIG. 12A.

In a region having a small row number, the image reading sensitivity is set low, and lightness data converges to the lower limit value. In a region having a large row number, the image reading sensitivity is set high, and lightness data converges to the upper limit value. To the contrary, in a region around the central row (128th row), lightness data does not reach either the upper or lower limit value, and is distributed between the upper and lower limit values. Further, lightness data tends to change from the lower limit value to the upper limit value.

Differentiated values representing the displacements of lightness data of respective rows are calculated based on changes in lightness data of these rows, and plotted to obtain a distribution as shown in FIG. 12B. The distribution of the differentiated value of lightness data shown in FIG. 12B is listed on a table as shown in FIG. 13A. From this table, the differentiated value is observed to maximize between the 125th and 126th rows, and image data having a fine contrast corresponding to the ridge/valley pattern of the fingerprint is determined to be obtained. That is, an optimal image reading sensitivity can be determined to be set.

Similar to the table shown in FIG. 6B, the row number vs. image reading sensitivity correspondence table stored in the RAM 130 stores charge accumulating periods $T_1$ to $T_{256}$ for respective row numbers. This table is looked up for the 125th and 126th rows having the maximum differentiated value to acquire image reading sensitivities set for the 125th and 126th rows, i.e., charge accumulating periods $T_{125}$ and $T_{126}$ of the photosensor. The sensitivity setting register is rewritten to set a set value determined based on the two charge accumulating periods $T_{125}$ and $T_{126}$, i.e., the average of the charge accumulating periods $T_{125}$ and $T_{126}$. A subject (fingerprint) image is read at this optimal image reading sensitivity.

Similar to the modification of the first embodiment, the column number of lightness data to be processed is desirably specified to a column around the central portion of a subject (finger) which is relatively hardly influenced by external factors and at which the bright/dark pattern (ridge/valley pattern) of a subject image can be read clearly.

In setting an optimal image reading sensitivity based on the results of sensitivity-adjusting reading operation, the sensitivity setting method of the second embodiment can easily determine a row in an optimal image reading state on the basis of the displacement of lightness data of each row in a specific column, and can set an image reading sensitivity (charge accumulating period) set for this row as an optimal sensitivity. Lightness data to be processed suffices to be one column (i.e., several rows), and data to be processed in sensitivity setting processing can be greatly decreased to further simplify sensitivity setting processing and shorten the required time.

<Third Embodiment>

The third embodiment of a photosensor system drive control method according to the present invention will be described with reference to the several views of the accompanying drawings.

The arrangement of a controller applied to the third embodiment has the same arrangement block as the controller 120 employed in the first and second embodiments shown in FIG. 2. In addition, an adder 125 calculates a dynamic range from the difference between the maximum and minimum values of measurement data, and calculates the difference between respective dynamic ranges, i.e., linearly differentiated value. A data comparator 124 has a function of extracting the maximum value of a dynamic range calculated by the adder 125, and the minimum or maximum value of the difference (linearly differentiated value) between dynamic ranges.

Figure 14:
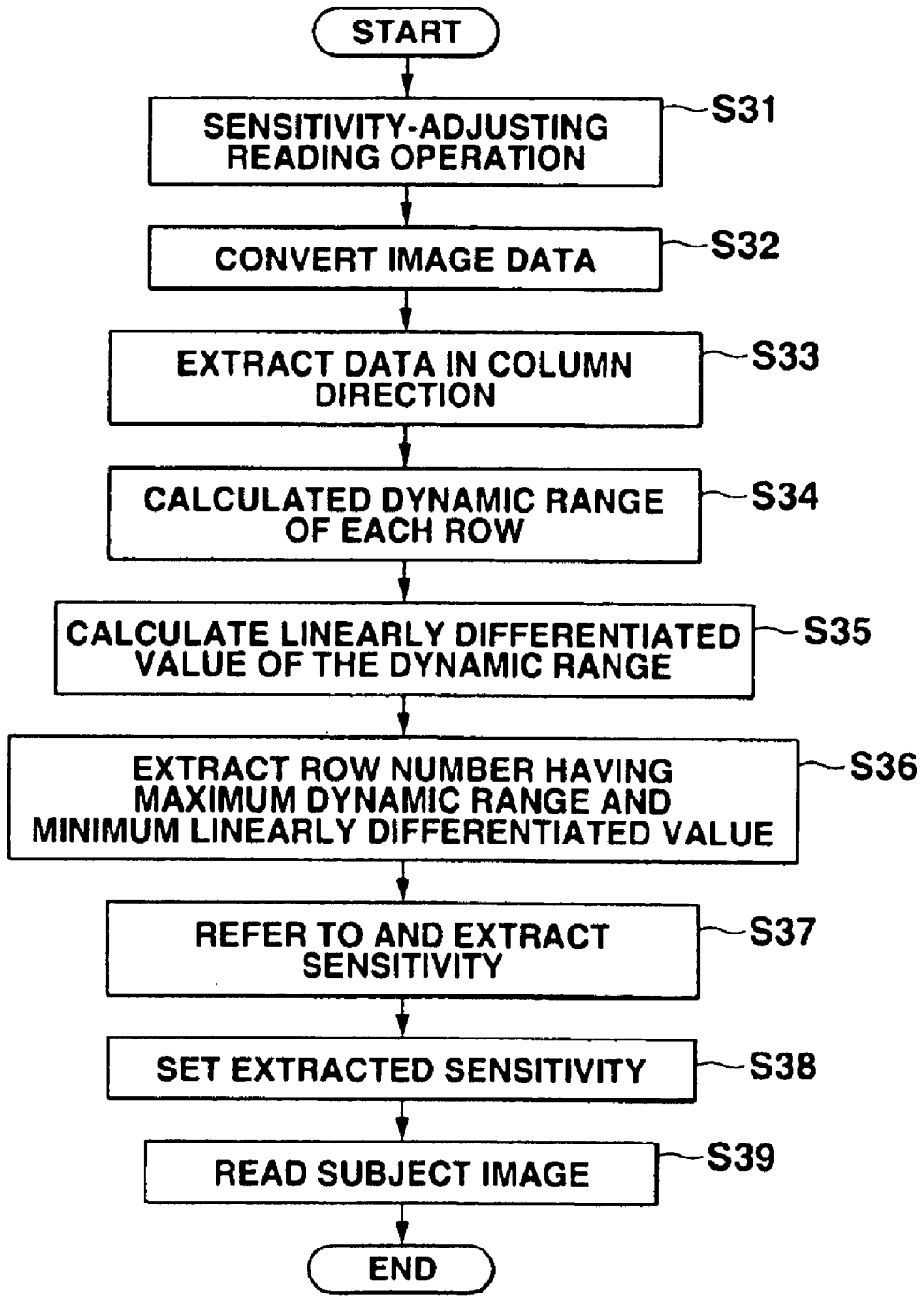
FIG. 14 is a flow chart showing operation of the third embodiment.

FIG. 14 is a flow chart showing an operation up to read of a subject image with an optimal sensitivity according to the third embodiment in the photosensor system operation control method using the above controller 120. This operation will be described by properly referring to the arrangement of the photosensor system shown in FIGS. 1 and 2.

In S31 (sensitivity-adjusting reading operation) of FIG. 14, a main controller 123 controls to set an image reading sensitivity for sensitivity-adjusting reading operation in a sensitivity setting register 127 via a data controller 122, and executes the sensitivity-adjusting reading operation of reading a subject image at a plurality of different sensitivities while changing the image reading sensitivity stepwise for respective rows of the subject image. These operations are executed prior to normal reading operation of a subject image, for example. The image reading sensitivities of respective rows are stored as a row number vs. image reading sensitivity correspondence table in a RAM 130 in correspondence with row numbers. This sensitivity-adjusting reading operation is the same as the operation in the first embodiment, and a detailed method of setting the image reading sensitivity (charge accumulating period) will be described below.

In S32 (image data conversion step) of FIG. 14, the image data read by the sensitivity-adjusting reading operation is converted into a digital signal via an amplifier 116 and A/D converter 117, and input as lightness data corresponding to the bright/dark pattern of the subject image to a data comparator 124. In this case, the lightness data is expressed by, e.g., 256 gray levels.

In S33 (step of extracting the maximum and minimum values of each row) of FIG. 14, the data comparator 124 extracts the maximum and minimum values of lightness data of each row, and outputs them to an adder 125. That is, the data comparator 124 extracts lightness data representing a maximum value (gray level value of the brightest pixel) contained in each row, and lightness data representing a minimum value (gray level value of the darkest pixel).

In S34 (step of calculating the dynamic range of each row) of FIG. 14, the adder 125 calculates as a dynamic range the difference between the maximum and minimum values of lightness data of each row, and stores the dynamic range in the RAM 130 via the data selector 126. The adder 125 executes dynamic range calculation processing for all the rows.

In S35 (step of calculating the linearly differentiated value of the dynamic range) of FIG. 14, the dynamic ranges of respective rows stored in the RAM 130 are read out via the data selector 126, and input again to the adder 125, which calculates the difference (linearly differentiated value) between the dynamic ranges of adjacent rows. The results are stored in the RAM 130 via the data selector 126.

In S36 (step of extracting a row number having a maximum dynamic range and minimum linearly differentiated value) of FIG. 14, data of the dynamic ranges of respective rows and data of the linearly differentiated values of the dynamic ranges which are stored in the RAM 130 are read out via the data selector 126, and input to the data comparator 124, which extracts a row number at which the dynamic range maximizes and the linearly differentiated value of the dynamic range minimizes (to 0 or a value close to 0).

In S37 (sensitivity referring/extraction step) of FIG. 14, the row number vs. image reading sensitivity correspondence table stored in the RAM 130 is looked up based on the extracted row number, and an image reading sensitivity, i.e., charge accumulating period set for this row is extracted.

In S38 (extracted sensitivity setting step) of FIG. 14, the data controller 122 rewrites the sensitivity setting register 127 to set the image reading sensitivity in the sensitivity setting register 127 to the extracted image reading sensitivity. In S39 (subject image reading step) of FIG. 14, normal reading operation of a subject image is executed at the extracted image reading sensitivity set in the sensitivity setting register 127.

An example of applying the third embodiment of the photosensor system drive control method to a fingerprint reading apparatus will be described with reference to FIGS. 15 to 18B.

Figure 15:
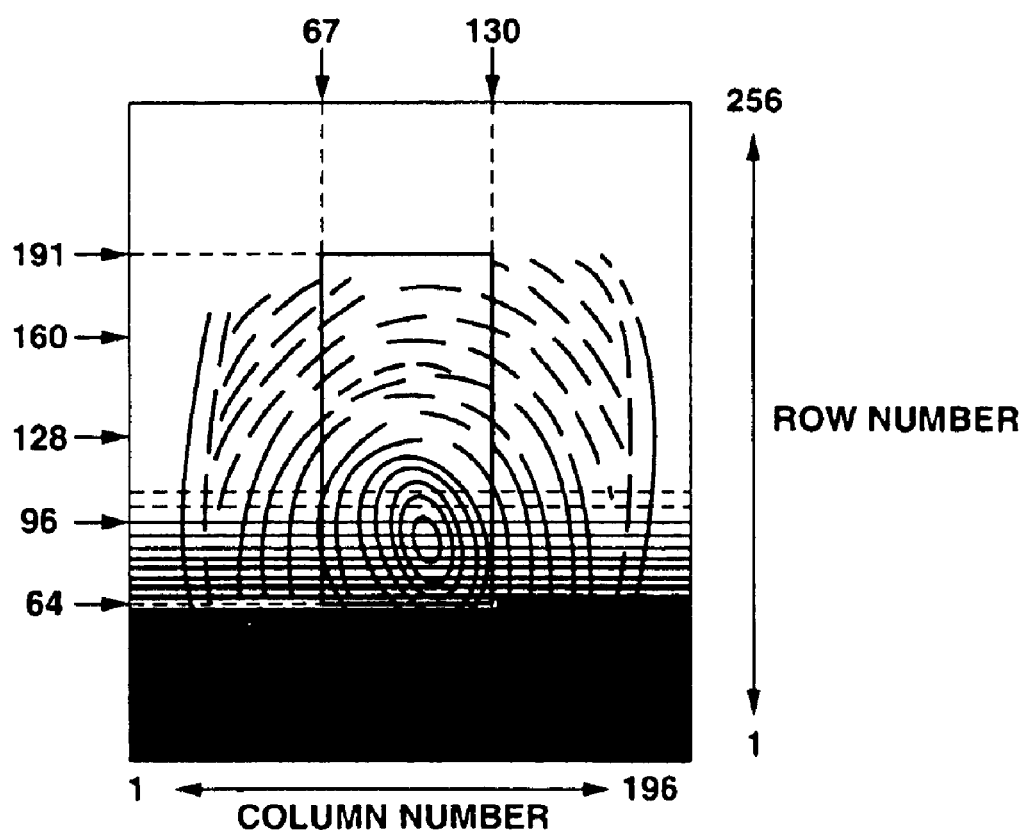
FIG. 15 is a view showing examples of image data and a sensitivity determination range when a fingerprint image is read by sensitivity-adjusting reading operation in the third embodiment.
Figure 16:
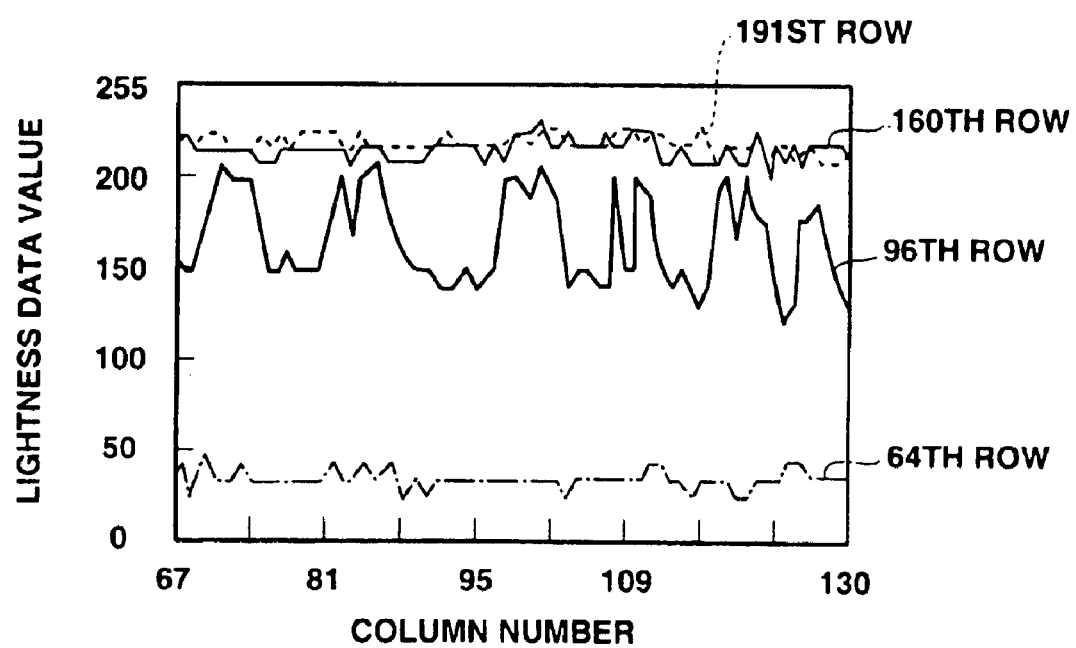
FIG. 16 is a graph showing changes in lightness data of a specific row in the sensitivity determination range of image data read by sensitivity-adjusting reading operation in the third embodiment.
Figure 17A:
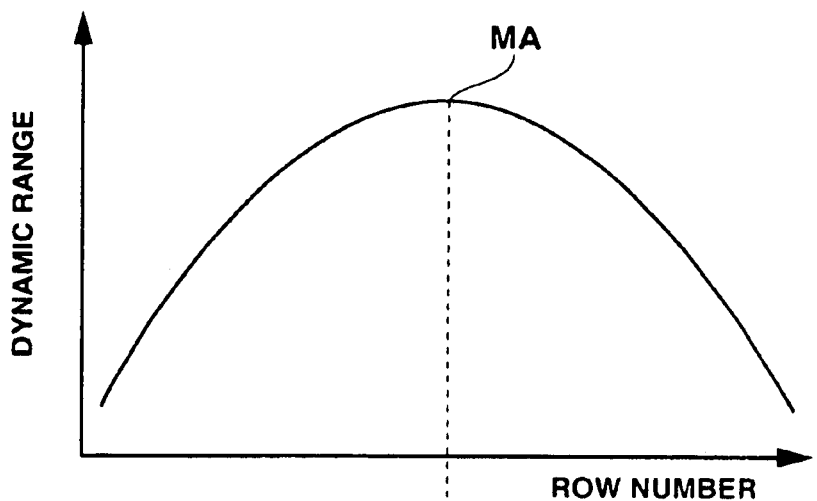
FIGS. 17A and 17B are graphs showing the relationship between changes in the dynamic ranges of respective rows of image data read by sensitivity-adjusting reading operation in the third embodiment, and changes in the linearly differentiated values of the dynamic ranges of respective rows.
Figure 17B:
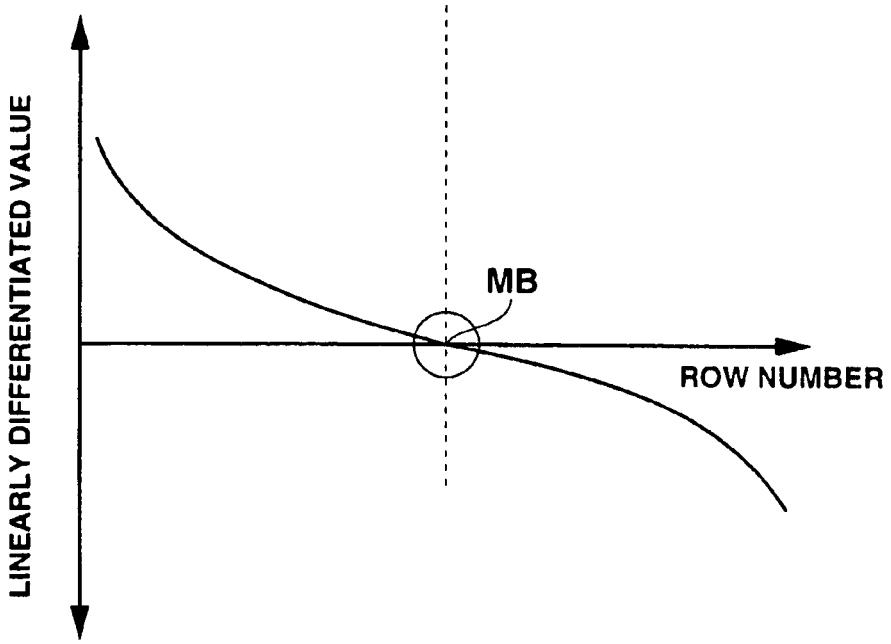

FIG. 15 is a view showing an example of image data when a subject (fingerprint) image is read while the image reading sensitivity is changed stepwise for respective rows in sensitivity-adjusting reading operation. FIG. 16 is a graph showing changes in lightness data of respective pixels of several rows in the column direction that are based on the subject image data obtained by the sensitivity-adjusting reading operation. FIGS. 17A and 17B are graphs showing the relationship between changes in the dynamic ranges of respective rows and changes in the linearly differentiated values of the dynamic ranges of respective rows. FIGS. 18A and 18B are views for illustrating tables showing the relationship between the dynamic range of each row and the linearly differentiated values of the dynamic range that are obtained by the sensitivity-adjusting reading operation, and a row number vs. image reading sensitivity correspondence table. Assume that image data are read out in units of a matrix pattern of 256 rows×196 columns. A larger lightness data value represents a brighter image, and a smaller lightness data value represents a darker image.

In the sensitivity-adjusting reading operation, the image reading sensitivity is set higher (charge accumulating period is set longer) for a larger row number (upward in FIG. 15), and lower (charge accumulating period is set shorter) for a smaller row number (downward in FIG. 15). In FIG. 15, as the row number increases (upward in FIG. 15), the ridge/valley pattern of the fingerprint becomes weaker under the influence of external light, and at last is read as an almost invisibly bright image. On the other hand, as the row number decreases (downward in FIG. 15), the ridge/valley pattern of the fingerprint becomes darker, and at last is read as an almost invisibly dark image. The lightness data level is expressed by 256 gray levels, and its lower and upper limit values are set to 0 and 255, respectively.

In this image data, a sensitivity determination range used to extract a row having an optimal sensitivity is preferably limited to a region having a fine contrast corresponding to the ridge/valley pattern of the fingerprint. This embodiment will exemplify sensitivity setting processing when a row/column range defined by 64th to 191st rows and 67th to 130th columns is set as the sensitivity determination range.

In the sensitivity determination range shown in FIG. 15, for example, changes in lightness data in the 64th, 96th, 160th, and 191st rows are extracted and plotted as shown in FIG. 16. In the 191st row (represented by the broken line in FIG. 16) and 160th row (represented by the thin line in FIG. 16) within the row range, the sensitivity is set high, and lightness data converges to a large value (about 220 to 225) and hardly provides any information as image data. In the 96th row (represented by the thick line in FIG. 16), lightness data does not converge to either the upper or lower limit value on all the columns, and exhibits a relatively large vertical displacement corresponding to the bright/dark pattern of image data. In the 64th row (represented by the chain line in FIG. 16), the sensitivity is set low, so that lightness data converges to a small value (about 35) and hardly provides any information as image data.

Maximum and minimum values are extracted from the lightness data distribution of each row, and the difference is calculated to obtain a dynamic range. Obtained dynamic ranges are plotted for row numbers to attain a distribution curve having a maximum value MA in a predetermined row, as shown in FIG. 17A. Further, linear differentiation for the dynamic range distribution, i.e., the slopes of the dynamic range distribution curve for respective rows are calculated, and plotted for row numbers. As shown in FIG. 17B, a linearly differentiated value MB is 0 in a row exhibiting the maximum value MA.

It can be determined that lightness data in the row exhibiting the maximum dynamic range and minimum linearly differentiated value is image data having a fine contrast corresponding to the ridge/valley pattern of a fingerprint, and an optimal image reading sensitivity is set.

Maximum and minimum values are extracted as numerical data on the basis of changes in the lightness data distribution of each row shown in FIG. 16, and a dynamic range calculated from the difference and a linearly differentiated value calculated from the difference of the dynamic range of each row are listed on a table as shown in FIG. 18A.

In FIG. 18A, when the dynamic range maximizes at $R_k$ in FIG. 18A, and the linearly differentiated value minimizes at $D_{k-1}$ in FIG. 18A, rows $L_{k-1}$ and $L_k$ are extracted as row numbers at which the dynamic range maximizes and the linearly differentiated value minimizes.

As shown in FIG. 6B, the RAM 130 stores a row number vs. image reading sensitivity correspondence table within the sensitivity determination range, and stores image reading sensitivities, i.e., charge accumulating periods $T_{64}$ to $T_{191}$ for respective row numbers.

This row number vs. image reading sensitivity correspondence table is looked up for the extracted rows to extract image reading sensitivities, i.e., charge accumulating periods $T_{k-1}$ and $T_k$ set for the rows $L_{k-1}$ and $L_k$, which are determined as optimal values. The sensitivity setting register 127 is rewritten to set, as an optimal image reading sensitivity, a set value determined based on the two extracted charge accumulating periods $T_{k-1}$ and $T_k$, i.e., the average of the charge accumulating periods $T_{k-1}$ and $T_k$. A subject (fingerprint) image is read at this optimal image reading sensitivity.

Note that in the distributions of the dynamic range and linearly differentiated value shown in FIGS. 17A and 17B, the linearly differentiated value of a row whose dynamic range has the maximum value MA is 0. In practice, however, a row whose linearly differentiated value is 0 may not exist. Thus, as conditions for extracting a row set to an optimal sensitivity, a row exhibiting the maximum dynamic range and the minimum linearly differentiated value (value nearest to 0) is extracted.

As will be described below, the third embodiment can effectively prevent any malfunction in optimal sensitivity extraction processing even when lightness data contains an abnormal value due to a small foreign substance attached to the fingerprint reading surface of the photosensor, a defect of the photosensor, or the like. This will be explained with reference to FIGS. 19A to 22B.

FIGS. 19A and 19B are tables showing the relationship between the dynamic range distribution of respective rows and a row number vs. image reading sensitivity correspondence table when the first embodiment is applied as another setting method of setting the optimal sensitivity of the photosensor system. According to this setting method, the optimal value of the image reading sensitivity is determined using a row whose dynamic range has the maximum value MA in the dynamic range distribution (see FIG. 17A) of lightness data in sensitivity setting processing described above.

In this sensitivity setting method, as described above, the dynamic range is calculated based on the lightness data distribution (maximum and minimum values) of each row in FIG. 19A, a row ($L_k$ in FIG. 19A) having the maximum value (e.g., $R_k$ in FIG. 19A) is extracted, and an image reading sensitivity (charge accumulating period $T_k$) set for the row $L_k$ is extracted and determined as an optimal value.

Operation processing when lightness data contains an abnormal value, and comparison with the third embodiment will be explained.

Figure 20:
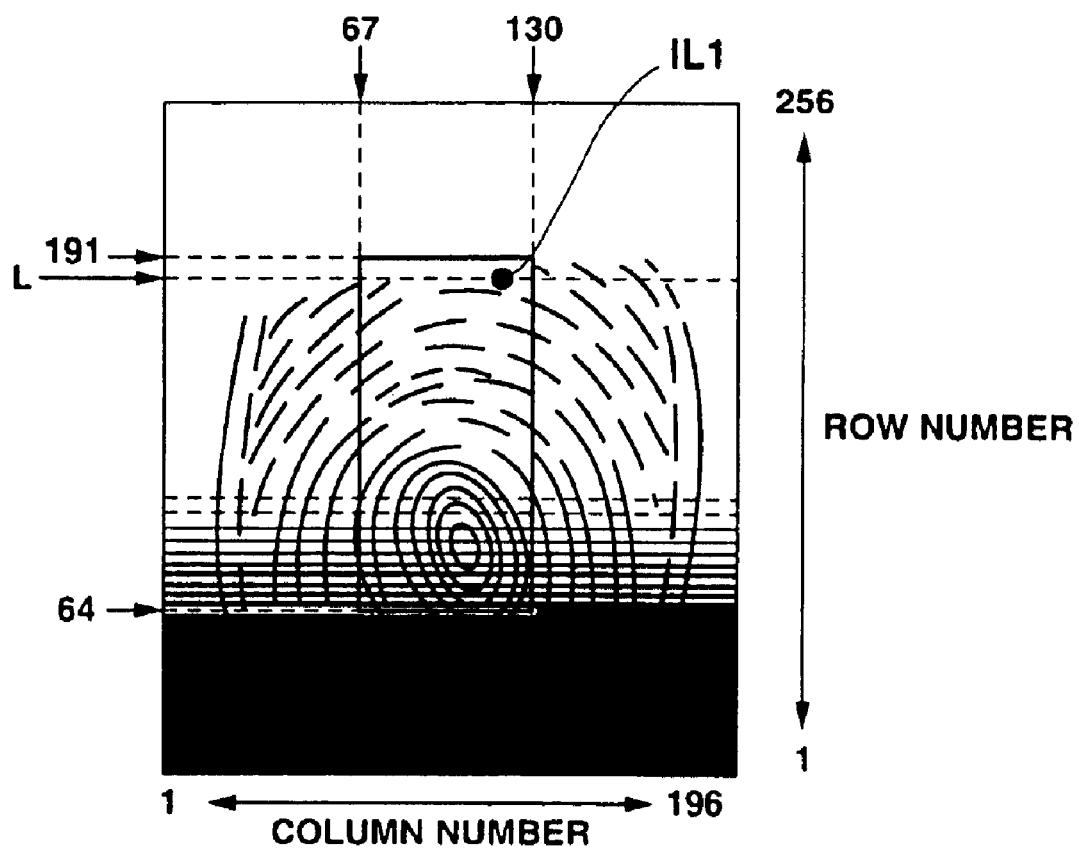
FIG. 20 is a view showing a case wherein an abnormal value exists in read image data of a fingerprint image in sensitivity-adjusting reading operation in the third embodiment.
Figure 21:
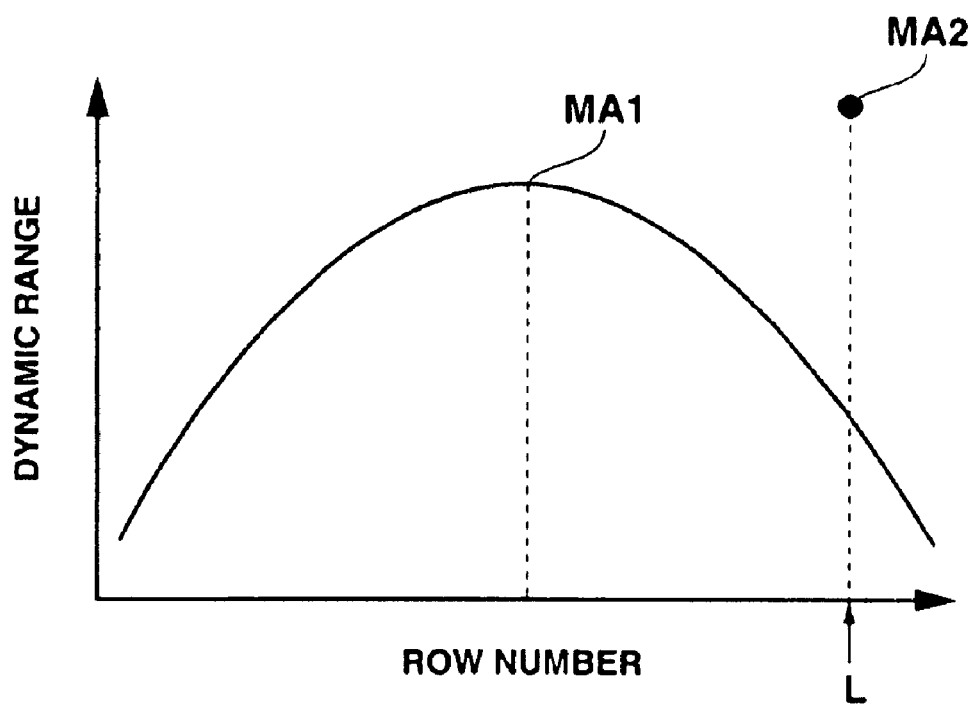
FIG. 21 is a graph showing changes in the dynamic ranges of respective rows when an abnormal value exists in read image data of a fingerprint image in sensitivity-adjusting reading operation in the third embodiment.
Figure 22A:
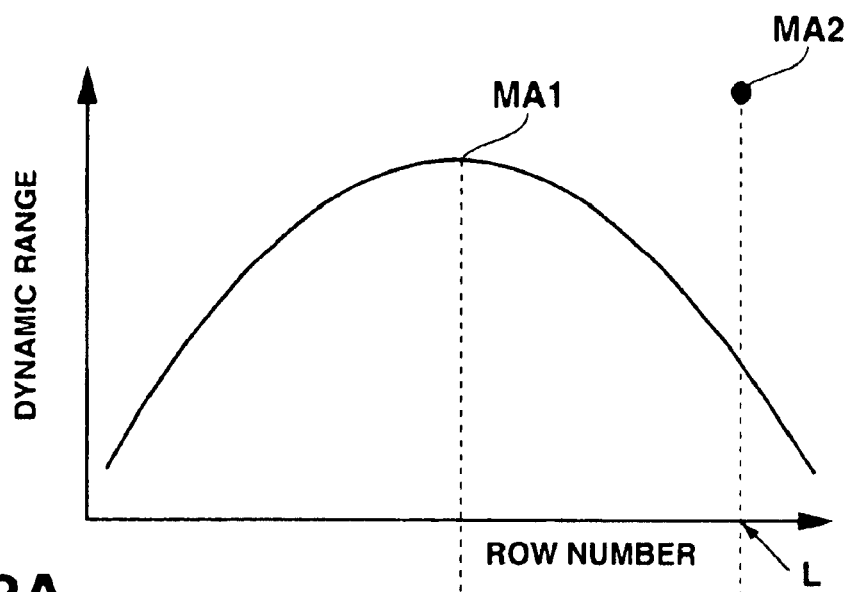
FIGS. 22A and 22B are graphs showing the relationship between changes in the dynamic ranges of respective rows, and changes in the linearly differentiated values of the dynamic ranges of respective rows when an abnormal value exists in read image data of a fingerprint image in sensitivity-adjusting reading operation in the third embodiment.
Figure 22B:
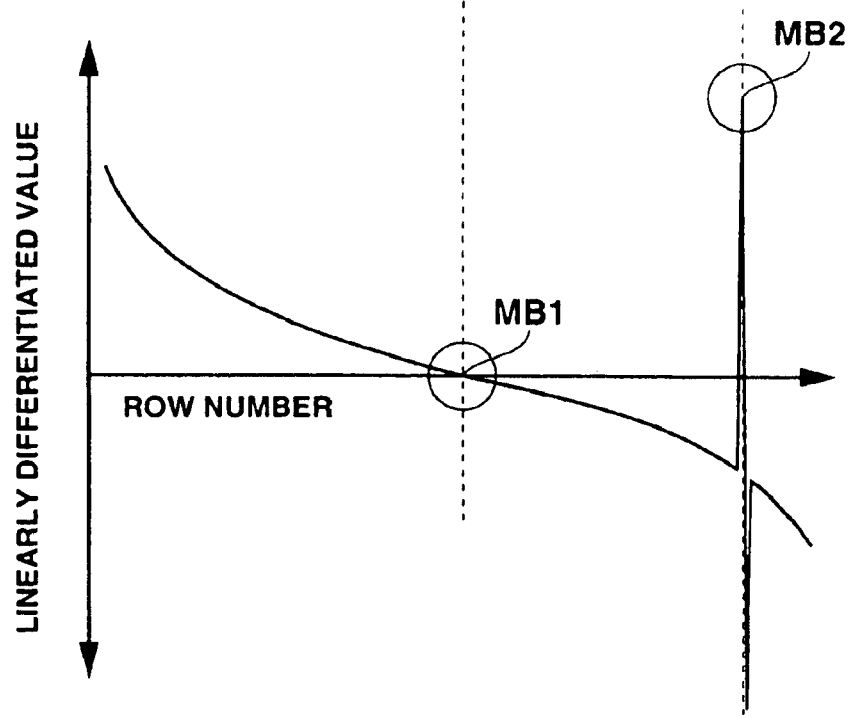

FIG. 20 is a view showing still another example of image data when a subject (fingerprint) image is read while the image reading sensitivity is changed stepwise for respective rows in sensitivity-adjusting reading operation. FIG. 21 is a graph showing changes in the dynamic ranges of respective rows. FIGS. 22A and 22B are graphs showing the relationship between changes in the dynamic ranges of respective rows, and changes in the linearly differentiated values of the dynamic ranges of respective rows.

As shown in FIG. 20, the sensitivity determination range is set to a row/column range defined by 64th to 191st rows and 67th to 130th columns, similar to FIG. 15, as a region having a fine contrast corresponding to the ridge/valley pattern of a fingerprint in order to extract a row having an optimal sensitivity from image data of the fingerprint. In this case, if an abnormal pixel IL1 exists in a row L within the sensitivity determination range owing to a foreign substance attached to a fingerprint reading surface, a defect of the photosensor, or the like, lightness data of the abnormal pixel IL1 may exhibit an excessive value in comparison with peripheral pixel data. This occurs when, for example, a black point exists on the white background, or a white point exists on the black background. In the distribution of a dynamic range calculated based on the maximum and minimum values of lightness data, the dynamic range of the row L containing the abnormal pixel IL1 appears greatly apart from the change trend of the entire distribution. If the setting method of the first embodiment in which an image reading sensitivity corresponding to a row having the maximum dynamic range is adopted as an optimal value is applied to image data read in the sensitivity-adjusting reading operation, the dynamic range of the row L containing the abnormal pixel IL1 that is irrelevant to an original maximum value MA1 in the change trend of the dynamic range distribution is extracted as a maximum value MA2, and an image reading sensitivity set for the row L having this dynamic range is determined to be an optimal value. In this case, an improper image reading sensitivity (e.g., charge accumulating period longer than an optimal value) is set in the photosensor system. In normal reading operation, accurate reading operation may fail such that a subject image becomes white.

To the contrary, the sensitivity setting method of the third embodiment sets an optimal image reading sensitivity using conditions of extracting a row number at which the dynamic range exhibits the maximum value MA1 and the linearly differentiated value of the dynamic range exhibits a minimum value MB1 within a range where the dynamic range coincides with the entire dynamic range change trend. For this reason, the third embodiment does not extract, as a row corresponding to an optimal reading sensitivity, the row L containing the abnormal pixel IL1 in which a dynamic range value MA2 in FIG. 22A deviates from the dynamic range change trend and is a maximum value, but a linearly differentiated value MB2 of the dynamic range in FIG. 22B is not a minimum value.

Hence, even when a subject image contains the abnormal pixel IL1 due to a foreign substance attached to a fingerprint reading surface, a defect of the photosensor, or the like, a row having a fine contrast corresponding to the ridge/valley pattern of a fingerprint can be reliably extracted to determine an optimal charge accumulating period.

According to the sensitivity setting method of the third embodiment, sensitivity-adjusting reading operation is executed while the image reading sensitivity is changed stepwise for respective rows. A row in an optimal image reading state is easily and properly determined based on the dynamic range value of each row to lightness data and the linearly differentiated value of the dynamic range. An image reading sensitivity (charge accumulating period) set for the row can be set as an optimal sensitivity. Normal image reading operation of a subject image can be performed at a proper sensitivity without being influenced by an abnormal pixel generated by a foreign substance attached to a fingerprint reading surface, a defect of the photosensor, or the like.

The third embodiment executes sensitivity setting processing in a sensitivity determination range limited to a row/column range defined by 64th to 191st rows and 67th to 130th columns. However, the present invention is not limited to this, and is applicable to the entire region of image data without limiting the sensitivity determination range.

<Fourth Embodiment>

The fourth embodiment of a photosensor system drive control method according to the present invention to which the same controller 120 as in the third embodiment can be applied will be described with reference to the several views of the accompanying drawing. The fourth embodiment determines whether an abnormal pixel exists in image data by applying the sensitivity setting method of the third embodiment.

Figure 23:
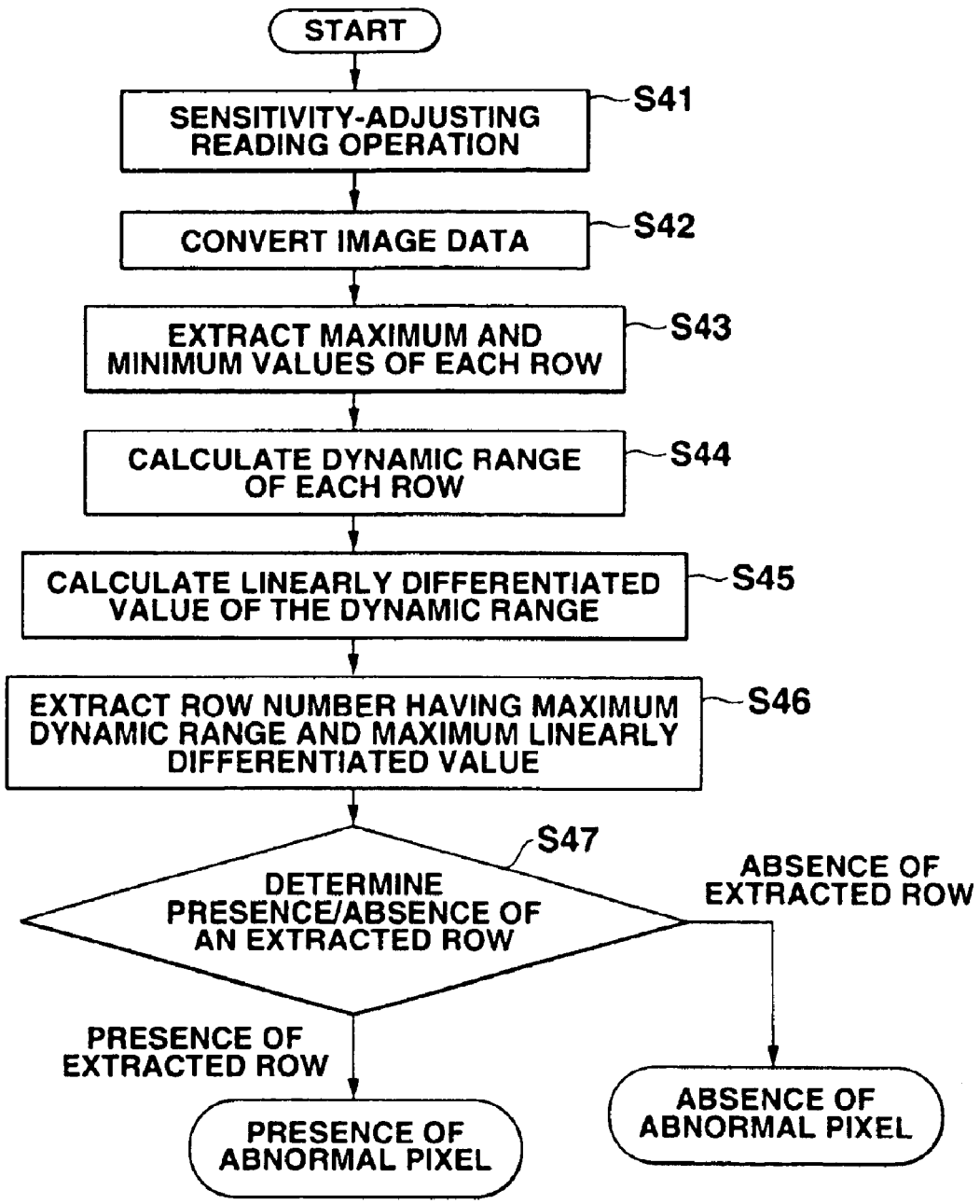
FIG. 23 is a flow chart showing operation of the fourth embodiment.

FIG. 23 is a flow chart showing an operation up to detection processing of an abnormal pixel according to the fourth embodiment in the photosensor system operation control method using the above-mentioned controller 120.

In S41 (sensitivity-adjusting reading operation) of FIG. 23, a main controller 123 controls to set an image reading sensitivity for sensitivity-adjusting reading operation in a sensitivity setting register 127 via a data controller 122, and executes the sensitivity-adjusting reading operation of reading a subject image at a plurality of different sensitivities while changing the image reading sensitivity stepwise for respective rows of the subject image. These operations are executed prior to normal reading operation of a subject image, for example. The image reading sensitivities of respective rows are stored as a row number vs. image reading sensitivity correspondence table in a RAM 130 in correspondence with row numbers. This sensitivity-adjusting reading operation is the same as the operation in the first embodiment, and a detailed method of setting the image reading sensitivity (charge accumulating period) will be described below.

In S42 (image data conversion step) of FIG. 23, the image data read by the sensitivity-adjusting reading operation is converted into a digital signal via an amplifier 116 and A/D converter 117, and input as lightness data corresponding to the bright/dark pattern of the subject image to a data comparator 124. In this case, the lightness data is expressed by, e.g., 256 gray levels.

In S43 (step of extracting the maximum and minimum values of each row) of FIG. 23, the data comparator 124 extracts the maximum and minimum values of lightness data of each row, and outputs them to an adder 125. That is, the data comparator 124 extracts lightness data representing a maximum value (gray level value of the brightest pixel) contained in each row, and lightness data representing a minimum value (gray level value of the darkest pixel).

In S44 (step of calculating the dynamic range of each row) of FIG. 23, the adder 125 calculates as a dynamic range the difference between the maximum and minimum values of lightness data of each row, and stores the dynamic range in the RAM 130 via the data selector 126. The adder 125 executes dynamic range calculation processing for all the rows.

In S45 (step of calculating the linearly differentiated value of the dynamic range) of FIG. 23, the dynamic ranges of respective rows stored in the RAM 130 are read out via the data selector 126, and input again to the adder 125, which calculates the difference (linearly differentiated value) between the dynamic ranges of adjacent rows. The results are stored in the RAM 130 via the data selector 126.

In S46 (step of extracting a row number having a maximum dynamic range and maximum linearly differentiated value) of FIG. 23, data of the dynamic ranges of respective rows and data of the linearly differentiated values of the dynamic ranges which are stored in the RAM 130 are read out via the data selector 126, and input to the data comparator 124, which extracts a row number at which the dynamic range maximizes and the linearly differentiated value of the dynamic range maximizes.

In S47 (step of determining presence/absence of an extracted row) of FIG. 23, whether a corresponding row number has been extracted in step S46, i.e., whether a row which satisfies extraction conditions exists is determined. If a corresponding row number is determined based on the determination result to have been extracted, an abnormal pixel is determined to exist in the image data read by the sensitivity-adjusting reading operation. If no corresponding row number is determined to have been extracted, no abnormal pixel is determined to exist.

This abnormal pixel detection processing can determine the presence/absence of a foreign substance attached to the read surface for a subject or the subject itself, or the presence/absence of a defect of the sensor element constituting the photosensor array. If an abnormal pixel exists, this can be notified with an alarm or the like to execute proper action, and normal reading operation of a subject image can be appropriately done in S48.

More specifically, as shown in FIG. 20, a predetermined sensitivity determination range is set on image data of a fingerprint. At this time, if the abnormal pixel IL1 exists in the sensitivity determination range due to a foreign substance attached to a fingerprint reading surface, characteristic changes and defects of the photosensor, or the like, lightness data of the abnormal pixel IL1 exhibits an excessive value in comparison with peripheral pixel data. In this case, a dynamic range calculated based on the maximum and minimum values of this lightness data, and its linearly differentiated value appear greatly apart from the remaining normal distribution trend, as shown in FIGS. 21, 22A, and 22B. When the abnormal detection method of the fourth embodiment is applied to this situation, a row number L at which the dynamic range exhibits the maximum value MA2 and the linearly differentiated value of the dynamic range exhibits the maximum value MB2 is extracted to determine that the abnormal pixel IL1 exists in the image data. As a result, proper action of, e.g., cleaning the sensing surface to remove the foreign substance can be instructed prior to normal reading operation of a subject image.

Note that the abnormal detection method of the fourth embodiment may be executed singly for a predetermined subject image, or may be executed in parallel with the above-described sensitivity setting method.

<Fifth Embodiment>

The fifth embodiment of a photosensor system drive control method according to the present invention will be described with reference to the several views of the accompanying drawing.

The detailed arrangement and operation of a controller applied to the fifth embodiment will be explained with reference to the several views of the accompanying drawing.

Figure 24:
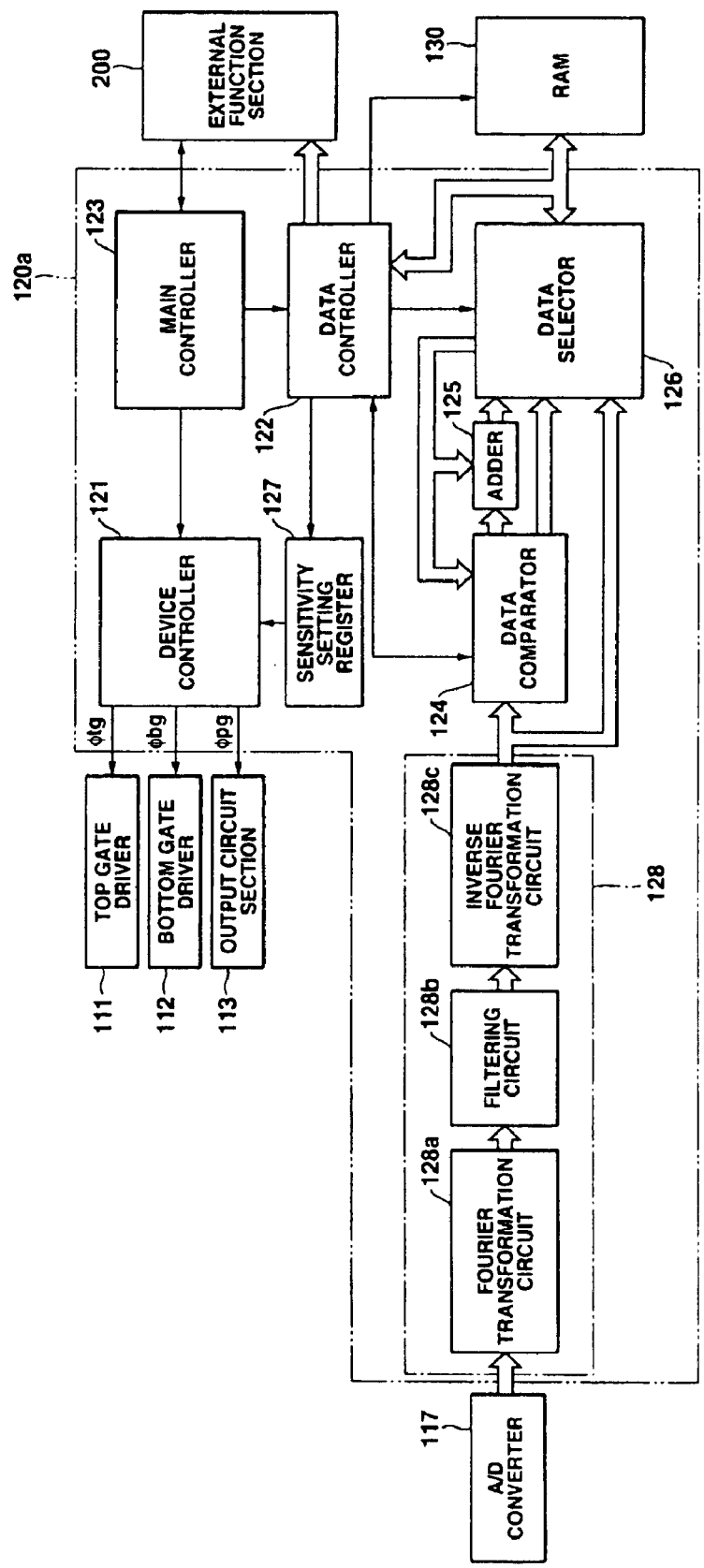
FIG. 24 is a block diagram showing an arrangement of a controller applied to the fifth embodiment.

FIG. 24 is a block diagram showing an arrangement of the controller 120a applied to this embodiment. As will be described below, this controller 120a has almost the same arrangement as the controller 120 shown in FIG. 2, and the same reference numerals denote the same parts.

As shown in FIG. 24, a controller 120a in the fifth embodiment comprises a device controller 121 for controlling a top gate driver 111, bottom gate driver 112, and output circuit section 113, a data controller 122 for managing various data such as image data, write data, and readout data to a RAM 130, and a main controller 123 which supervises the controllers 121 and 122 and interfaces with an external function section.

The controller 120a further comprises:

an abnormal value removing section 128 constituted by a Fourier transformation section or circuit 128a for Fourier-transforming specific measurement data based on image data input as a digital signal from a photosensor array 100 via an A/D converter 117, a filtering section or circuit 128b for removing a high-frequency component corresponding to an abnormal value from the Fourier-transformed measurement data, and an inverse Fourier transformation section or circuit 128c for inversely Fourier-transforming the measurement data from which the high-frequency component is removed;

a data comparator 124 for extracting maximum and minimum values by comparing the sizes of measurement data from which abnormal values are removed by the abnormal value removing section 128, and for extracting the maximum value of a dynamic range calculated by an adder 125 (to be described below) and the minimum value of the difference (linearly differentiated value) between dynamic ranges;

the adder 125 for calculating a dynamic-range from the difference between the maximum and minimum values of measurement data, and calculating the difference between dynamic ranges, i.e., linearly differentiated value;

a data selector 126 for receiving measurement data processed via the A/D converter 117, abnormal value removing section 128, data comparator 124, and adder 125, and switching write/readout in/from the RAM 130, re-input to the data comparator 124 and adder 125, and output to the external function section 200 via the data controller 122 in accordance with the received data; and a sensitivity setting register 127 for changing control signals to be output from the device controller 121 to the top and bottom gate drivers 111 and 112 so as to optimize the reading sensitivity of the photosensor array on the basis of a control signal from the data controller 122.

Figure 25:
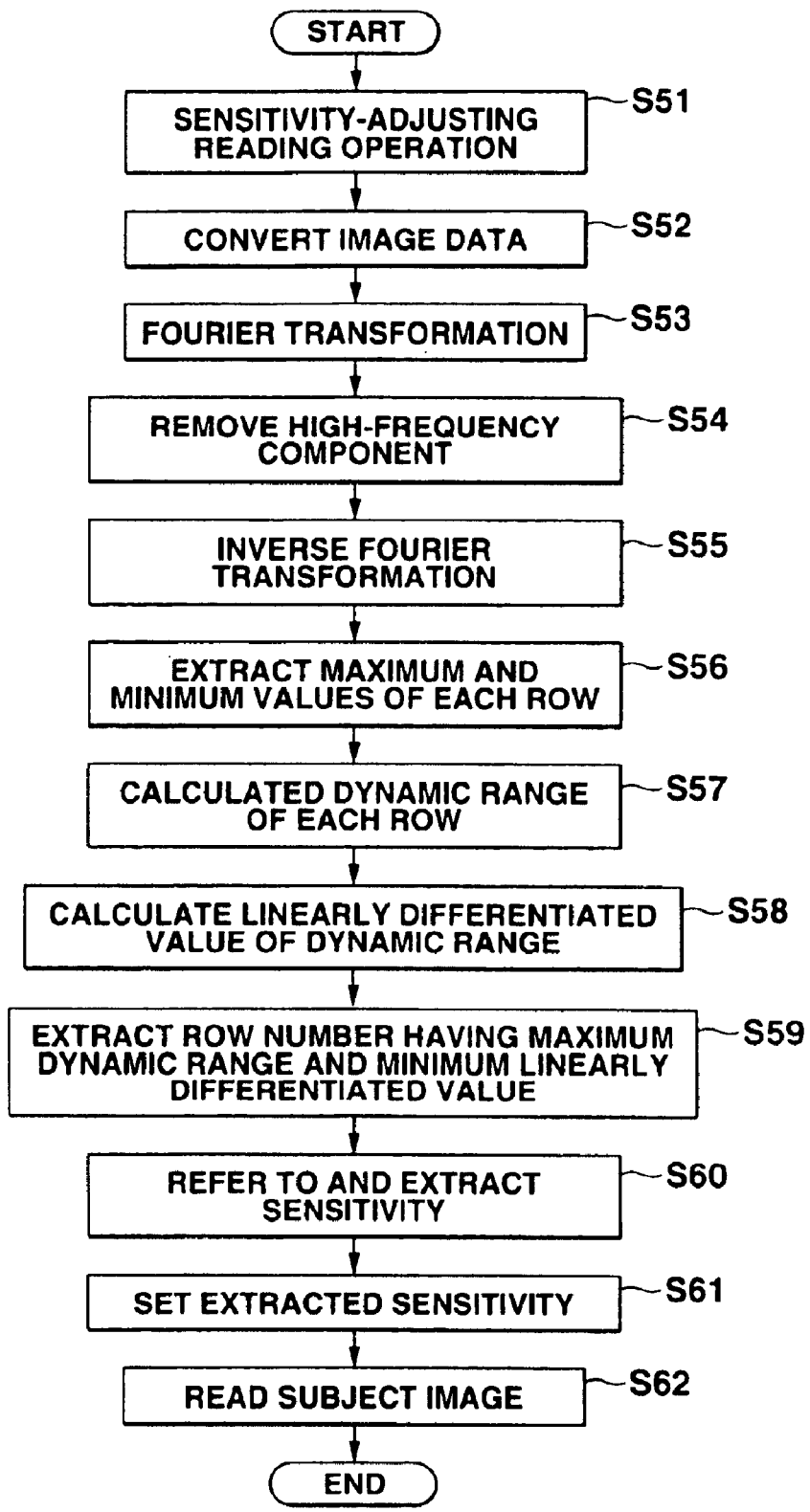
FIG. 25 is a flow chart showing operation of the fifth embodiment.

The operation of the fifth embodiment in the operation control method of the photosensor system using the above controller 120a will be explained with reference to FIG. 25. FIG. 25 is a flow chart showing an operation up to read of a subject image with an optimal sensitivity according to the fifth embodiment in operation control of the photosensor system. This operation will be described by properly referring to the arrangement of the photosensor system shown in FIGS. 1 and 24.

In S51 (sensitivity-adjusting reading operation) of FIG. 25, the main controller 123 controls to set an image reading sensitivity for sensitivity-adjusting reading operation in the sensitivity setting register 127 via the data controller 122, and executes the sensitivity-adjusting reading operation of reading a subject image at a plurality of different sensitivities while changing the image reading sensitivity stepwise for respective rows of the subject image. The image reading sensitivities of respective rows are stored as a row number vs. image reading sensitivity correspondence table in the RAM 130 in correspondence with row numbers. This sensitivity-adjusting reading operation is the same as the operation in the first embodiment, and a detailed method of setting the image reading sensitivity (charge accumulating period) will be described below.

In S52 (image data conversion step) of FIG. 25, the image data read by the sensitivity-adjusting reading operation is converted into a digital signal via the amplifier 116 and A/D converter 117, and input as lightness data corresponding to the bright/dark pattern of the subject image to the abnormal value removing section 128. In this case, the lightness data is expressed by, e.g., 256 gray levels.

In S53 (Fourier transformation step) of FIG. 25, the lightness data input to the abnormal value removing section 128 is Fourier-transformed by the Fourier transformation section 128a on the basis of the dynamic range of lightness data of each row to obtain a frequency distribution representing the variation width of lightness data of each row number.

In S54 (high-frequency component removing step) of FIG. 25, a high-frequency component equal to or higher than a predetermined value is removed from the lightness data frequency distribution converted by the Fourier transformation section 128a. More specifically, a predetermined high-frequency component is removed by passing the data through the filtering section 128b formed from, e.g., a low-pass filter.

In S55 (inverse Fourier transformation step) of FIG. 25, the frequency distribution from which the high-frequency component is removed is inversely Fourier-transformed by the inverse Fourier transformation section 128c to obtain lightness data of each row number again.

A series of abnormal value removing operations of the abnormal value removing section 128 remove from original lightness data a high-frequency component, i.e., abnormal value which has a steep variation and deviates from the main change trend of lightness data, and extract only the main component of the lightness data in which the dynamic range changes smoothly for each row. The lightness data from which the abnormal value is removed is input to the data comparator 124.

In S56 (step of extracting the maximum and minimum values of each row) of FIG. 25, the data comparator 124 extracts for each row the maximum and minimum values of the lightness data from which the abnormal value is removed, and outputs them to the adder 125. That is, the data comparator 124 extracts lightness data representing a maximum value (gray level value of the brightest pixel) contained in each row, and lightness data representing a minimum value (gray level value of the darkest pixel).

In S57 (step of calculating the dynamic range of each row) of FIG. 25, the adder 125 calculates as a dynamic range the difference between the maximum and minimum values of lightness data of each row, and temporarily stores the dynamic range in the RAM 130 via the data selector 126. The adder 125 executes dynamic range calculation processing for all the rows.

In S58 (step of calculating the linearly differentiated value of the dynamic range) of FIG. 25, the dynamic ranges of respective rows stored in the RAM 130 are read out via the data selector 126, and input again to the adder 125, which calculates the difference (linearly differentiated value) between the dynamic ranges of adjacent rows. The results are stored in the RAM 130 via the data selector 126.

In S59 (step of extracting a row number having a maximum dynamic range and minimum linearly differentiated value) of FIG. 25, data of the dynamic ranges of respective rows and data of the linearly differentiated values of the dynamic ranges which are stored in the RAM 130 are read out via the data selector 126, and input to the data comparator 124, which extracts a row number at which the dynamic range maximizes and the linearly differentiated value of the dynamic range minimizes (to 0 or a value close to 0).

In S60 (sensitivity referring/extraction step) of FIG. 25, the row number vs. image reading sensitivity correspondence table stored in the RAM 130 is looked up based on the extracted row number, and an image reading sensitivity, i.e., charge accumulating period set for this row is extracted.

In S61 (extracted sensitivity setting step) of FIG. 25, the data controller 122 rewrites the sensitivity setting register 127 to set the image reading sensitivity in the sensitivity setting register 127 to the extracted image reading sensitivity. In S62 (subject image reading step) of FIG. 25, normal reading operation of a subject image is executed at the extracted image reading sensitivity set in the sensitivity setting register 127.

An example of applying the fifth embodiment of the photosensor system drive control method to a fingerprint reading apparatus will be described with reference to FIGS. 26 to 27B.

As will be described below, the fifth embodiment can effectively prevent any malfunction in optimal sensitivity extraction processing even when image data read by the sensitivity-adjusting reading operation contains an abnormal value, and the abnormal value exists on not only one pixel but across a plurality of pixels. This embodiment can also be effectively applied to a case wherein image data does not contain any abnormal value, which will be described first.

The sensitivity-adjusting reading operation in the fifth embodiment is the same as that in the above embodiments. The fifth embodiment will exemplify a case wherein image data read by the sensitivity-adjusting reading operation is the same as image data shown in FIG. 15, and the sensitivity determination range is defined to a row/column range of 64th to 191st rows and 67th to 130th columns.

The result of extracting changes in lightness data in the 64th, 96th, 160th, and 191st rows in the sensitivity determination range and plotting them is the same as FIG. 16.

In accordance with the above-mentioned abnormal value removing operation, the lightness data distribution of respective rows is Fourier-transformed to obtain a frequency distribution for the row number, a high-frequency component corresponding to an abnormal value or noise is removed, and the resultant data is inversely Fourier-transformed to extract only lightness data representing a main change trend in the lightness data distribution of respective rows. In this case, image data does not contain any abnormal value. Thus, even if the high-frequency component of lightness data is removed, the lightness data distribution trend does not especially change. Hence, the dynamic range distribution of respective rows is the same as that shown in FIG. 17A. Changes in the linearly differentiated values of respective rows to this dynamic range distribution are also the same as those shown in FIG. 17B. For this reason, a row number extracted under conditions that the dynamic range is maximum and the linearly differentiated value is minimum is the same as in the third embodiment, and an optimal image reading sensitivity based on the extracted row number is also the same as in the third embodiment.

The following description concerns sensitivity setting operation when image data contains an abnormal value owing to a foreign substance attached to a subject or the sensing surface of the photosensor array, a defect of the sensor element constituting the photosensor array, or the like.

Figure 26:
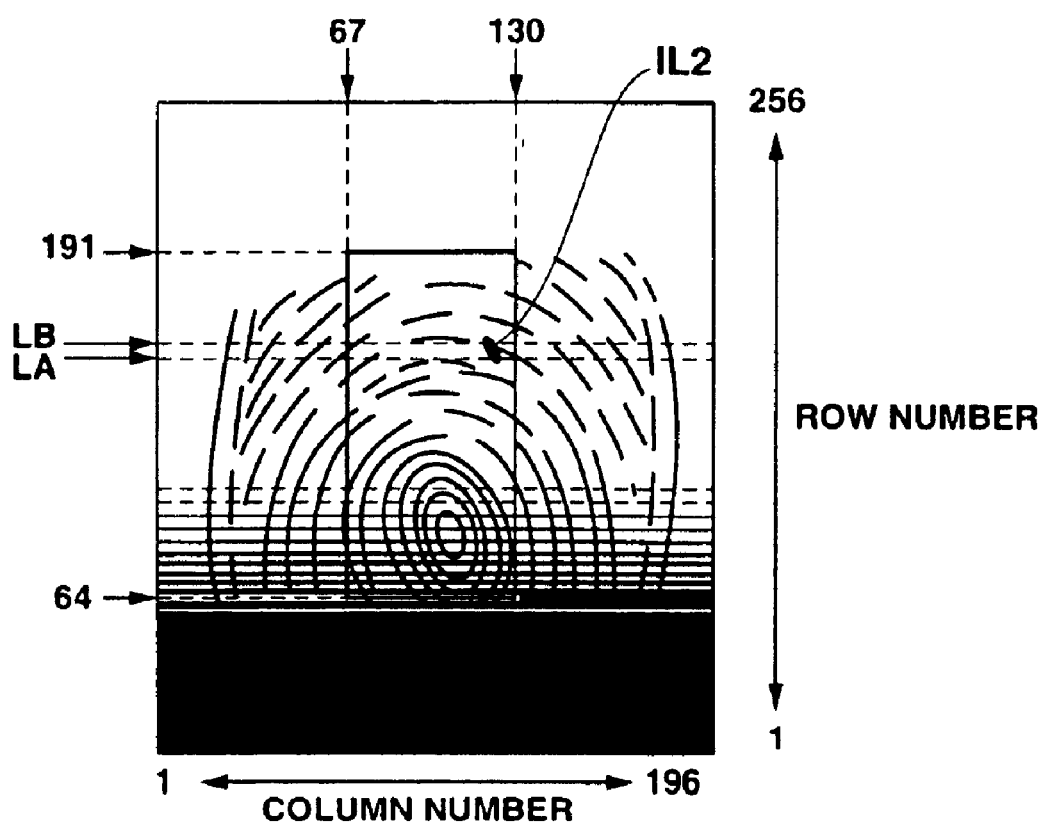
FIG. 26 is a view showing a case wherein an abnormal value across a plurality of rows exists in read image data of a fingerprint image in sensitivity-adjusting reading operation of the fifth embodiment.
Figure 27A:
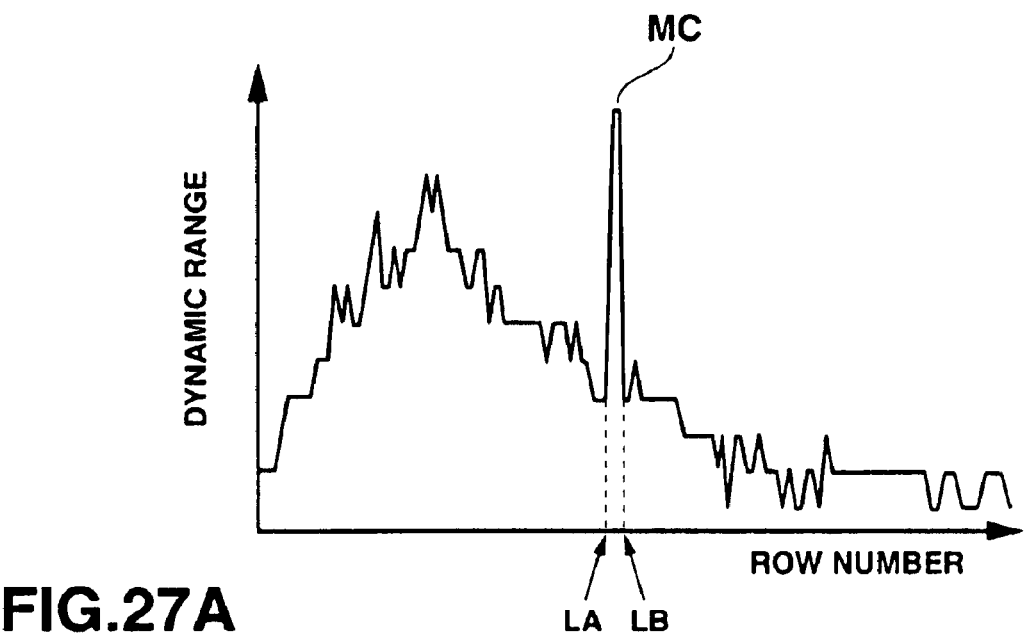
FIG. 27A is a graph showing changes in the dynamic ranges of respective rows when an abnormal value across a plurality of rows exists in read image data of a fingerprint image in sensitivity-adjusting reading operation of the fifth embodiment, and the dynamic range discretely varies for respective rows.
Figure 27B:
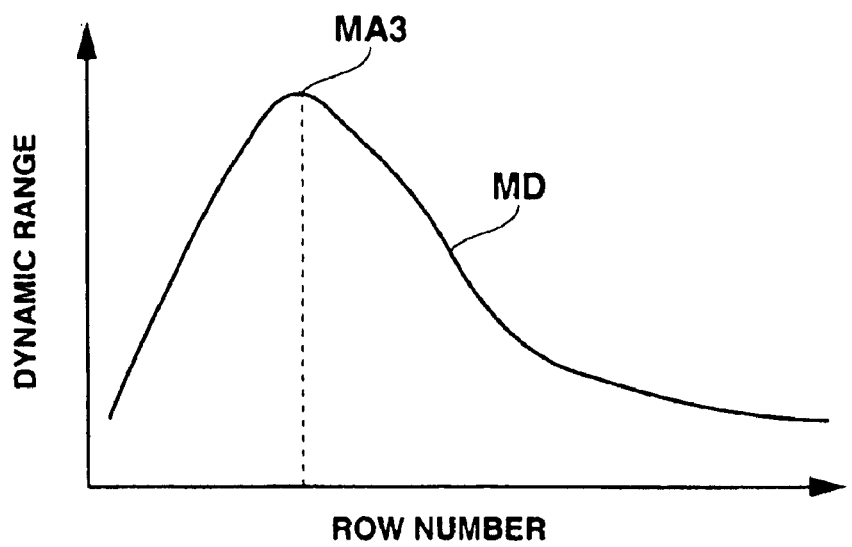
FIG. 27B is a graph showing the dynamic range distribution of lightness data of respective rows after abnormal value removing operation in the fifth embodiment.

FIG. 26 is a view showing an example of image data when a subject (fingerprint) image is read while the image reading sensitivity is changed stepwise for respective rows in sensitivity-adjusting reading operation. FIG. 27A is a graph showing the dynamic range distribution of lightness data of respective rows when a subject image has a component corresponding to a foreign substance or the like. FIG. 27B is a graph showing the dynamic range distribution of lightness data of respective rows after abnormal value removing operation according to the fifth embodiment.

As shown in FIG. 26, similar to the above-described case, a row/column range of 64th to 191st rows and 67th to 130th columns is set as a sensitivity determination range for read fingerprint image data. In this case, if an abnormal pixel IL2 relatively large enough to overlap a plurality of rows (LA to LB rows) exists in the sensitivity determination range owing to a foreign substance attached to the sensing surface of the photosensor array, a defect of the photosensor element, noise contained in image data, or the like, the lightness data of the abnormal pixel IL2 may exhibit an excessive value in a plurality of rows in comparison with peripheral pixel data, i.e., a value deviating from the change trend of peripheral pixel data. This occurs when, e.g., a relatively large black point exists on the white background, or a relatively large white point exists on the black background, and more specifically, when the variation width or dynamic range of lightness data discretely varies in respective rows, or abnormal pixel data MC due to a foreign substance attached to the sensing surface or a defect of an element exists across a plurality of rows (LA to LB rows), as shown in FIG. 27A.

If the sensitivity setting method of the third embodiment is applied without performing abnormal value removing operation, this sensitivity setting method extracts a row in which the dynamic range of lightness data for each row is maximal and the linearly differentiated value is minimal as a row having an optimal image reading sensitivity. Thus, the dynamic ranges of rows on which the abnormal pixel IL2 continuously exists may be recognized to exhibit a maximum value with respect to the main distribution trend of the whole dynamic range. In addition, the linearly differentiated value in a region representing a continuous change exhibits a value close to 0, and may be recognized to be a minimum value. As a result, a row (row between LA and LB) containing the abnormal pixel IL2 irrelevant to a row having an original optimal image reading sensitivity may be mistaken as a row corresponding to an optimal image reading sensitivity. In this case, an improper image reading sensitivity (e.g., charge accumulating period longer than an optimal value) is set in the photosensor system. In normal reading operation, a subject image may become, e.g., white.

To the contrary, the sensitivity setting method of the fifth embodiment can remove any abnormal value contained in lightness data by performing Fourier transformation to remove a high-frequency component corresponding to an abnormal value or noise prior to processing of obtaining the optimal value of the reading sensitivity based on the dynamic range of lightness data. As shown in FIG. 27B, an abnormal value greatly deviating from the dynamic range distribution trend of lightness data for the row number is eliminated, and only smoothed lightness data MD representing a main change trend is extracted. On the basis of the extracted lightness data MD, a row corresponding to a maximum value MA3 of the dynamic range shown in FIG. 27B is extracted as a row having an optimal image reading sensitivity under the conditions that the dynamic range is maximum and the linearly differentiated value of the dynamic range is minimum.

Even when a subject image contains the abnormal pixel IL2 relatively large enough to overlap a plurality of rows owing to a foreign substance attached to the sensing surface of the photosensor array, a defect of the photosensor element, noise contained in image data, or the like, a row having a fine contrast corresponding to the ridge/valley pattern of a fingerprint can be reliably extracted to determine an optimal charge accumulating period. The fifth embodiment can therefore provide a fingerprint reading apparatus capable of reading a high-quality fingerprint image with almost no malfunction.

Note that the fifth embodiment executes sensitivity setting processing while the sensitivity determination range is limited to a row/column range of 64th to 191st rows and 67th to 130th columns. However, the embodiment is not limited to this, and can also be applied to a case wherein sensitivity setting processing is executed for the entire region of image data without limiting the sensitivity determination range.

<Sixth Embodiment>

The sixth embodiment of a photosensor system drive control method according to the present invention will be described with reference to the accompanying drawings.

In the first to fifth embodiments described above, the sensitivity-adjusting reading operation is performed, with the image reading sensitivity being changed stepwise for each of the rows of the photosensor array, and one subject image is thereby read at a plurality of different densities. In the sixth embodiment, the image reading sensitivity of the photosensors of one or several rows (hereinafter referred to as a specific row section) of the photosensor array is changed stepwise, and the subject image portion corresponding to the specific row section is read. The controller applied to the sixth embodiment is similar in structure to the controller 120 employed in the first and second embodiments and represented by the structural blocks shown in FIG. 2.

Figure 28:
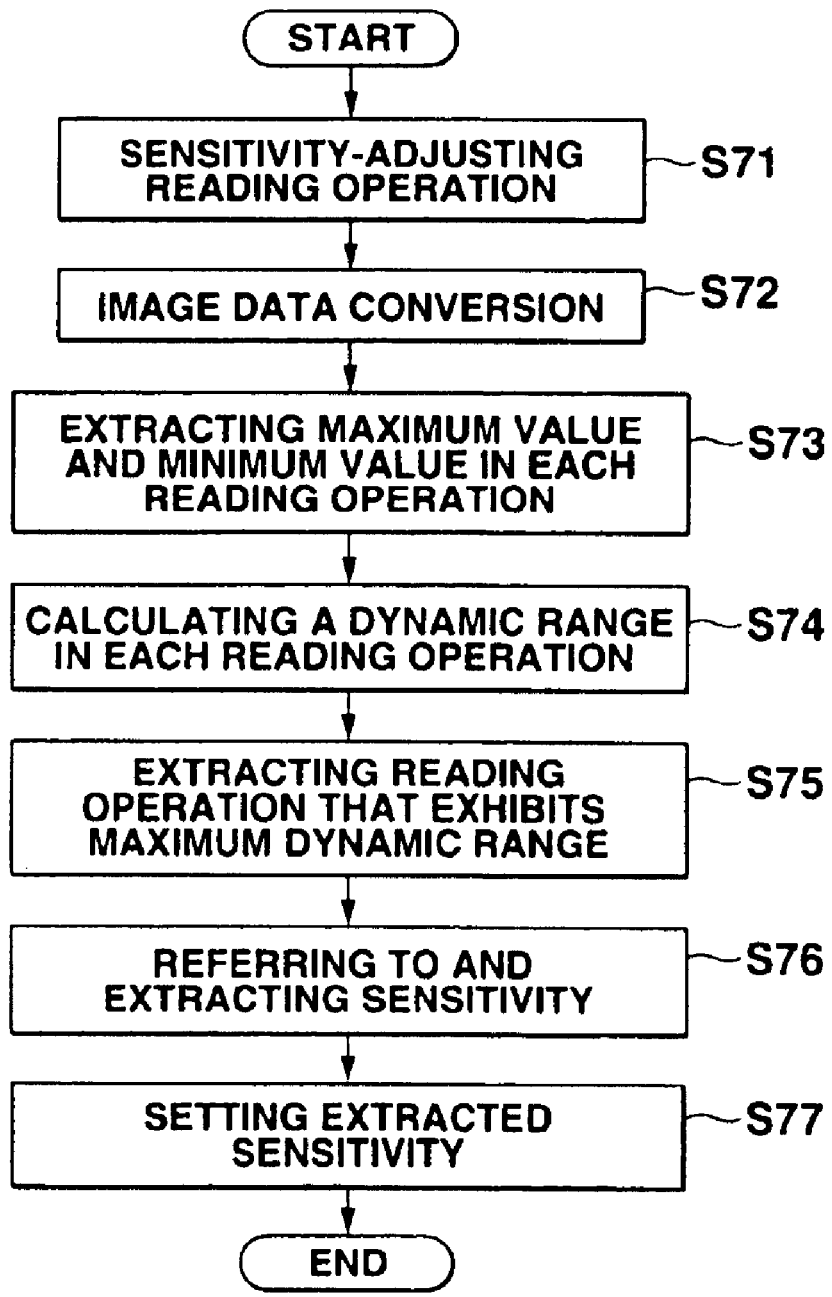
FIG. 28 is a flowchart illustrating operation of the sixth embodiment.
Figure 29:
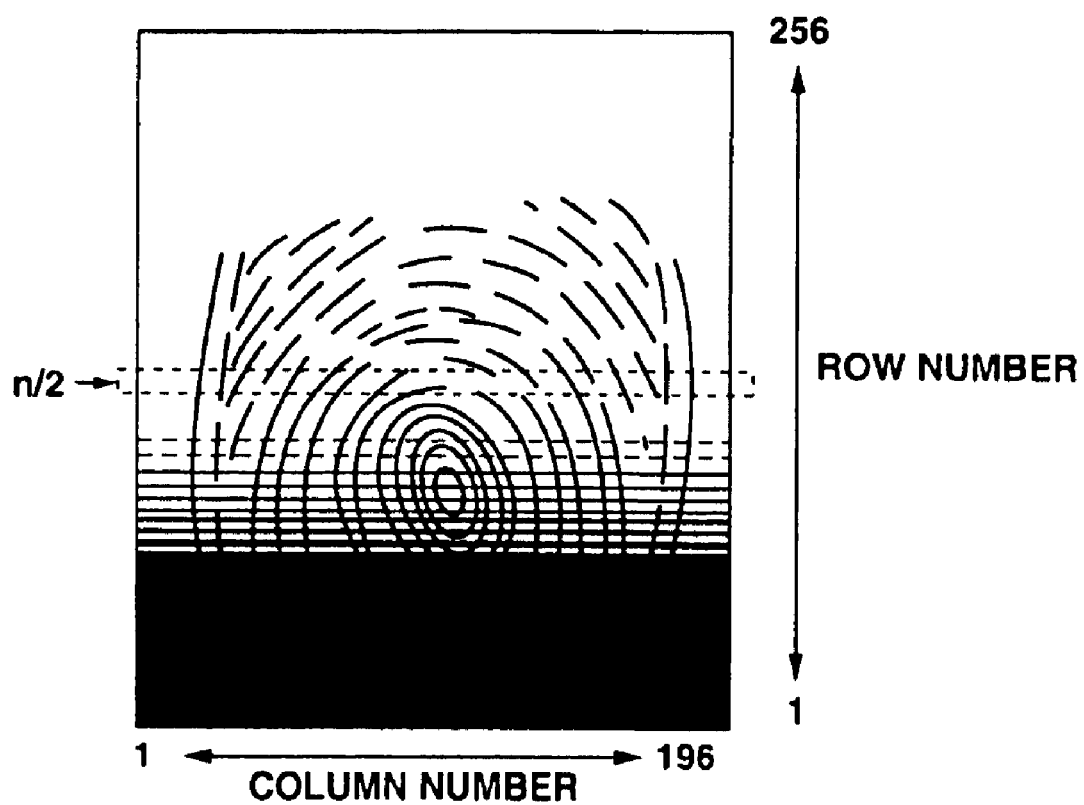
FIG. 29 shows a specific row section of a photosensor array for which sensitivity-adjusting reading operation is performed according to the sixth embodiment, the specific row section being illustrated in relation to a subject image.

FIG. 28 is a flowchart illustrating how the controller 120 controls the operation of the photosensor system in the sixth embodiment of the present invention. In the flowchart, the operations executed up to the optimal image reading sensitivity setting are illustrated. FIG. 29 shows a specific row section of the photosensor array for which the sensitivity-adjusting reading operation is performed according to the sixth embodiment, the specific row section being illustrated as n/2 in relation to a subject image. In the description below, reference will be made to the structure of the photosensor system shown in FIGS. 1 and 2, if required.

In S71 (sensitivity-adjusting reading operation) of FIG. 28, the main controller 123 controls to set an image reading sensitivity for sensitivity-adjusting reading operation in the sensitivity setting register 127 via the data controller 122, and executes the sensitivity-adjusting reading operation of reading a subject image at a plurality of different sensitivities while changing the image reading sensitivity stepwise for respective specific row section of the subject image. These operations are executed prior to the normal reading operation of the subject image, for example. It should be noted that the sensitivity-adjusting reading operation applicable to the sensitivity adjusting method of the sixth embodiment is performed, using a photosensor array 100 in which photosensors are arranged in units of a matrix pattern of 256 rows×196 columns, as shown in FIG. 29. In this photosensor array, a central row (i.e., the n/2-th row) or several rows in the vicinity thereof are regarded as a specific row section, and the photosensors 10 corresponding to the specific row section are reset. Thereafter, precharge operation and read-out operation are repeatedly executed at predetermined timings in such a manner that the charge accumulating period (image reading sensitivity) varies stepwise. In other words, the image reading sensitivity is made to vary in correspondence to the number of times reading operation is executed. Data are stored in a RAM 130, for example, in a table format of (the number of times of reading operation) vs (image reading sensitivity correspondence table). A specific method for setting the image reading sensitivity will be described later.

In S72 (image data conversion step) of FIG. 28, the image data read by the sensitivity-adjusting reading operation are converted into digital signals via an amplifier 116 and an A/D converter 117. The digital signal is supplied to a data comparator 124 of the controller 120 as lightness data corresponding to the bright/dark pattern of the subject image. The lightness data are expressed by, e.g., 256 gray levels. The image data corresponding to each reading operation are converted into a lightness data value in the range of 0 to 255 and stored in the data comparator 124. A specific example is shown in FIGS. 30A to 30E. FIGS. 30A to 30E show lightness data which are obtained when reading operation has been executed a predetermined number of times, and in which the image reading sensitivity increases with an increase in the number of times reading operation is executed. For example, FIGS. 30A to 30E show how lightness data change in the columns when reading operation has been executed 16 times (FIG. 30A), 32 times (FIG. 30B), 64 times (FIG. 30C), 96 times (FIG. 30D) and 128 times (FIG. 30E). The lightness data obtained when the reading operation has been executed 16 times and 32 times are data wherein the image reading sensitivity is low. Since the sensitivity is thus insufficient, there are columns in which the data value is "0" (lower limit). On the other hand, the lightness data obtained when the reading operation has been executed 96 times and 128 times are data wherein the image reading sensitivity is high. Since the sensitivity is too high, there are columns in which the data value is "255" (upper limit).

In S73 (the step of extracting a maximum value and a minimum value in each reading operation) of FIG. 28, a maximum value and a minimum value are extracted from the lightness data supplied to the data comparator 124. The extracted maximum and minimum values are output to the adder 125. In other words, the lightness data value indicating a maximum value (i.e., the gray level of the brightest pixel) and the lightness data value indicating a minimum value (i.e., the gray level of the darkest pixel) are extracted each time reading operation is executed.

Next, in S74 (the step of calculating a dynamic range in each reading operation) of FIG. 28, the adder 125 calculates the difference between the maximum and minimum values of lightness data in each reading operation as a dynamic range. The result of this calculation is stored in the RAM 130 through the use of the data selector 126. This dynamic range calculation step is executed each time reading operation is performed.

Figure 31:
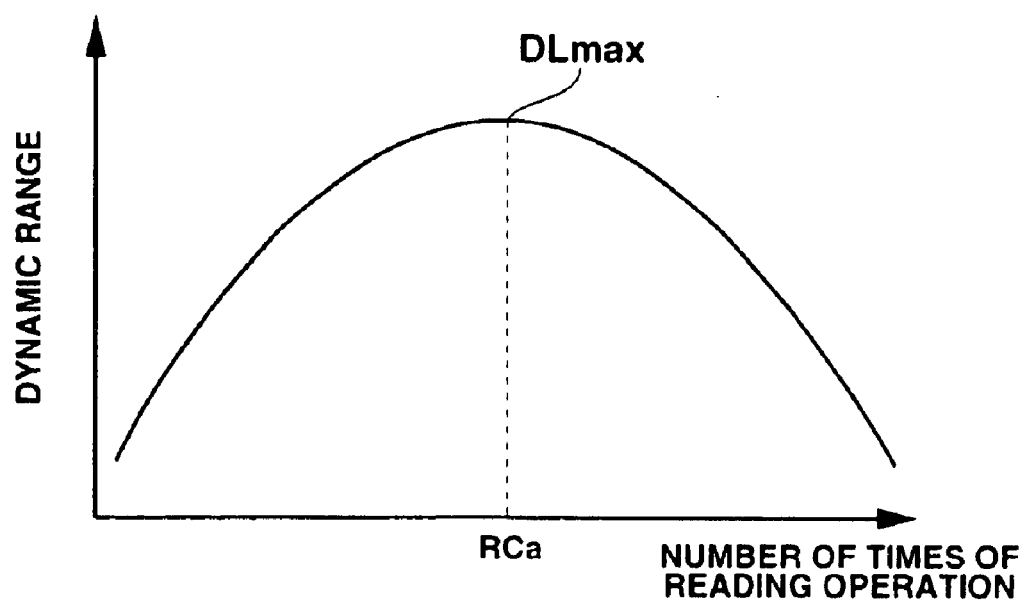
FIG. 31 is a graph showing how a dynamic range changes in the sixth embodiment, in relation to the number of times the reading operation is performed.

In S75 (the step of extracting a reading operation that exhibits a maximum dynamic range) of FIG. 28, the data selector 126 reads out dynamic ranges of reading operations from the RAM 130, and the readout dynamic ranges are supplied to the data comparator 124. On the basis of the dynamic range changing tendency (FIG. 31) relative to the number of times of a reading operation is executed, a maximum value DLmax of the dynamic range is determined in relation to the number of times a reading operation is executed, and the number RCa of times corresponding to the determined maximum value is extracted. In the example shown in FIGS. 30A to 30E, the lightness data obtained in the 16th and 32nd reading operations have a minimum value saturated at the lower limit (=0), and the lightness data obtained in the 96th and 128th reading operations has a maximum value saturated at the upper limit (=255). In contrast, the lightness data obtained in the 64th reading operation does not have a value that is saturated at the upper or lower limit. As a result, the dynamic range of the lightness data obtained in the 64th reading operation is greater than the dynamic ranges of the other lightness data. Hence, the maximum value is DLmax, and the number RCa of the reading operation corresponding to that maximum value is 64.

Next, S76 (the step of referring to and extracting a sensitivity) of FIG. 28 is executed on the basis of the extracted number RCa. In the step, the image reading sensitivity (i.e., the charge accumulating period) corresponding to the number RCa of the reading operation is extracted by referring to the table stored in the RAM 130, i.e., the table of [the number of times of reading operation] vs [image reading sensitivity correspondence table].

In S77 (the step of setting the extracted sensitivity) of FIG. 28, the main controller 123 causes the data controller 122 to rewrite the data in the sensitivity setting register 127, so that the image reading sensitivity of the sensitivity setting register 127 is set at the extracted image reading sensitivity. This brings an end to the optimal image reading sensitivity setting based on the sensitivity-adjusting reading operation.

According to the sensitivity setting method of the sixth embodiment, one or more specific rows (specific row section) of the photosensor array are selected, and the sensitivity-adjusting reading operation (which repeatedly reads a subject image at predetermined intervals) is executed in the selected specific row section after resetting operation. Hence, the subject image can be read, with the image reading sensitivity (charge accumulating period) being varied stepwise. In comparison with the case where resetting operation is repeated executed for each of the rows of the photosensor array, as in the first to fifth embodiments, the time needed for the sensitivity-adjusting reading operation can be as short as possible.

In the first to fifth embodiments, the sensitivity-adjusting reading operation is executed for the entire light-receiving area or a selected light-receiving area of the photosensor array, and an optimal image reading sensitivity is extracted on the basis of the read image data corresponding to one frame. Unlike these embodiments, the sixth embodiment uses image data corresponding to one or several specific rows (specific row section). In comparison with the foregoing embodiments, the amount of data used for the extraction of an optimal image reading sensitivity can be significantly reduced, resulting in a remarkable decrease in the processing load. In addition, the time needed for the setting of an optimal image reading sensitivity can be significantly shortened.

Furthermore, the sensitivity-adjusting reading operation is limited to the specific row section. Unlike the first to fifth embodiments, wherein the sensitivity-adjusting reading operation is executed for the entire light-receiving area of the photosensor array or a selected portion thereof, the sixth embodiment has significantly lowered the probability of inclusion of an abnormal pixel (a missing point or a twinkling point), which may be caused by a foreign substance adhering to a target area, a defective element of a photosensor, or the like. Hence, there is a significantly lowered probability that an inappropriate image reading sensitivity will be set due to the existence of such an abnormal pixel. Accordingly, a malfunction is prevented in fingerprint recognition processing.

In the sixth embodiment, specific row section is a central row (n/2-th row) and several rows located in the vicinity thereof in a matrix of n rows×m columns (n=256, m=196). Needless to say, the present invention is not limited to this. The specific row section may be selected from any area as long as that area shows a clear brightness pattern (contrast) of a subject image. For example, the specific row section may be those located near the central row, or may be selected from another area.

<Seventh Embodiment>

The seventh embodiment of a photosensor system drive control method according to the present invention will be described with reference to the accompanying drawings.

In the sixth embodiment described above, the sensitivity-adjusting reading operation is executed for one or several specific rows (specific row section). This significantly reduces the probability that an abnormal pixel exits in the target specific row section in comparison with the case where the entire light-receiving area of a photosensor array or a selected area thereof is subjected to the reading operation. However, the probability that an abnormal pixel exists in the specific row section is in no way "zero."

Like the sixth embodiment, the seventh embodiment is intended to reliably prevent the adverse effects an abnormal pixel may have when the sensitivity-adjusting reading operation is performed for the specific row section. The controller applied to the seventh embodiment is similar in structure to the controller 120 employed in the first, second and sixth embodiments and is represented by the structural blocks shown in FIG. 2.

Figure 32:
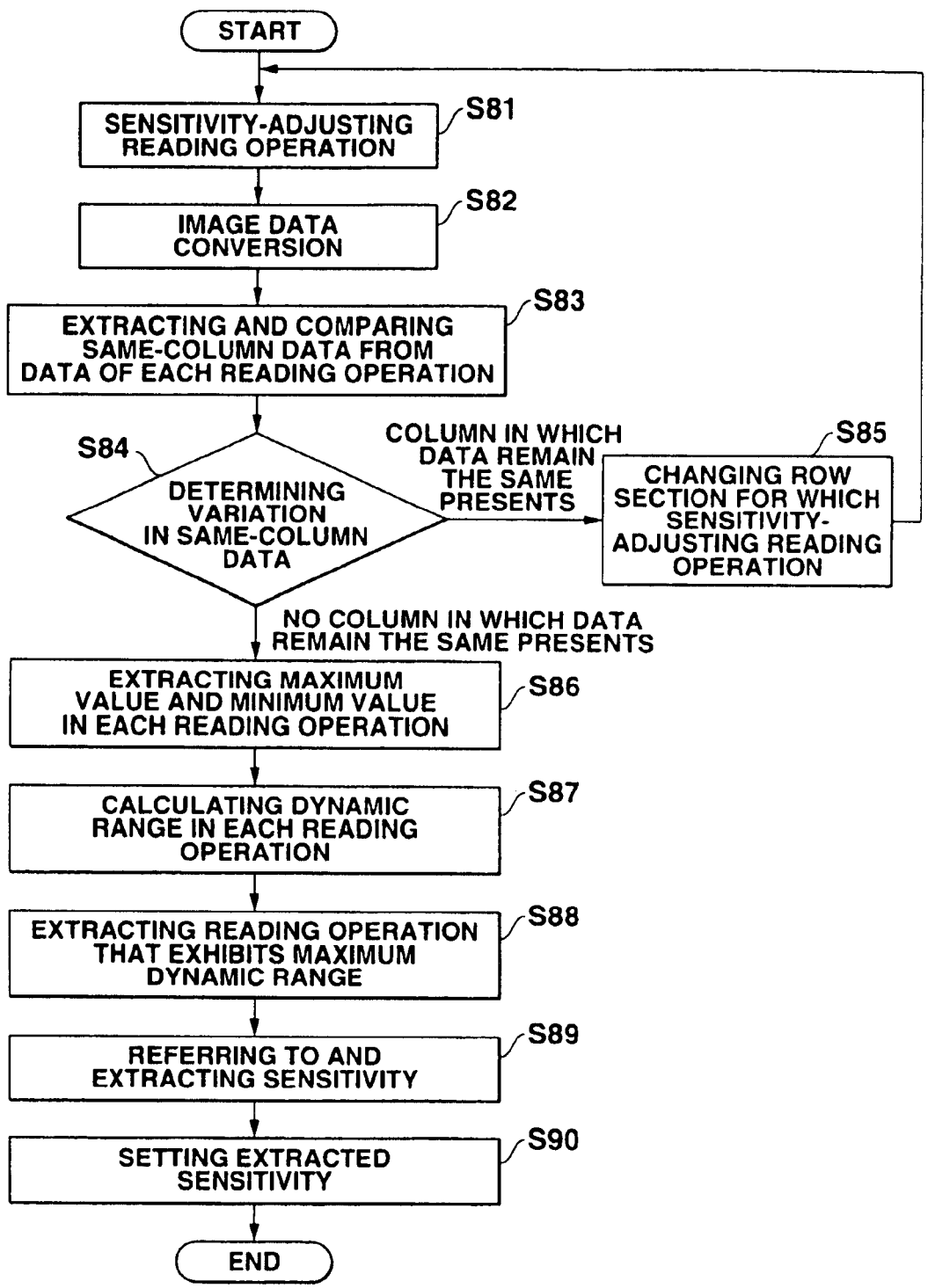
FIG. 32 is a flowchart illustrating operation of the seventh embodiment.
Figure 33:
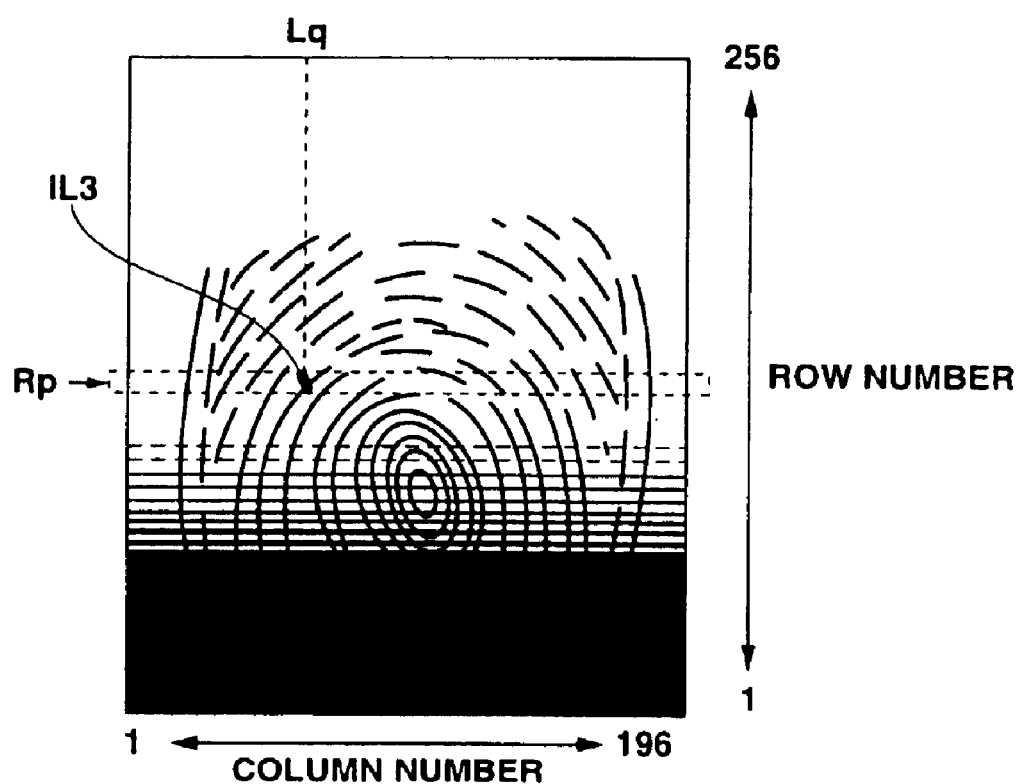
FIG. 33 shows a specific row section of a photosensor array for which sensitivity-adjusting reading operation is performed according to the seventh embodiment, the specific row section being illustrated in relation to a subject image.

FIG. 32 is a flowchart illustrating how the controller 120 controls the operation of the photosensor system in the seventh embodiment of the present invention. In the flowchart, the operations executed up to the optimal image reading sensitivity setting are illustrated. FIG. 33 shows a specific row section of the photosensor array for which the sensitivity-adjusting reading operation is performed according to the seventh embodiment, the specific row section being illustrated as Rp in relation to a subject image. In the description below, reference will be made to the structure of the photosensor system shown in FIGS. 1 and 2, if required. Similar or corresponding structural elements will be denoted by the same reference numerals as used in the description of the sixth embodiment, and a simplified description will be given of such structural elements.

The sensitivity-adjusting reading operation applied to the sensitivity adjusting method of the seventh embodiment is executed for a specific row Rp of a photosensor array 100 in which photosensors are arranged in units of a matrix pattern of 256 rows×196 columns, as shown in FIG. 33. In the description below, it is assumed that an abnormal pixel IL3 exits at the position of row Rp and column Lq, and that the value of the lightness data at that position is "0", due to a foreign substance adhering to the sensing surface of the photosensor array, a defective element of the photosensor, or the like.

Step S81 (sensitivity-adjusting reading operation) of FIG. 32 is executed in a similar manner to that of S71 of the sixth embodiment. That is, the photosensors corresponding to the specific row Rp of the photosensor array 100 shown in FIG. 33 are controlled in such a manner that the charge accumulating period (i.e., the image reading sensitivity) varies stepwise at predetermined intervals. The sensitivity-adjusting reading operation is performed for a subject image at a plurality of image reading sensitivities, which correspond to the number of times reading operation has been executed. These operations are executed prior to the normal reading of the subject image.

Figure 34C:
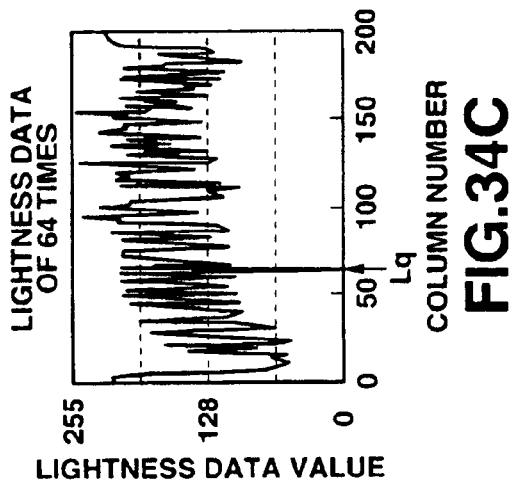
FIGS. 34A to 34E are graphs showing how lightness data on a specific row section changes in the seventh embodiment, in relation to the number of times the reading operation is performed.
Figure 34B:
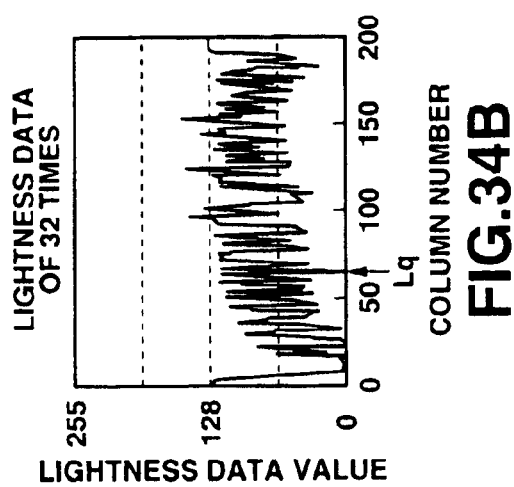
Figure 34E:
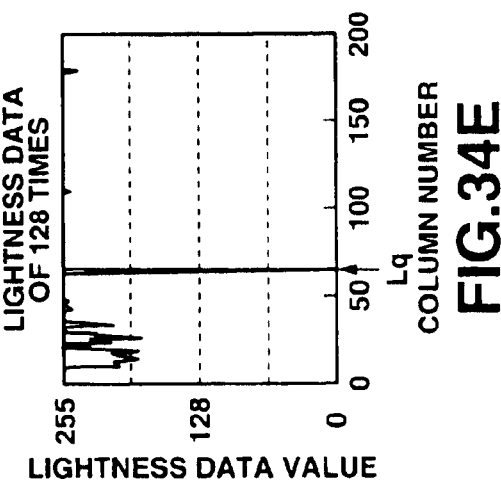
Figure 34A:
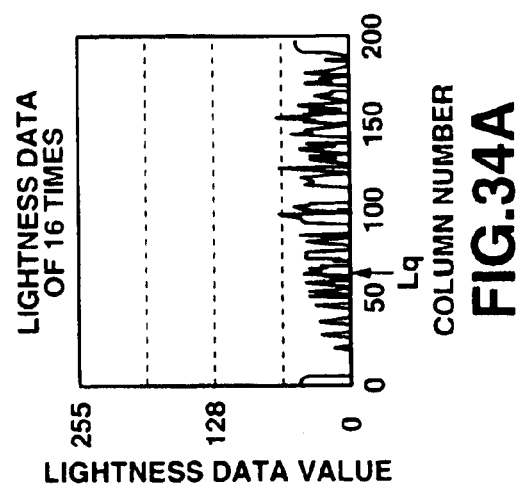
Figure 34D:
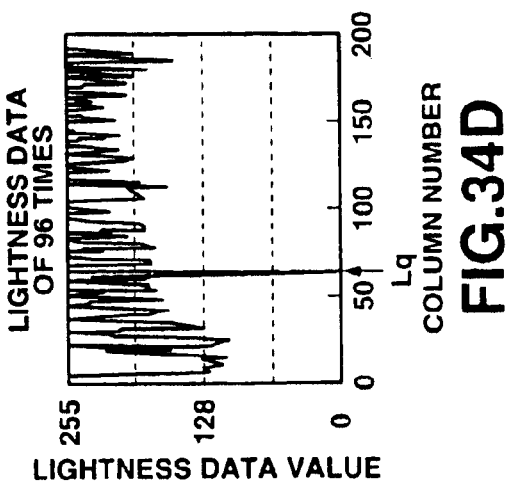

Step S82 (image data conversion step) of FIG. 32, is executed in a similar manner to that of S72 of the sixth embodiment. The image data read by the sensitivity-adjusting reading operation are converted into lightness data. The lightness data are supplied to the controller 120 and stored in the RAM 130. A specific example is shown in FIGS. 34A to 34E. Like FIGS. 30A to 30E, FIGS. 34A to 34E show how lightness data change in the columns when reading operation has been executed 16 times (FIG. 34A), 32 times (FIG. 34B), 64 times (FIG. 34C), 96 times (FIG. 34D) and 128 times (FIG. 34E). The lightness data obtained when the reading operation has been executed 16 times and 32 times are data wherein the image reading sensitivity is low. Since the sensitivity is thus insufficient, there are columns in which the data value is "0" (lower limit). On the other hand, the lightness data obtained when the reading operation has been executed 96 times and 128 times are data wherein the image reading sensitivity is high. Since the sensitivity is too high, there are columns in which the data value is "255" (upper limit).

Next, step S83 (the step of extracting and comparing the same-column data from the data of each reading operation) shown in FIG. 32 is executed. In this step, the data selector 126 extracts lightness data of the same column from the lightness data stored in the RAM 130 and corresponding to each reading operation. The extracted lightness data are supplied to the data comparator 124 so as to compare the lightness data of the same column.

Then, step S84 (the step of determining a variation in the same-column data) shown in FIG. 32 is executed. This step is for determining whether there is a column in which the lightness data remain the same after each reading operation. If there is a column in which the lightness data do not changed, the pixels corresponding to this column are regarded as abnormal ones, and the specific row section for which the sensitivity-adjusting reading operation is performed is determined as containing an abnormal pixel.

If there is not a column in which the lightness data remain the same, the specific row section for which the sensitivity-adjusting reading operation is performed is determined as not containing an abnormal pixel.

A result of this determination is supplied from the data comparator 124 to the main controller 123. In the example shown in FIG. 37, the abnormal pixel IL3 is present, and the lightness data corresponding to column number Lq are "0" irrespective of the number of times reading operation is executed. In other words, there is a column in which the lightness data remain the same after each reading operation, and row Rq is determined to contain an abnormal pixel.

A description will be given of a specific method for checking the presence/absence of an abnormal pixel by detecting whether or not there is a column in which the lightness data do not changed before and after each reading operation. For example, the sensitivity-adjusting reading operation may be controlled as follows: Flags are set for the respective columns on the basis of the lightness data on the columns obtained by the first-time reading operation. The light data obtained by subsequent reading operations are compared with the lightness data obtained by the first-time reading operation. This comparison is executed for each of the columns. If the lightness data on a column differ from the original lightness data, the flag corresponding to that column is reset. As long as a pixel is normal, the lightness data on the pixel vary in accordance with a change in the image reading sensitivity. Hence, the flag of the pixel is reset. On the other hand, if the pixel is abnormal, the lightness data on the column containing the abnormal pixel do not vary even when the image reading sensitivity changes. The value of the lightness data is an upper-limit value, a lower-limit value or a constant in between, for example. Hence, the flag continues to be in the set state. As can be seen from this, an abnormal pixel present in a specific row section for which the sensitivity-adjusting reading operation is to be executed can be detected by monitoring the states of the flags.

If step S84 (the step of determining a variation in the same-column data) determines that an abnormal pixel exists, step S85 (the step of changing the row section for which the sensitivity-adjusting reading operation) shown in FIG. 32 is executed. In this step, the main controller 123 causes the device controller 121 to change the specific row section for which the sensitivity-adjusting reading operation is to be executed. Thereafter, the operations starting from S81 (sensitivity-adjusting reading operation) are executed again. It is only required that the specific row section for which the sensitivity-adjusting reading operation is newly executed be a another specific row section other than the specific row section where the abnormal pixel IL3 is detected. For example, the another specific row section may be the one that is adjacent to row Rp in the upper or lower area, or may be the one that is away from that specific row section by a predetermined number of rows. The processing in steps S81–S84 is repeatedly executed until the specific row section for which the sensitivity-adjusting reading operation is to be executed is determined as not containing an abnormal pixel.

If step S84 (the step of determining a variation in the same-column data) determines that an abnormal pixel does not exist in the specific row section for which the sensitivity-adjusting reading operation is to be executed, step S86 (the step of extracting a maximum value and a minimum value in each reading operation) shown in FIG. 32 is executed. In this step, maximum and minimum values are extracted from the lightness data obtained in each reading operation and supplied to the data comparator 124, and output to the adder 125, as in step S73 of the sixth embodiment.

Subsequently, step S87 (the step of calculating a dynamic range in each reading operation), step S88 (the step of extracting a reading operation that exhibits a maximum dynamic range), step S89 (the step of referring to and extracting a sensitivity) and step S90 (the step of setting the extracted sensitivity) shown in FIG. 32, are sequentially executed. These steps are similar to steps S74 to S77 of the sixth embodiment described above. That is, the dynamic range of the lightness data obtained in each reading operation is calculated by the adder, and then the data comparator 124 checks the dynamic range changing tendency (FIG. 31) relative to the number of times a reading operation is executed, and detects the reading operation in which the dynamic range is maximal. The image reading sensitivity (the charge accumulating period) corresponding to this reading operation is set in the sensitivity setting register 127, thereby bringing an end to the optimal image reading sensitivity setting based on the sensitivity-adjusting reading operation.

In the sensitivity setting method of the seventh embodiment, if an abnormal pixel, which is due to a foreign substance adhering to the sensing surface of the photosensor array, any defective element of the photosensor, or the like, is present in the specific row section for which the sensitivity-adjusting reading operation is to be executed, such an abnormal pixel can be easily detected. Based on this detection, the sensitivity-adjusting reading operation is executed for another specific row section where no abnormal pixel exists. In this manner, lightness data corresponding to a specific row section containing no abnormal pixel is acquired as lightness data for sensitivity adjustment. Even if the specific row section originally selected for the sensitivity-adjusting reading operation contains an abnormal pixel, the adverse effects arising from such an abnormal pixel can be obviated.

In addition, an optimal image reading sensitivity is unconditionally determined on the basis of the dynamic range of light data acquired by the sensitivity-adjusting reading operation. Therefore, even when the sensitivity-adjusting reading operation is to be executed for a specific row section different from the originally selected specific row section, the image reading sensitivity is kept optimal. Normal reading operation for a subject image can be executed in a reliable manner irrespective of the ambient conditions, such as the illuminated state of the environment. Accordingly, a malfunction is prevented in fingerprint recognition processing or the like.

In the sixth and seventh embodiments described above, the specific row section for which the sensitivity-adjusting reading operation is to be executed is predetermined, for example, in the center of the photosensor. The present invention is not limited to this. That is, the specific row section need not be designated beforehand. For example, the entire area of a subject image or a predetermined area thereof may be read at an arbitrary image reading sensitivity. In this case, a specific row section most suitable for image reading is extracted, and one or several rows of the specific row section may be determined on the basis of the extracted data. An image reading sensitivity (charge accumulating period) setting method applicable to the sensitivity-adjusting reading operation in the above-described embodiments will be described with reference to the several views of the accompanying drawing. In the description below, reference will be made to the structure of the photosensor system shown in FIGS. 1 and 2 and the structure of the photosensor system shown in FIGS. 39A and 40, if required.

FIGS. 35A to 35J are timing charts showing the first embodiment of the image reading sensitivity (charge accumulating period) setting method, which is applicable to the sensitivity-adjusting reading operation of the first to fifth embodiments.

According to the image reading sensitivity setting method of this embodiment, as shown in FIGS. 35A to 35D, reset pulses $\phi T1, \phi T2, \ldots, \phi Tn$ are simultaneously applied to respective top gate lines 101 connected to the top gate terminals TG of double-gate photosensors 10 in the row direction, thereby simultaneously starting a reset period $T_{reset}$, and initializing the double-gate photosensors 10 of respective rows.

The reset pulses $\phi T1, \phi T2, \ldots, \phi Tn$ simultaneously fall to end the reset period $T_{reset}$. Then, charge accumulating periods $T_1, T_2, \ldots, T_{n-1}, T_n$ of the double-gate photosensors 10 on all the rows simultaneously start, and charges (holes) are generated and accumulated in the channel regions in accordance with light quantities entering the double-gate photosensors 10 of respective rows from their top gate terminal (21) side.

As shown in FIGS. 35E to 35I, a pre-charge pulse $\phi pg$ and readout pulses $\phi B1, \phi B2, \ldots, \phi Bn$ corresponding to the bottom gate line 102 are applied to change stepwise the charge accumulating periods $T_1, T_2, \ldots, T_{n-1}, T_n$ set for respective rows by a predetermined delay time $T_{delay}$ for respective rows. In this case, the delay time $T_{delay}$ is equal to or longer than the total time of the reset period $T_{reset}$, pre-charge time $T_{prch}$, and readout time $T_{read}$.

As shown in FIG. 35J, therefore, drain voltages VD1, VD2, . . . , VDm varying in correspondence to the charge accumulated in the charge accumulating periods T1, T2, . . . , Tn, which are between the end of the reset period $T_{reset}$ and the start of the readout time $T_{read}$ (i.e., the application of the readout pulses $\phi B1, \phi B2, \ldots, \phi Bn$), are sequentially read out.

Hence, image data read at reading sensitivities different for respective rows constituting a subject image can be attained by one reading operation of the subject image in sensitivity-adjusting reading operation performed prior to sensitivity setting processing as described in the above embodiments.

FIGS. 36A to 36J are timing charts showing the second embodiment of the image reading sensitivity (charge accumulating period) setting method, which is applicable to the sensitivity-adjusting reading operation of the first to fifth embodiments.

According to the image reading sensitivity setting method of this embodiment, as shown in FIGS. 36A to 36D, the reset pulses φT1, φT2, . . . , φTn are sequentially applied to the respective top gate lines 101 connected to the top gate terminals TG of the double-gate photosensors 10 in the row direction at a time interval of a predetermined delay time $T_{delay}$, thereby starting the reset period $T_{reset}$, and initializing the double-gate photosensors 10 of respective rows.

The reset pulses φT1, φT2, . . . , φTn fall to end the reset period $T_{reset}$. Then, charge accumulating periods $TA_1$, $TA_2$, . . . , $TA_{n-1}$, $TA_n$ sequentially start, and charges (holes) are generated and accumulated in the channel regions in accordance with light quantities entering the double-gate photosensors 10 of respective rows from their top gate terminal (21) side.

As shown in FIGS. 36E to 36I, the pre-charge pulse φpg and readout pulses φBn, φBn−1, . . . , φB2, φB1 corresponding to the bottom gate line 102 are applied to change stepwise the charge accumulating periods $TA_1$, $TA_2$, . . . , $TA_{n-1}$, $TA_n$ set for respective rows by the predetermined delay time $T_{delay}$ for respective rows after the final reset pulse φTn falls. In this case, the delay time $T_{delay}$ is equal to or longer than the total time of the reset period $T_{reset}$, pre-charge time $T_{prch}$ and readout time $T_{read}$.

As shown in FIG. 36J, therefore, drain voltages VD1, VD2, . . . , VDm varying in correspondence to the charge accumulated in the charge accumulating periods TAn, TAn−1, . . . , TA1, which are between the end of the reset period $T_{reset}$ and the start of the readout time $T_{read}$ (i.e., the application of the readout pulses φBn, φBn−1, . . . , φB1), are sequentially read out.

By this sensitivity-adjusting reading operation, the charge accumulating periods $TA_1$, $TA_2$, . . . , $TA_{n-1}$, $TA_n$ set for respective rows increase at a time interval twice the predetermined delay time $T_{delay}$, and thus image data read at reading sensitivities set at a sensitivity adjustment width of several rows or more can be obtained by reading operation of one frame.

FIGS. 37A to 37L are timing charts illustrating an embodiment of the sensitivity-adjusting reading operation, which is applicable to the sensitivity-adjusting reading operation of the sixth and seventh embodiments. In the description below, it is assumed that the one specific row section for which the sensitivity-adjusting reading operation is to be executed is a row located in the center.

As shown in FIGS. 37A to 37E, the image reading sensitivity setting method of the embodiment initializes only the double-gate photosensors of a central row (n/2n-th row), i.e., a specific row, of the photosensor array shown in FIG. 40. More specifically, waves φT1 to φTn/2−1 and φTn/2+1 to φTn applied to the first to (n/2−1)-th rows and (n/2+1)-th to n-th rows, which are among the top gate lines 101 connected to the top gate terminals TG of the double-gate photosensors 10 in the row direction, are set at a low level, and a single reset pulseφTn/2 is applied only to the n/2-th row. In this manner, the reset period $T_{reset}$ is started, and only the double-gate photosensors 10 of the (n/2)-th row are initialized.

Then, the reset pulse φTn/2 falls and the reset period $T_{reset}$ ends. Thereafter, the charge accumulating period starts, and charges (holes) are generated and accumulated in the channel regions in accordance with the amount of light entering the double-gate photosensors 10 of the n/2-th row from their top gate terminal (21) side.

Subsequently, as shown in FIGS. 37F to 37K, precharge signal φpg and readout pulse φBn/2, which is predetermined for the bottom gate lines 102 of the n/2-th row, are alternately applied at predetermined intervals Tint a number of times (x times, x: an integer larger than 1). Waves φB1 to φBn/2−1 and φBn/2+1 to φBn applied to the bottom gate lines 102 of the first to (n/2−1)-th rows and (n/2+1)-th to n-th rows are set at a low level.

As shown in FIG. 37L, therefore, drain voltages VD1, VD2, . . . , VDm varying in correspondence to the charge accumulated in the charge accumulating periods TB1, TB2, . . . , TBx, which are between the end of the reset period $T_{reset}$ and the start of the readout time $T_{read}$ (i.e., the application of the readout pulses φBn/2), are sequentially read out.

By this sensitivity-adjusting reading operation, the charge accumulating period of a specific row section increases stepwise at predetermined time intervals Tint. Hence, image data is read from a subject image, with the image corresponding to the specific row section being read at a plurality of different image reading sensitivities.

In the sensitivity-adjusting reading operation described above, the photosensors corresponding to one of the specific row section are reset at a time, and reading operation is repeatedly executed with respect to them. In this connection, it should be noted that the amount of charge accumulated in each photosensor may be varied by the readout operation. To solve this problem, the charge accumulating period of each reading operation may be corrected in accordance with an actual charge accumulating period on the basis of the correspondence between the number of times reading operation is performed and the amount of charge accumulated.

As described above, according to the sensitivity setting methods of the above embodiments, sensitivity-adjusting reading operation is executed with respect to a subject image while simultaneously changing the image reading sensitivity stepwise. On the basis of the distribution of the dynamic ranges of the lightness data obtained at each image reading sensitivity or the linearly differentiated values of the dynamic ranges, an image reading sensitivity which ensures an optimal image reading state is determined easily. This image reading sensitivity (charge accumulating period) can be used as an optimal sensitivity, so that the sensitivity setting is easy. Moreover, since the sensitivity setting processing can be executed using an actual subject, it is not necessary to use a standard sample or the like. Even when the lightness of the subject image varies in response to changes in the environment light, an optimal image reading sensitivity can be set in accordance with the changes in the environmental light. This has eliminated the need to employ a circuit specially designed for sensing the environmental light. Further, even if the photosensors vary in characteristics, the image data obtained from these photosensors is used for determining an optimal sensitivity. Hence, the adverse effects arising from the characteristic variations can be remarkably suppressed.

According to the sensitivity setting method of the fifth embodiment, abnormal values, which deviate from the main change trend of lightness data, are removed from the lightness data, and a row or rows that are in an optimal image reading state are selected in a simple manner on the basis of the abnormal value-free lightness data. The image reading sensitivity (charge accumulating period) set for that specific row section can be used as an optimal sensitivity. According to the sensitivity setting method of the sixth and seventh embodiments, only a specific row section of the photosensor array is used in the sensitivity-adjusting reading operation. Alternatively, the presence of an abnormal pixel is determined, and a specific row section that does not contain an abnormal pixel is used for the sensitivity-adjusting reading operation. Therefore, the image reading sensitivity can be set at an optimal value without being adversely affected by an abnormal pixel, which is due to a foreign substance adhering to the sensing surface of the photosensor array, a defect of the photosensor element, or the like.

In each of the embodiments described above, the sensitivity-adjusting reading operation is executed prior to the normal reading operation. The present invention is not limited to this. For example, the sensitivity-adjusting reading operation may be executed in the standby state, i.e., the state where the photosensor system is operating but a subject has not yet been placed.

In addition, the sensitivity-adjusting reading operation was described as being performed whenever the normal reading operation is executed for a subject image. The present invention is not limited to this. For example, the sensitivity-adjusting reading operation may be performed only when there is a change in the use environment, or when a predetermined length of time has elapsed.

The image reading sensitivity (charge accumulating period) setting method applied to sensitivity setting processing according to the present invention is not limited to the above embodiments. As far as image data of a subject image can be obtained at different reading sensitivities, e.g., a series of processes described in the prior art: reset operation→charge accumulating operation→pre-charge operation→readout operation can be repeated a plurality of number of times at different reading sensitivities, thereby obtaining image data at different reading sensitivities. Alternatively, any other methods may also be employed.

A description will now be given of the effective voltages of signals which are applied to the top and bottom gate terminals TG and BG in the sensitivity-adjusting reading operation and the image reading operation when the photosensor array of the present invention is made of a double-gate photosensor 10, and of a method for controlling the effective voltage to be an optimal value.

As is apparent from FIGS. 35A to 35H, 36A to 36H, 37A to 37J and 41A to 41C, the top gate terminal TG receives a high-level signal voltage Vtgh as a reset pulse only for a very short time ($T_{reset}$), and a low-level signal voltage Vtgl for the remaining relatively long period in sensitivity-adjusting reading operation and image reading operation. In the sensitivity-adjusting reading and image reading periods, the effective voltage applied to the top gate terminal TG greatly shifts to the low-level side. Since an optimal charge accumulating period set for image reading operation is changed and set in accordance with the ambient illuminance or the like if necessary, the effective voltage applied to the top gate terminal TG inevitably varies.

In the sensitivity-adjusting reading operation and the image reading operation, the bottom gate terminal BG receives a high-level signal voltage Vbgh only for a very short time ($T_{read}$), and a low-level signal voltage Vbgl for the remaining relatively long period. In the sensitivity-adjusting reading and image reading periods, the effective voltage applied to the bottom gate terminal BG also greatly shifts to the low-level side. Since an optimal charge accumulating period set for image reading operation is changed and set in accordance with the ambient illuminance or the like if necessary, the effective voltage applied to the bottom gate terminal BG inevitably varies.

If such a voltage shifted to a voltage of a specific polarity is kept applied to the gate electrode, the gate electrode traps holes to degrade the element characteristics of the double-gate photosensor and change the sensitivity characteristics.

To prevent this, an effective voltage adjusting period for correcting effective voltages applied to the top and bottom gate terminals TG and BG is set after the sensitivity-adjusting reading and image reading periods. During the effective voltage adjusting period, predetermined correction signals are applied. One of them is for setting an effective voltage applied to the top gate terminal TG to an optimal value Vte of the effective voltage of the top gate electrode set in accordance with the sensitivity characteristics of the double-gate photosensor. Another correction signal is for setting an effective voltage applied to the bottom gate terminal BG to an optimal value Vbe of the effective voltage of the bottom gate electrode. This can suppress changes in sensitivity characteristics caused by degradation in the element characteristics of the photosensor, and can improve the reliability of the photosensor system.

In a photosensor system drive control method according to the present invention, the sensitivity-adjusting reading operation of each embodiment can be performed immediately before the image reading operation, and the effective voltage adjusting period can be set after the image reading period. Operations of this case will be described with reference to the Figures.

FIGS. 38A to 38H are timing charts showing an embodiment wherein the effective voltage adjusting period is set after the sensitivity-adjusting reading and image reading periods.

As the drive control method during the sensitivity-adjusting reading period, the drive control method in FIGS. 36A to 36H described above is applied. The same reference numerals denote the same parts, and a description thereof will be omitted. The reset pulses φT1, φT2, ..., Tn are pulse signals whose high and low levels are signal voltages Vtgh and Vtgl, respectively. The readout pulses φB1, φB2, ..., φBn are pulse signals whose high and low levels are signal voltages Vbgh and Vbgl, respectively. As the drive control method during the sensitivity-adjusting reading period, the operation shown in FIGS. 35A to 35H or the operation shown in FIGS. 37A to 37J may be applied. Needless to say, the present invention is not limited to these methods.

The drive control method during the image reading period is based on the conventional photosensor system drive control method shown in FIGS. 41A to 41D. To shorten the operation time, photosensors are driven by overlapping the charge accumulating periods of respective rows at timings so as not to overlap reset, pre-charge, and readout pulses. That is, as shown in FIGS. 38A to 38C, the reset pulses φT1, φT2, ..., φTn are sequentially applied to the respective top gate lines 101 connected to the top gate terminals TG of the double-gate photosensors 10 in the row direction, thereby starting the reset period $T_{reset}$, and initializing the double-gate photosensors 10 of respective rows. Similar to the above-described sensitivity-adjusting reading operation, the reset pulses φT1, φT2, ..., φTn are pulse signals whose high and low levels are the signal voltages Vtgh and Vtgl, respectively. Except for timings at which the reset pulses φT1, φT2, ..., φTn of high-level Vtgh are applied, the low-level signal voltage Vtgl is applied.

The reset pulses φT1, φT2, ..., φTn fall to end the reset period $T_{reset}$. Then, optimal light accumulating periods Ta obtained by each embodiment for respective rows based on sensitivity-adjusting reading operation sequentially start, and charges (holes) are generated and accumulated in the channel regions in accordance with light quantities entering the double-gate photosensors 10 from their top gate electrode side. As shown in FIG. 38G, pre-charge operation of applying the pre-charge signal φpg to start the pre-charge period $T_{prch}$, and applying the pre-charge voltage $V_{prch}$ to the data line 103 to cause the drain electrode of the double-gate photosensor 10 to hold a predetermined voltage is performed during the light accumulating period Ta. As shown in FIGS. 38D to 38F, the readout pulses φB1, φB2, . . . , φBn are sequentially applied in units of rows to the bottom gate lines 102 of double-gate photosensors 10 in which the optimal light accumulating period Ta and pre-charge period $T_{prch}$ end. Then, the readout period Tread starts, and voltage changes VD corresponding to charges accumulated in the double-gate photosensors 10 are read out from the output circuit section 113 via the data lines 103, as shown in FIG. 38H. Similar to the sensitivity-adjusting reading operation described above, the readout pulses φB1, φB2, . . . , φBn are pulse signals whose high and low levels are at the signal voltages Vbgh and Vbgl, respectively. Till timings at which the readout pulses φB1, φB2, . . . , φBn of high-level Vbgh are applied, the low-level signal voltage Vbgl has been applied.

After image reading operation is completed for all the rows, effective voltage adjustment operation of adjusting the shifts of the effective voltages of signals applied to each gate electrode in the sensitivity-adjusting reading and image reading periods and optimizing the effective voltages is executed in the effective voltage adjusting period. More specifically, as shown in FIGS. 38A to 38C, the top gate line 101 of each row receives a correction signal having a high-level period (Ttph) and low-level period (Ttpl) so as to attain a predetermined effective voltage capable of adjusting the effective voltage of a signal voltage applied to the top gate line 101, i.e., top gate terminal TG of the double-gate photosensor 10 in response to a reset pulse in the sensitivity-adjusting reading and image reading periods to an optimal value Vte set in advance in accordance with the sensitivity characteristics of the double-gate photosensor 10.

Similarly, the bottom gate line 102 of each row receives a correction signal having a high-level period (Tbph) and low-level periods (Tbpla and Tbplb) so as to attain a predetermined effective voltage capable of adjusting the effective voltage of a signal voltage applied to the bottom gate line 102, i.e., bottom gate terminal BG of the double-gate photosensor 10 in response to a readout pulse to an optimal value Vbe set in advance in accordance with the sensitivity characteristics of the double-gate photosensor 10.

As a result, the effective values of voltages applied to the top and bottom gate terminals TG and BG of the photosensor element can be set to optimal values to suppress changes in sensitivity characteristics caused by degradation in the element characteristics of the photosensor, and to improve the reliability of the photosensor system.

What is claimed is:

1. A photosensor system comprising:
   a photosensor array including a plurality of photosensors in a two-dimensional array;
   an image reader which reads a subject image at a predetermined reading sensitivity by the photosensor array;
   a sensitivity-adjusting reader which causes the subject image to be read by a specific region of the photosensor array to read the subject image at a plurality of different image reading sensitivities at a corresponding plurality of stages for the specific region of the photosensor array;
   optimal image reading sensitivity extraction means for extracting an optimal image reading sensitivity suitable for the image reading operation based on a comparison of predetermined measurement amounts which correspond to the plurality of different image reading sensitivities and which relate to an image pattern of the subject image corresponding to the specific region of the photosensor array and read by the sensitivity-adjusting reader; and
   reading sensitivity setting means for setting the optimal image reading sensitivity to a reading sensitivity of the image reader.

2. The system according to claim 1, wherein the sensitivity-adjusting reader reads the subject image by setting different image reading sensitivities stepwise for photosensors of a specific row section of at least one specific row of the photosensor array.

3. The system according to claim 2, wherein the photosensors of the specific row section of the photosensor array are photosensors of one specific row.

4. The system according to claim 2, further comprising abnormal pixel determining means for determining whether the specific row section contains an abnormal pixel by checking whether the measurement amount corresponding to one column of the specific row section has changed each time the image reading sensitivities are changed.

5. The system according to claim 4, further comprising sensitivity-adjusting read controlling means for executing the sensitivity-adjusting reading operation with respect to a different specific row section if the abnormal pixel determining means determines that an abnormal pixel exists in the specific row section.

6. The system according to claim 1, wherein the predetermined measurement amounts comprise lightness data corresponding to the image pattern of the subject image read by the sensitivity-adjusting reader.

7. The system according to claim 1, wherein the image reading sensitivity of the photosensor array is set by adjusting a photosensor charge accumulating period.

8. The system according to claim 1, further comprising an effective voltage adjuster which applies to each photosensor a correction signal for setting effective voltages of signal voltages applied to each photosensor to optimal values.

9. The system according to claim 1, wherein the optimal reading sensitivity extraction means comprises:
   measurement amount comparison means for extracting maximum and minimum values of a measurement amount relating to the image pattern of the subject image for each of the different image reading sensitivities based on the subject image read by the sensitivity-adjusting reader;
   dynamic range calculation means for calculating a dynamic range of the measurement amount based on the maximum and minimum values of the measurement amount extracted for said each of the different image reading sensitivities; and
   maximum dynamic range extraction means for extracting an image reading sensitivity having a maximum dynamic range among dynamic ranges of the measurement amounts calculated for the image reading sensitivities.

10. The system according to claim 9, wherein the measurement amount comparison means extracts the maximum and minimum values of the measurement amount in a predetermined column range of each row in the specific region.

11. The system according to claim 1, wherein the optimal reading sensitivity extraction means comprises:
   a displacement calculation means for calculating a displacement of the measurement amounts relating to the image pattern of the subject image between the different image reading sensitivities based on the subject image read by the sensitivity-adjusting reader; and a maximum displacement extraction means for extracting an image reading sensitivity having a maximum displacement among displacements of the measurement amounts between the different image reading sensitivities.

12. The system according to claim 11, wherein the displacement calculation means calculates a differentiated value of a measurement amount on predetermined columns of each row in the specific region.

13. The system according to claim 1, wherein the optimal reading sensitivity extraction means comprises:

a measurement amount comparison means for extracting maximum and minimum values of a measurement amount relating to the image pattern of the subject image for each of the different image reading sensitivities based on the subject image read by the sensitivity-adjusting reader;

a dynamic range calculation means for calculating a dynamic range of the measurement amount based on the maximum and minimum values of the measurement amount extracted for said each of the different image reading sensitivities; and a maximum dynamic range extraction means for extracting an image reading sensitivity at which the dynamic range of the measurement amount for said each of the different image reading sensitivities maximizes and at which a displacement of the dynamic range between the different image reading sensitivities minimizes.

14. The system according to claim 1, further comprising an abnormal value removing means for removing an abnormal value deviating from a main change trend of a measurement amount, from a measurement amount relating to the image pattern of the subject image read by the sensitivity-adjusting reader for each of the different image reading sensitivities.

15. The system according to claim 14, wherein the abnormal value removing means removes the abnormal value by performing Fourier transformation for the measurement amount and removing a predetermined high-frequency component from the frequency-converted measurement amount.

16. The system according to claim 1, which further comprises:

measurement amount comparison means for extracting maximum and minimum values of a measurement amount relating to the image pattern of the subject image for each of the different image reading sensitivities based on the subject image read by the sensitivity-adjusting reader;

dynamic range calculation means for calculating a dynamic range of the measurement amount based on the maximum and minimum values of the measurement amount extracted for said each of the different image reading sensitivities;

specific value extraction means for extracting, for said each of the different image reading sensitivities, a specific value at which the dynamic range of the measurement amount for said each of the different image reading sensitivities maximizes and at which a displacement of the dynamic range between the different image reading sensitivities maximizes; and an abnormality determination means for which determining presence/absence of an abnormality contained in the subject image based on the specific value.

17. The system according to claim 1, wherein:

each of the photosensors comprises: (i) a source electrode and drain electrode, (ii) a channel region made from a semiconductor layer formed between the source electrode and drain electrode, and (ii) a top gate electrode and bottom gate electrode formed respectively on and below the channel region with insulating films provided between the top gate electrode and bottom gate electrode and the channel region, one of the top gate electrode side and bottom gate electrode side is a light irradiation side, and charges corresponding to a light quantity irradiated from the light irradiation side are generated and accumulated in the channel region.

18. A drive control method for a photosensor system including a plurality of photosensors in a two-dimensional array, said method comprising:

executing a sensitivity-adjusting reading operation of causing a subject image to be read by a specific region of the photosensor array at a plurality of different image reading sensitivities at a corresponding plurality of stages for the specific region of the photosensor array;

extracting an image reading sensitivity suitable for an image reading operation of the subject image based on a comparison of predetermined measurement amounts which correspond to the plurality of different image reading sensitivities and which relate to an image pattern of the subject image corresponding to the specific region of the photosensor array and read by the sensitivity-adjusting reading operation;

setting the extracted image reading sensitivity as a reading sensitivity in the reading operation of the subject image; and executing the image reading operation of reading the subject image at the set reading sensitivity.

19. The method according to claim 18, wherein the sensitivity-adjusting reading operation is performed by reading the subject image at different image reading sensitivities that are set stepwise for photosensors of a specific row section of at least one specific row of the photosensor array.

20. The method according to claim 19, wherein the photosensors of the specific row section of the photosensor array are photosensors of one specific row.

21. The method according to claim 19, further comprising determining whether the specific row section contains an abnormal pixel by checking whether the measurement amount corresponding to one column of the specific row section has changed each time the image reading sensitivities are changed.

22. The method according to claim 21, further comprising executing the sensitivity-adjusting reading operation with respect to a different specific row section if an abnormal pixel exists in the specific row section.

23. The method according to claim 18, wherein the predetermined measurement amounts comprise lightness data corresponding to the image pattern of the subject image read by the sensitivity-adjusting reading operation.

24. The method according to claim 18, wherein the image reading sensitivity of the photosensor array is set by adjusting a photosensor charge accumulating period.

25. The method according to claim 18, wherein the extracting the image reading sensitivity comprises:

extracting maximum and minimum values of a measurement amount relating to the image pattern of the subject image for each of the different image reading sensitivities based on the subject image read by the sensitivity-adjusting reading operation;

calculating a dynamic range of the measurement amount based on the maximum and minimum values of the measurement amount extracted for said each of the different image reading sensitivities; and extracting an image reading sensitivity having a maximum dynamic range among dynamic ranges of the measurement amounts calculated for the different image reading sensitivities.

26. The method according to claim 18, wherein the extracting the image reading sensitivity comprises:

calculating a displacement of the measurement amounts relating to the image pattern of the subject image between the different image reading sensitivities based on the subject image read by the sensitivity-adjusting reading operation; and extracting an image reading sensitivity at which a displacement of the measurement amounts between the different image reading sensitivities maximizes.

27. The method according to claim 18, wherein the extracting the image reading sensitivity comprises:

extracting maximum and minimum values of a measurement amount relating to the image pattern of the subject image for each of the different image reading sensitivities based on the subject image read by the sensitivity-adjusting reading operation;

calculating a dynamic range of the measurement amount based on the maximum and minimum values of the measurement amount extracted for said each of the different image reading sensitivities; and extracting an image reading sensitivity at which the dynamic range of the measurement amount for said each of the different image reading sensitivities maximizes and at which a displacement of the dynamic range between the different image reading sensitivities minimizes.

28. The method according to claim 18, wherein the extracting the image reading sensitivity comprises:

extracting maximum and minimum values of a measurement amount relating to the image pattern of the subject image for each of the different image reading sensitivities based on the subject image read by the sensitivity-adjusting reading operation;

calculating a dynamic range of the measurement amount based on the maximum and minimum values of the measurement amount extracted for said each of the different image reading sensitivities;

extracting a specific value at which the dynamic range of the measurement amount for said each of the different image reading sensitivities maximizes and at which a displacement of the dynamic range between the different image reading sensitivities maximizes; and determining presence/absence of an abnormality contained in the subject image based on the specific value.

29. The method according to claim 18, wherein the extracting the image reading sensitivity comprises removing an abnormal value deviating from a main change trend of a measurement amount, from a measurement amount relating to the image pattern of the subject image for each of the different image reading sensitivities.

30. The method according to claim 29, wherein the removing the abnormal value from the measurement amount comprises performing Fourier transformation for the measurement amount and removing a predetermined high-frequency component from the frequency-converted measurement amount.

31. The method according to claim 18, wherein:

each of the photosensors comprises: (i) a source electrode and drain electrode, (ii) a channel region made from a semiconductor layer formed between the source electrode and drain electrode, and (ii) a top gate electrode and bottom gate electrode formed respectively on and below the channel region with insulating films provided between the top gate electrode and bottom gate electrode and the channel region, one of the top gate electrode side and bottom gate electrode side is a light irradiation side, and charges corresponding to a light quantity irradiated from the light irradiation side are generated and accumulated in the channel region.

* * * * *